United States Patent
Fleizach et al.

(10) Patent No.: US 9,792,013 B2
(45) Date of Patent: Oct. 17, 2017

(54) INTERFACE SCANNING FOR DISABLED USERS

(71) Applicant: Apple Inc., Cupertino, CA (US)

(72) Inventors: Christopher Fleizach, Morgan Hill, CA (US); Eric T. Seymour, San Jose, CA (US); Clare Kasemset, Sunnyvale, CA (US); Samuel White, San Jose, CA (US); Darren C. Minifie, San Jose, CA (US); Ian Fisch, Santa Cruz, CA (US); Gregory F. Hughes, San Jose, CA (US); Justin Kaufman, San Francisco, CA (US); Patti P. Hoa, San Jose, CA (US)

(73) Assignee: Apple Inc., Cupertino, CA (US)

( * ) Notice: Subject to any disclaimer, the term of this patent is extended or adjusted under 35 U.S.C. 154(b) by 539 days.

(21) Appl. No.: 13/782,843

(22) Filed: Mar. 1, 2013

(65) Prior Publication Data
US 2014/0215398 A1  Jul. 31, 2014

Related U.S. Application Data

(60) Provisional application No. 61/757,052, filed on Jan. 25, 2013.

(51) Int. Cl.
*G06F 3/048* (2013.01)
*G06F 3/0484* (2013.01)
*G06F 3/0487* (2013.01)

(52) U.S. Cl.
CPC ........ *G06F 3/04842* (2013.01); *G06F 3/0487* (2013.01)

(58) Field of Classification Search
CPC ............. G06F 3/04842; G06F 3/04812; G06F 3/04897; G06F 3/0487; G06F 3/0482; A61F 4/00
See application file for complete search history.

(56) References Cited

U.S. PATENT DOCUMENTS 5,483,261 A   1/1996 Yasutake
5,488,204 A   1/1996 Mead et al.
(Continued)

FOREIGN PATENT DOCUMENTS

JP    2000-163031 A    6/2000
JP    2002-342033 A    11/2002
WO   WO-2012/092063 A1  7/2012

OTHER PUBLICATIONS

"WiVik User Guide," 2003, Bloorview MacMillan Children's Center.*
(Continued)

*Primary Examiner* — Doon Chow
*Assistant Examiner* — Andrew T Chiusano
(74) *Attorney, Agent, or Firm* — Morrison & Foerster LLP

(57) ABSTRACT

Systems and processes for scanning a user interface are disclosed. One process can include scanning multiple elements within a user interface by highlighting the elements. The process can further include receiving a selection while one of the elements is highlighted and performing an action on the element that was highlighted when the selection was received. The action can include scanning the contents of the selected element or performing an action associated with the selected element. The process can be used to navigate an array of application icons, a menu of options, a standard desktop or laptop operating system interface, or the like. The process can also be used to perform gestures on a touch-sensitive device or mouse and track pad gestures (e.g., flick, tap, or freehand gestures).

24 Claims, 54 Drawing Sheets

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 6,886,138 | B2* | 4/2005 | Laffey et al. ............. 715/860 |
| 7,015,894 | B2 | 3/2006 | Morohoshi |
| 7,170,977 | B2 | 1/2007 | Doherty et al. |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2006/0197753 | A1 | 9/2006 | Hotelling |
| 2006/0267931 | A1* | 11/2006 | Vainio et al. ............. 345/156 |
| 2008/0122796 | A1* | 5/2008 | Jobs et al. ............. 345/173 |
| 2011/0078611 | A1 | 3/2011 | Caligari et al. |

OTHER PUBLICATIONS

I. Scott Mackenzie and Torsten Felzer, "SAK: Scanning Ambiguous Keyboard for Efficient One-Key Text Entry," Jul. 2010, ACM Transactions on Computer-Human Interaction, vol. 17, No. 3, Article 11.*

Peter E. Jones, "Virtual keyboard with scanning and augmented by prediction," 1998, Proc. 2nd Euro. Conf. Disability, Virtual Reality and Assoc. Tech.*

Richard C. Simpson and Heidi Horstmann Koester, "Adaptive One-Switch Row-Column Scanning," Dec. 1999, IEEE Transactions on Rehabilitation Engineering, vol. 7, No. 4.*

Mukherjee, Animesh, et al. "A virtual predictive keyboard as a learning aid for people with neuro-motor disorders." Advanced Learning Technologies, 2005. ICALT 2005. Fifth IEEE International Conference on. IEEE, 2005.*

Siobhan Long, "Click2Phone," Youtube, Jul. 26 2007, available at https://www.youtube.com/watch?v=NCufj0HyWc.*

Burton, D. et al. (Mar. 2012). "Cell Phone Accessibility: Android Ice Cream Sandwich: Evaluating the Accessibility of Android 4.0," AccessWorld 13(3), located at <http://www.afb.org/afbpress/pub.asp?DocID=aw130302&Mode=Print>, last visited Feb. 19, 2013, 8 pages.

Miró-Borrás, J. et al. (2008). "E-Everything for All: Text Entry for People with Severe Motor Disabilities," CollECTeR Iberoamérica, 7 pages.

Anonymous. (2013). "ClickToPhone for Android Phone or Tablet Configurator," located at <http://www.broadenedhorizons.com/clicktophone>, last visited Feb. 19, 2013, 7 pages.

Shein, G.F. (1997). "Towards Task Transparency in Alternative Computer Access: Selection of Text Through Switch-Based Scanning," Doctor of Philosophy Degree Thesis, Graduate Department of Mechanical and Industrial Engineering, University of Toronto, 252 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner personal
device
5400 personal
device
5300

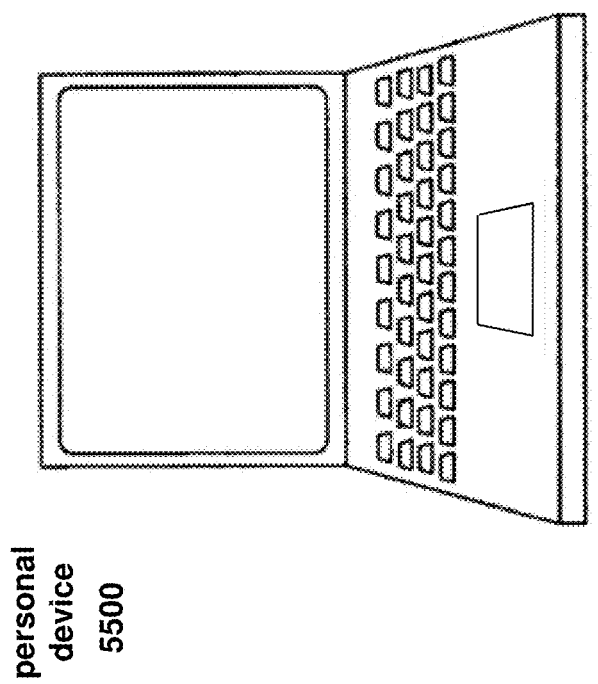

INTERFACE SCANNING FOR DISABLED USERS

CROSS REFERENCE TO RELATED APPLICATIONS

This application claims the benefit under 35 USC 119(e) of U.S. Provisional Patent Application No. 61/757,052, filed Jan. 25, 2013, the disclosure of which is hereby incorporated by reference in its entirety.

FIELD

This relates generally to electronic devices for physically-impaired users and, more specifically, to electronic devices that allow a motor-impaired user to navigate a computer interface.

BACKGROUND

Various types of input devices, such as keyboards, mice, track pads, touch screens, and the like, have been developed to enable a user to interact with a computing device. While these traditional input devices provide users with a quick and intuitive way to interact with a computing device, they all require a significant amount of movement by the user. This presents a problem for physically-impaired users that lack the fine motor skills required to operate such input devices. For example, some physically-impaired users are unable to move a finger across the surface of a touch screen device and thus, cannot operate a touch-sensitive device, such as a tablet computer. Similar problems can arise with the use of a keyboard or mouse.

Thus improved input devices and methods are desired for physically-impaired users.

SUMMARY

This relates to techniques for scanning a user interface. One process can include scanning multiple elements within a user interface by highlighting the elements. The process can further include receiving a selection while one of the elements is highlighted and performing an action on the element that was highlighted when the selection was received. The action can include scanning the contents of the selected element or performing an action associated with the selected element. The process can be used to navigate an array of application icons, a menu of options, a standard desktop or laptop operating system interface, or the like. The process can also be used to perform gestures on a touch-sensitive device or mouse and track pad gestures (e.g., flick, tap, or freehand gestures).

Systems and computer-readable storage media for performing the processes described above are also disclosed.

BRIEF DESCRIPTION OF THE DRAWINGS

FIGS. 53-55 illustrate exemplary personal devices that can be used to scan a user interface according to various examples.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

This relates to techniques for scanning a user interface. One process can include scanning multiple elements within a user interface by highlighting the elements. The process can further include receiving a selection while one of the elements is highlighted and performing an action on the element that was highlighted when the selection was received. The action can include scanning the contents of the selected element or performing an action associated with the selected element. The process can be used to navigate an array of application icons, a menu of options, a standard desktop or laptop operating system interface, or the like. The process can also be used to perform gestures on a touch-sensitive device or mouse and track pad gestures (e.g., flick, tap, or freehand gestures). Systems and computer-readable storage media for performing the processes described above are also disclosed.

Figure 1:
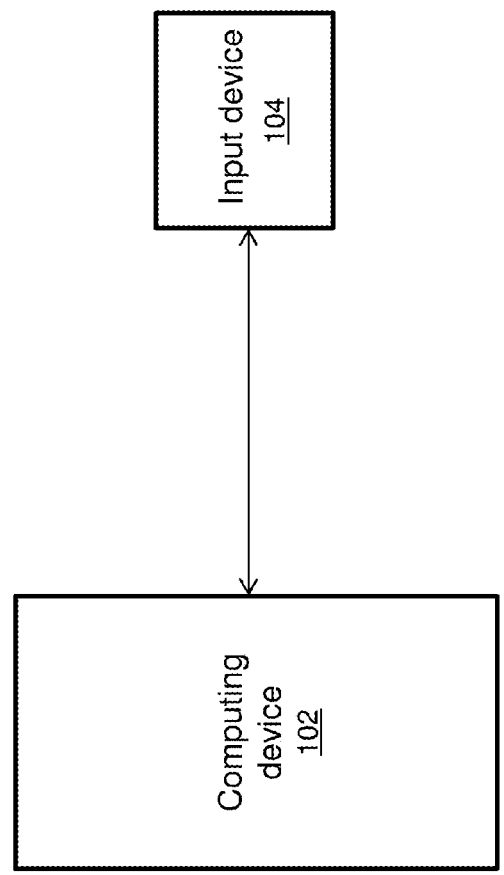
FIG. 1 illustrates an exemplary scanning system according to various examples.

FIG. 1 illustrates an exemplary scanning system 100 that allows a motor-impaired user to navigate a computer interface of computing device 102. System 100 may generally include a computing device 102 communicatively coupled to input device 104. Computing device 102 can include any type of computing device, such as desktop computer, laptop computer, tablet computer, mobile phone, portable media player, or the like. Computing device 102 can also include a display for displaying a user interface.

Input device 104 can include any type of input device, such as a track pad, touch sensitive display, mouse, single-button switch, multi-button switch, camera, infrared (IR) proximity sensor, audio sensor, breath sensor, joystick, or the like, capable of detecting an input from a user indicating that the user is making a selection. For example, input device 104 can include one or more push-buttons having a compressed state and an uncompressed state, a image sensor configured to detect movement of a user (e.g., blinking or movement of the user's head), an IR proximity sensor configured to detect an object within a threshold distance from the sensor, a track pad or touch screen configured to detect the presence of an object (e.g., a user's hand placed on or near the surface of the device), an audio sensor configured to detect a sound having a predetermined characteristic (e.g., volume, pitch, or the like), a breath sensor to measure air pressure blown into a straw, a pressure sensor to detect depression of a button, an accelerometer to detect movement of a joystick, a sensor to detect the amount of displacement of a joystick, or the like. In some examples, input device 104 can be configured to output sensor data to computing device 102 where it can be processed to determine if a selection has been made by the user. In other examples, input device 104 can be configured to process the sensor data to determine if a selection has been made by the user. In yet other examples, both input device 104 and computing device 102 can be configured to process the sensor data to determine if a selection has been made by the user.

Input device 104 can be coupled using any wired or wireless technology to transmit an output signal (e.g., sensor data and/or an indication of whether or a not a user selection has been received) to computing device 102. For example, a wired connection, such as a USB cable, audio cable, or the like, or a wireless connection, such as Bluetooth, WiFi, NFC, IR, or the like, can be used to communicate between input device 104 and computing device 102. In other examples, input device 104 can be included within computing device 102. For example, computing device 102 can be a tablet computer and input device 104 can be a touch sensor of a touch-sensitive display of the tablet computer.

Figure 2:
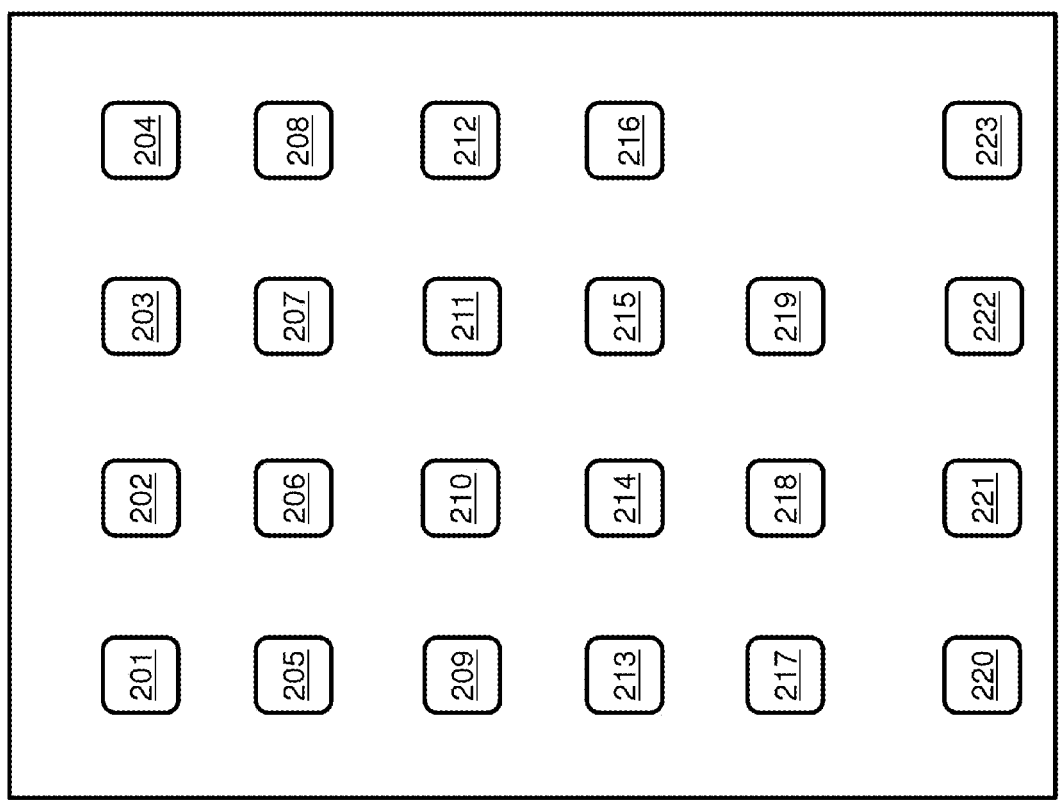
FIG. 2 illustrates an exemplary user interface according to various examples.

Computing device 102 can display a user interface having one or more elements that can be selected by a user (e.g., by hovering over the element and clicking a mouse button or touching a location of the element on a touch sensitive display). These selectable elements can include, for example, icons corresponding to apps, hyperlinks, items in a menu bar, a section of a display, and the like. To illustrate, FIG. 2 shows an exemplary interface 200 having selectable elements (e.g., application icons) 201-223. Each selectable element 201-223 can be selected (e.g., by touching a location of the element on a touch sensitive display) by a user to perform an action associated with the selectable element. While elements 201-223 are visible within interface 200, it should be appreciated that interface 200 can further include elements that are not visible (e.g., elements that may be displayed in response to a particular event, such as receiving a user input).

Figure 3:
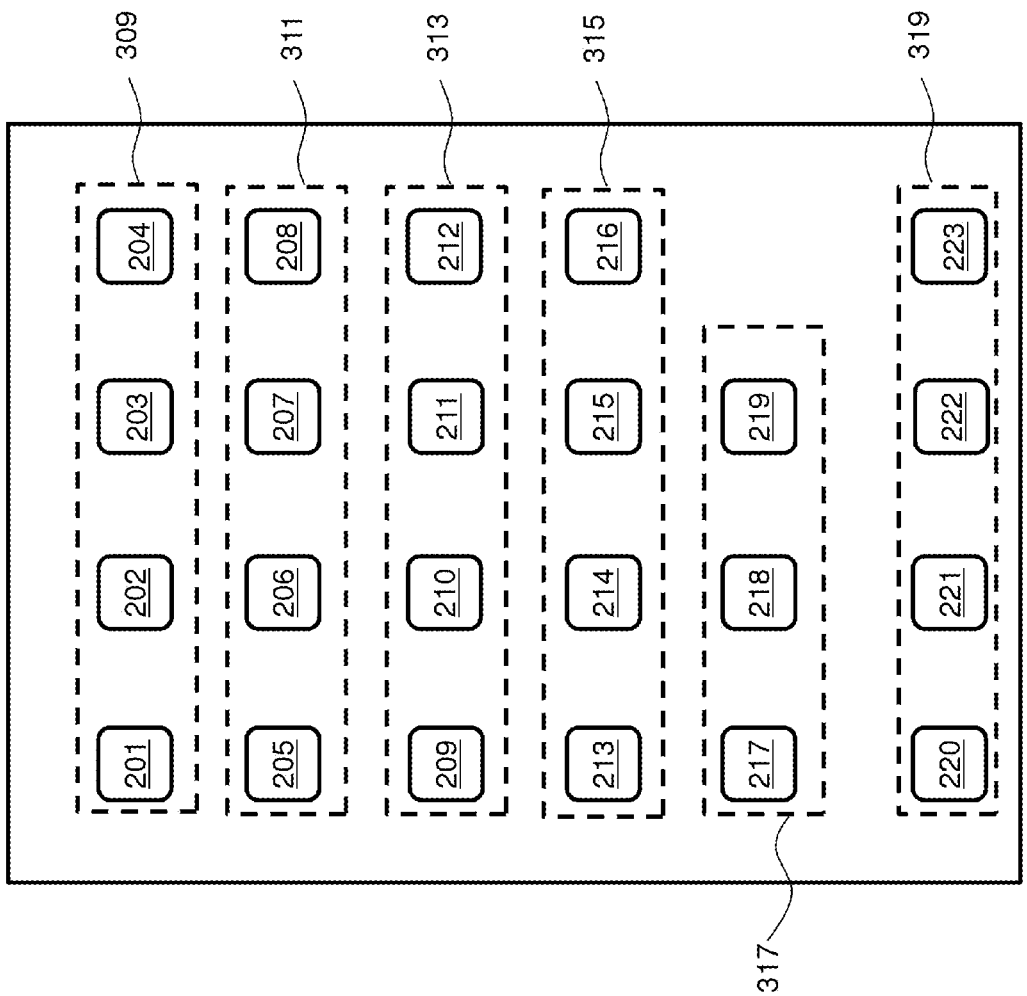
FIG. 3 illustrates an exemplary grouping of elements of a user interface according to various examples.

In some examples, the selectable elements of the user interface can be grouped into sets of one or more selectable elements, which in turn can be a selectable element itself. The sets of selectable elements can be grouped in any desired fashion to include any number of selectable elements. For example, FIG. 3 illustrates exemplary interface 300 showing one possible grouping of the selectable elements of interface 200. In particular, each row of selectable elements can be grouped into sets of elements 309, 311, 313, 315, 317, and 319. Each set can be treated as a selectable element that contains sub-elements corresponding to elements 201-223. Thus, with this particular grouping, interface 300 can include six elements in the form of sets 309, 311, 313, 315, 317, and 319, with each element corresponding to a different row of elements 201-223. These elements can further include their own sub-elements, each sub-element corresponding to an element 201-223. In the illustrated example, elements 309, 311, 313, 315, and 319 each include four sub-elements (corresponding to individual elements 201-223), while element 317 includes three sub-elements (corresponding to individual elements 201-223). Thus, an element can refer to any item that can be selected within a display. In some examples, the element can include multiple sub-elements, each of which can also be selected by a user. These sub-elements can also include sub-elements of their own, and so on. This hierarchy structure of elements and sub-elements can be expanded to any desired level and the grouping at each level of the hierarchy can be performed in any desired manner. Moreover, an element can be a sub-element of more than one element.

Figure 4:
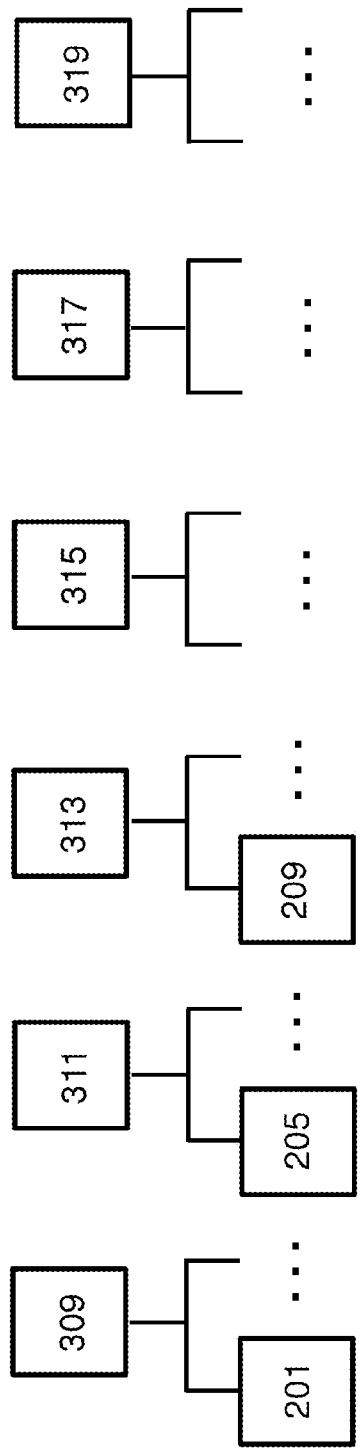
FIG. 4 shows an exemplary hierarchy of elements according to various examples.

FIG. 4 illustrates an exemplary view of the hierarchy 400 of elements of interface 300. At the top or highest level of hierarchy 400 are elements 309, 311, 313, 315, 317, and 319. Each of these elements contains sub-elements corresponding to elements 201-223 at the bottom or lowest level of the hierarchy. Thus, moving up a level in the element hierarchy refers to accessing or interacting with a hierarchy level closer to the top of the hierarchy, while moving down a level in the element hierarchy refers to accessing or interacting with a hierarchy level closer to the bottom of the hierarchy.

Figure 5:
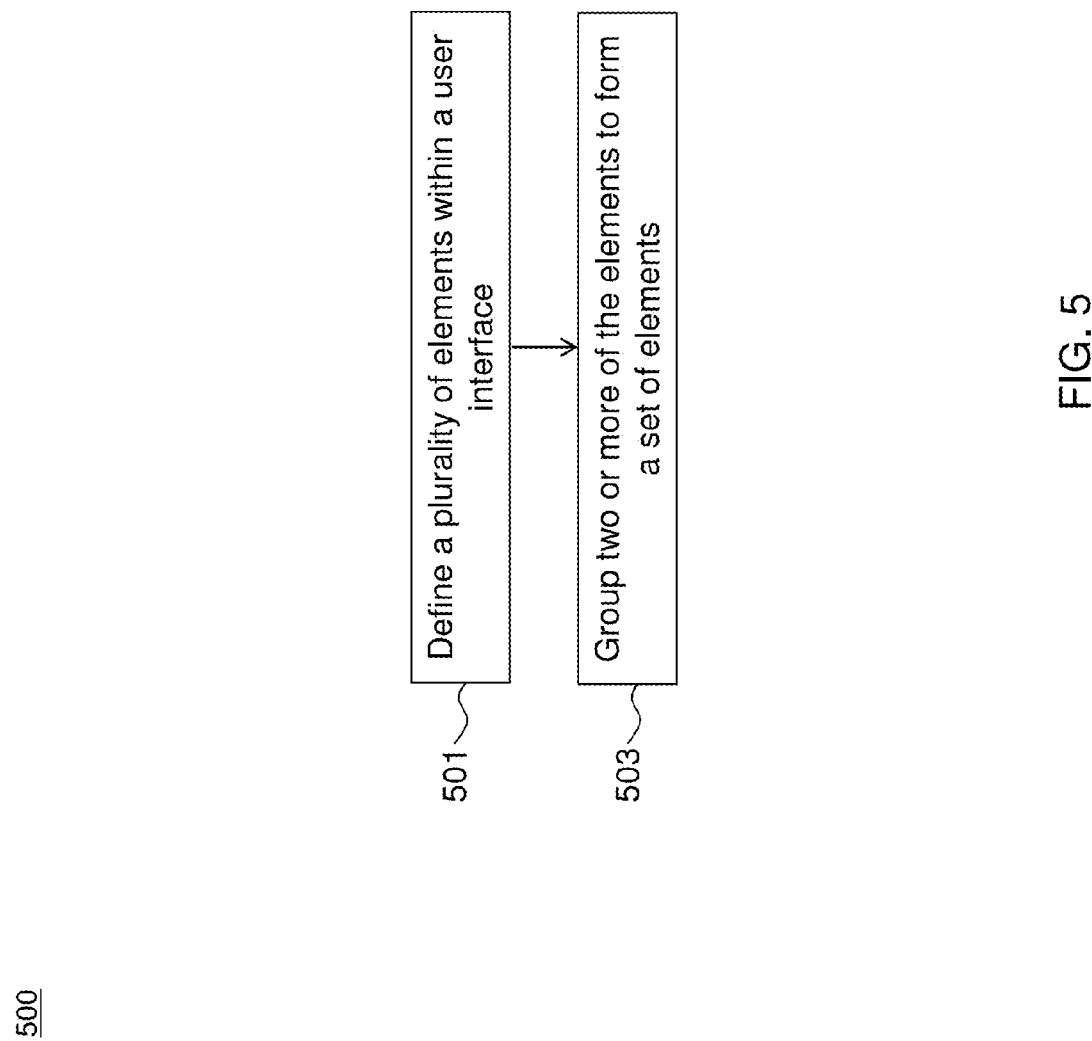
FIG. 5 illustrates an exemplary process for defining and grouping elements of a user interface according to various examples.

FIG. 5 illustrates an exemplary process 500 for grouping elements within a user interface. At block 501, a plurality of elements within a user interface can be defined. These elements can be defined in any manner, and can include any selectable items within a display, such as icons corresponding to apps, hyperlinks, items in a menu bar, a section of a display, or the like. At block 503, two or more of the elements can be grouped together to form a set of elements. The elements can be grouped in any desired manner and based on any desired characteristic. For example, the elements can be grouped based on location within the user interface or based on some logical relationship between the elements. In some examples, the grouping criteria used at block 503 can be selected automatically by the device. In other examples, a user can define the grouping criteria or can manually group elements within a display using, for example, a graphical user interface (GUI) application.

In some examples, process 500 can be performed by the user's computing device such that the device can dynamically define and group elements within any user interface displayed on the device. In other examples, the user device or another computing device can define and group the elements of a user interface and store the element and grouping information in a file associated with the user interface such that any devices subsequently displaying the interface can access the defined elements and groupings. In yet other examples, content authors can define and group the elements of a user interface either implicitly (e.g., with the <p> tag in HTML) or explicitly (e.g., with an attribute tag to define groupings for scanner software).

Interface 200 shows an example of an interface after block 501 of process 500 has been performed. In this example, 23 elements have been defined, each corresponding to an element 201-223 displayed within the interface. Interface 300 shows an example of interface 200 after block 503 of process 500 has been performed. In this example, the 23 elements of interface 200 have been grouped based on location within the user interface (e.g., based on their location within a row of elements), thereby forming six sets of elements. These six sets of elements can also be treated as elements themselves, as mentioned above.

FIG. 5 can alternatively be performed by defining the elements in the highest level of the hierarchy at block 501 (e.g., elements 309, 311, 313, 315, 317, and 319), and then dividing these elements into sub-elements (e.g., the individual elements 201-223) at block 503 to produce the same hierarchically structured set of elements.

As will be described in detail below with respect to FIGS. 6-51, computing device 102 can be configured to "scan" (e.g., iteratively focus) through elements displayed within the user interface. Computing device 102 can be further configured to select any of the elements in response to an input received by input device 104 while the particular element is being scanned, thereby allowing a user to interact with any of the elements in the user interface using one or more inputs (e.g., button press, mouse click, tap on a touch sensitive surface, voice command, movement of a part of the users body, or the like). This is particularly useful for disabled users that are unable to operate input devices requiring motion and careful coordination, such as a keyboard, mouse, or touch sensitive display.

Figure 6:
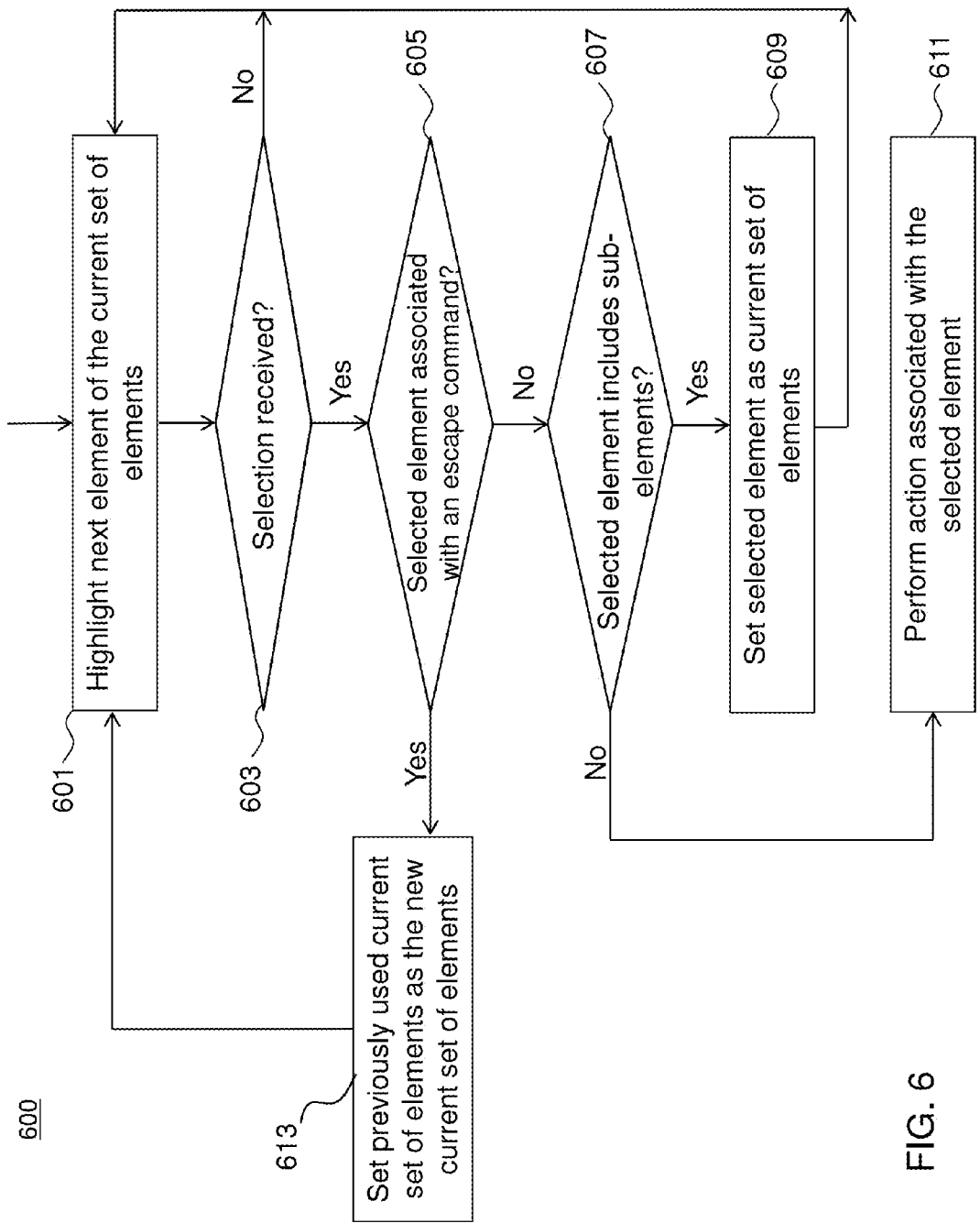
FIG. 6 illustrates an exemplary process for scanning elements of a user interface according to various examples.

FIG. 6 illustrates an exemplary process 600 for scanning through elements of a user interface displayed by a computing device. Process 600 can be performed by any computing device, such as computing device 102 of system 100, having or being associated with an input device, such as input device 104 of system 100. Process 600 can be performed on an interface containing one or more elements that have been defined and/or grouped using a process similar or identical to process 500, described above. As will be described in greater detail below with respect to block 603, process 600 can be used to automatically scan through elements (e.g., scanning is done without user input) of a user interface or manually scan through elements (e.g., scanning to the next element is done in response to a user input) of the user interface.

Process 600 can begin at block 601, where the next element of the current set of elements can be highlighted. In some examples, at the start of process 600, the current set of elements can be selected to be the group of elements corresponding to the highest level of the element hierarchy (e.g., the group of elements that includes all sub-elements) within the currently displayed user interface. For instance, using interface 300 shown in FIG. 3 as an example, elements 309, 311, 313, 315, 317, and 319 can correspond to the highest level of hierarchy 400 since they include all sub-elements (individual elements 201-223) of the interface.

Additionally, during the initiation of process 600, the next element of the current set of elements can be chosen to be any of the elements within the current set of elements. For example, the next element can be chosen based on a location of the element within the displayed user interface (e.g., element closest to the top of the interface, closest to the left of the interface, or the like). Using interface 300 as an example, during the initiation of process 600, the initial "next element" can be chosen to be element 309 since it is closest to the top of the user interface. In other examples, the elements of the current set of elements can have an order based on any desired characteristic, such as a location within the user interface, logical ordering, or the like, and the "next element" can be chosen at block 601 based on this ordering. For instance, one example ordering of elements 309, 311, 313, 315, 317, and 319 can be 309, 311, 313, 315, 317, and then 319. This example ordering is based on location of the elements within the user interface, starting from the top of the user interface and ending at the bottom of the user interface. In other examples, the ordering can be user-defined (e.g., by the user of the device or content author).

The highlighting of the next element performed at block 601 can include any change in a visual characteristic of the element or associated with the element, audible notification, vibration, other tactile cues, or any other technique to emphasize an element to demonstrate focus. For example, to highlight an element, a box can be drawn around the element, a color of the element can be changed, a brightness of the element can be changed, or a size of the element can be changed.

Figure 7:
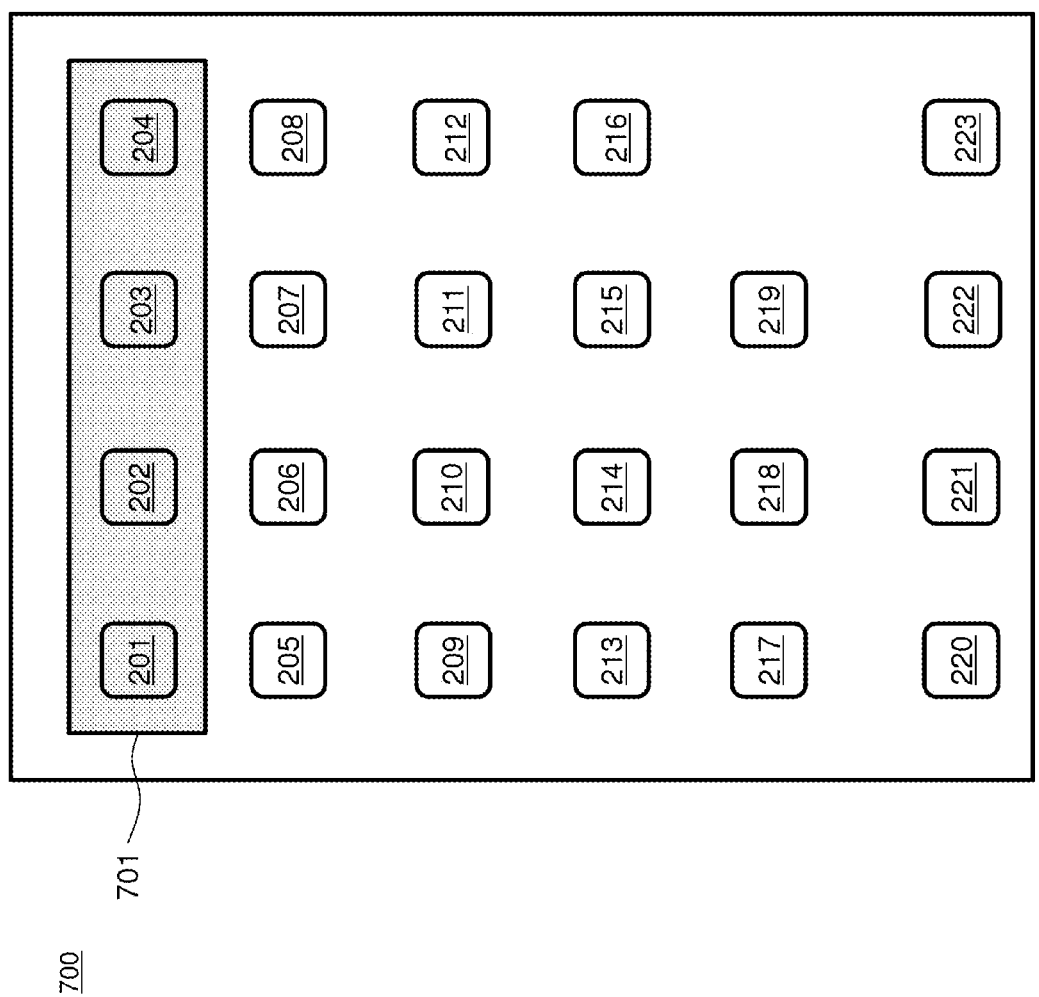
FIGS. 7-51 illustrate exemplary user interfaces showing various functions that can be performed using the process of FIG. 6 according to various examples.

As an example of the operation performed at block 601, FIG. 7 illustrates an interface 700 having an exemplary highlighting 701 of an element. In this example, the next element was chosen to be element 309 of interface 300. However, it should be appreciated that any of the other elements of interface 300 could have been chosen as the initial "next element" used at block 601. As shown in FIG. 7, highlighting 701 includes a box drawn around the element. Additionally, an opacity of the user interface bound by the box of highlighting 701 has been changed. However, as mentioned above, other types of highlighting can be used.

Once the next element of the current set of elements is highlighted, the process can proceed to block 603. At block 603, it can be determined whether or not a selection has been received while the highlighted element displayed at block 601 is being displayed. The selection can be received by an input device, such as input device 104, and the selection can be identified using computing device 102 and/or input device 104, as discussed above.

In some examples, process 600 can be used in an automatic scanning mode in which block 603 can be performed for a threshold length of time after the element is highlighted at block 601 such that any input received during the threshold length of time can trigger a positive determination at block 603. The threshold length of time can be set to any value and can, in some examples, be set by the user of the computing device. For example, the threshold length of time can be 0.1, 0.2, 0.3, 0.4, 0.5, 1, 1.5, 2, or more seconds.

In other examples, process 600 can be used in a manual scanning mode in which block 603 can be performed until a command is received from a user instructing the computing device to scan to the next element. For example, a first input from a user (e.g., from a first button on input device 104) can be interpreted as a selection, while a second input from the user (e.g., from a second button on the input device 104) can be interpreted as a "scan next" command, causing termination of block 603.

Figure 8:
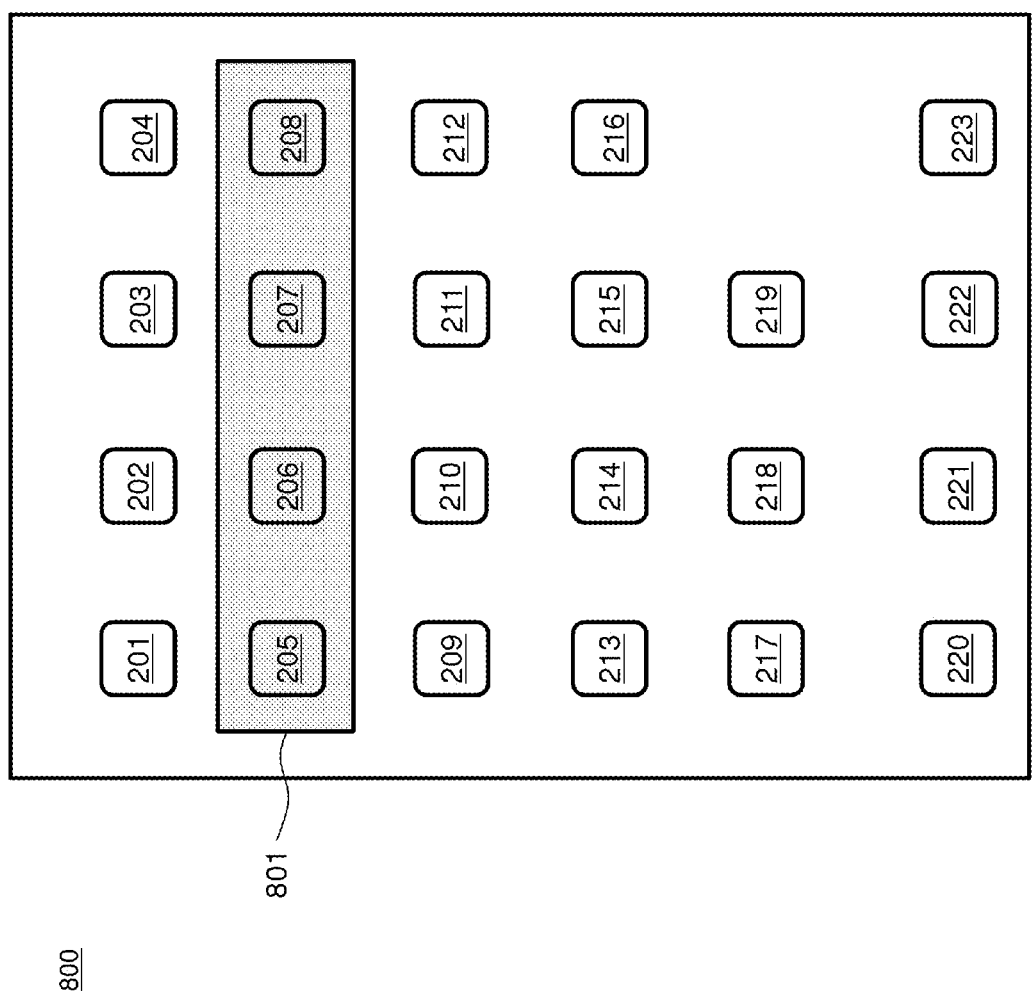

If it is determined at block 603 that no selection has been received, the process can return to block 601, where the next element of the current set of elements can be highlighted. For example, FIG. 8 illustrates an interface 800 having an exemplary highlighting 801 of the next element in the interface. In this example, the next element was selected to be subset 311 of interface 300 since it is the next element in the example ordering provided above. However, it should be appreciated that other orderings of elements can be used to sequentially highlight elements in any desired order. In this way, blocks 601 and 603 can be repeatedly performed (in the absence of receiving a selection in an automatic scanning mode or in response to commands from the user to scan the next element in a manual scanning mode) to sequentially highlight each element of the user interface. This can also be referred to as "scanning" the user interface or "scanning" the elements within the user interface. In some examples, a threshold number of scanning cycles can be used to limit the number of times a group of elements can be scanned. After reaching the threshold number of scanning cycles, scanning can be ended. Scanning can resume after a threshold length of time or in response to a user input. In some examples, the scanning can resume at the highest level of the hierarchy or can resume where it left off.

Referring back to block 603 of process 600, if it is instead determined that a selection has been received, then the process can proceed to block 605. At block 605, it can be determined if the selected element (e.g., the element that is highlighted when the selection is received) is associated with an escape command. If it is determined at block 605 that the selected element is associated with an escape command, then the process can proceed to block 613. As will be discussed in greater detail below, the escape command can be used to escape the current hierarchy level of elements and instead scan the next highest level of the hierarchy. To illustrate the operation performed at block 605, referring to the example shown in FIG. 8, if a selection was made while highlighting 801 was being displayed, it can be determined whether or not the selected element (element 311) is associated with an escape command. In this example, the determination returns a negative result since element 311 is not associated with an escape command and instead simply represents a grouping of elements 205-208. As a result, process 600 can instead proceed to block 607.

At block 607, it can be determined whether the selected element (e.g., the element that is highlighted when the selection is received) includes sub-elements. This determination can be accomplished in various ways. For example, the computing device can evaluate the hierarchy structure of the elements (e.g., similar to that shown in FIG. 4) to determine if the selected element contains sub-elements. If it is determined at block 607 that the selected element contains sub-elements, the process can proceed to block 609. For example, referring to the example shown in FIG. 8, it can be determined whether or not the selected element (element 311) highlighted with highlighting 801 contains sub-elements. In this example, the determination returns a positive result since element 311 includes four sub-elements (e.g., 205-208). Thus, process 600 can proceed to block 609.

Figure 9:
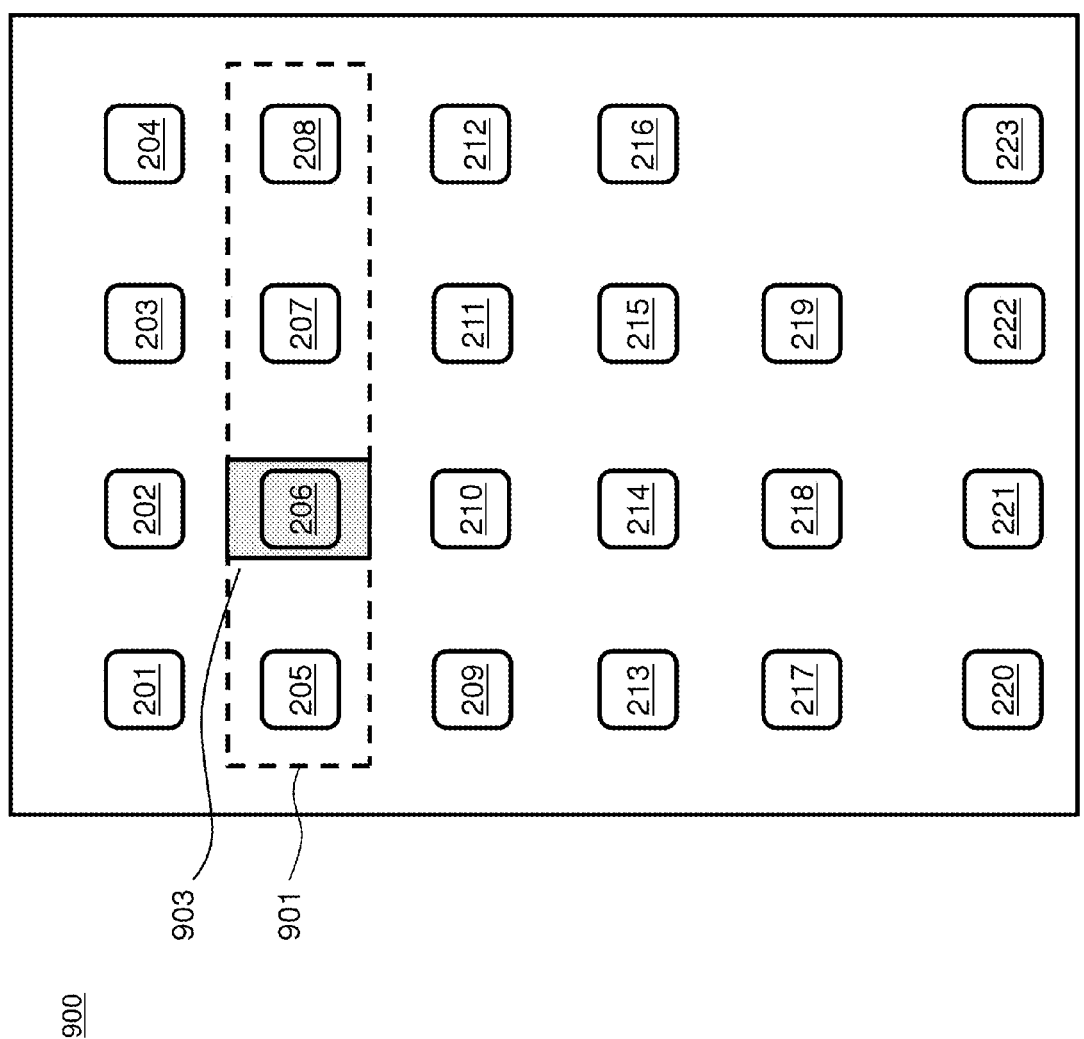

At block 609, the selected element can be assigned as the current set of elements (since it contains a set of sub-elements) and the process can return to block 601 where an element of the new current set of elements can be highlighted. Performing block 609 has the effect of moving down a level in the element hierarchy. Thus, during the next iteration of process 600, the sub-elements of the element previously selected at block 603 can be sequentially highlighted or scanned. For example, FIG. 9 shows highlighting 903 of element 206 of the previously selected element 311. In this example, each of the elements (e.g., 205-208) of element 311 can sequentially be highlighted by highlighting 903. In some examples, as shown in FIG. 9, the current set of elements can also be highlighted with highlighting 901. In this example, highlighting 901 is similar to the previous highlighting 801, except that the box outlining the element is dashed, rather than solid, and the opacity of the user interface bound by the box of highlighting 901 remains unchanged.

Referring back to block 607, if it was instead determined that the selected element does not include sub-elements, the process can proceed to block 611. For example, using FIG. 9 as an example, if a selection was made while highlighting 903 was displayed around element 206, it can be determined whether or not element 206 includes subsets of its own. In some examples, the determination can return a negative result since the element does not include additional sub-elements. Thus, the process can proceed to block 611. As mentioned above, the elements of an interface can include sub-elements that are not displayed. However, for simplicity of discussion, it is assumed that element 206 does not include sub-elements in this example.

At block 611, an action associated with the selected element can be performed. The action can be any action that was assigned to the selected element. For example, using FIG. 9 again as an example, an action associated with element 206 can be to open the application associated with element 206.

Thus, blocks 601, 603, 605, 607, 609, and 611 can be viewed as operations that allow a user to select any selectable element within a user interface by activating one or more inputs (e.g., switch, button, etc.) by causing the computing device to sequentially highlight or scan the various elements within the display. In response to an activation of the single input while an element is highlighted, the computing device can interpret the input as a selection of that highlighted element. In the case where the highlighted element contains multiple sub-elements, activation of the input can cause the computing device to step down one level in the element hierarchy and sequentially highlight or scan the sub-elements of the selected element. This process can be repeated until the computing device highlights or scans to the desired element within the display. As should be apparent to one of ordinary skill in the art, the hierarchy or grouping of the elements within a display can be done to quickly navigate to a particular element without having to scan through every element within the display. Specifically, by providing varying levels of scanning granularity, users can quickly navigate down the element hierarchy to target the desired element. However, it can also be desirable to scan through each element within a display, in which case, no grouping of elements may be used.

Figure 10:
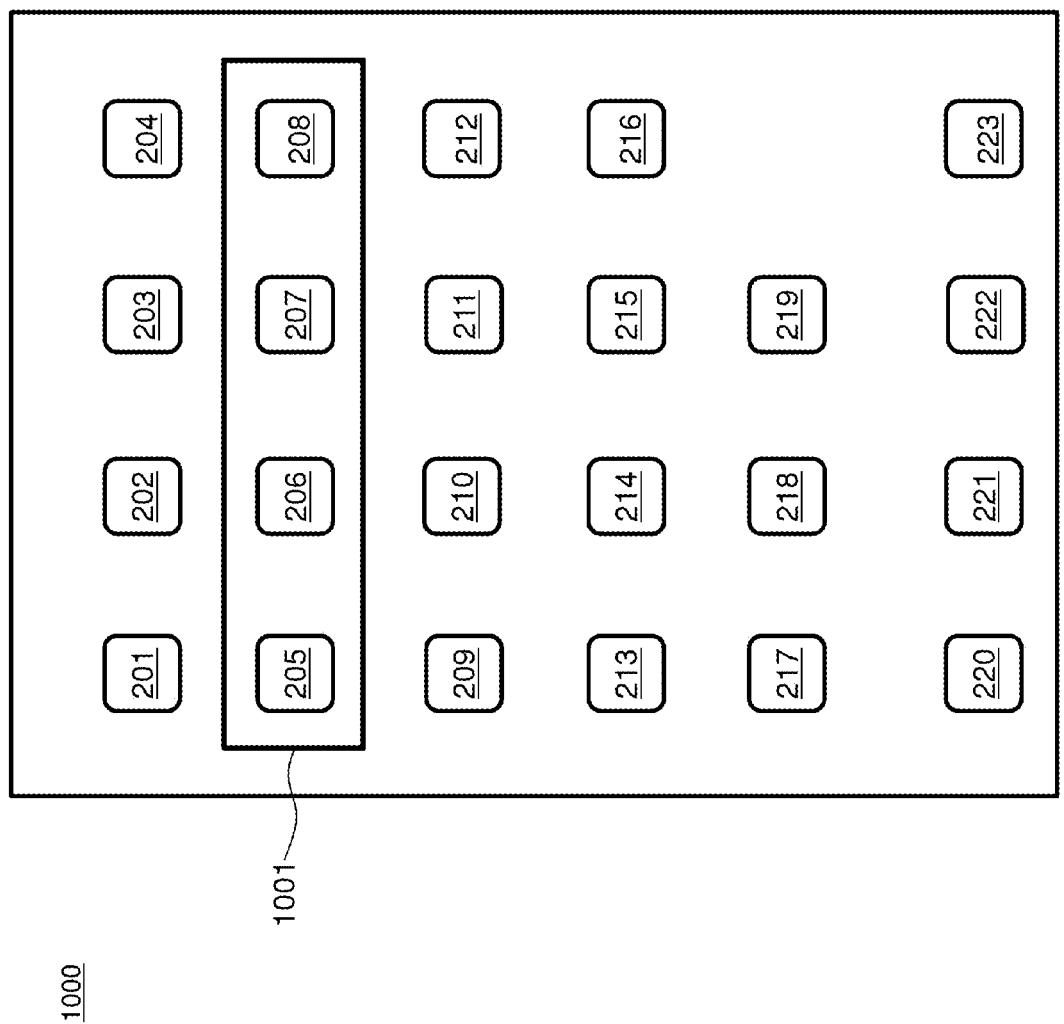
Figure 11:
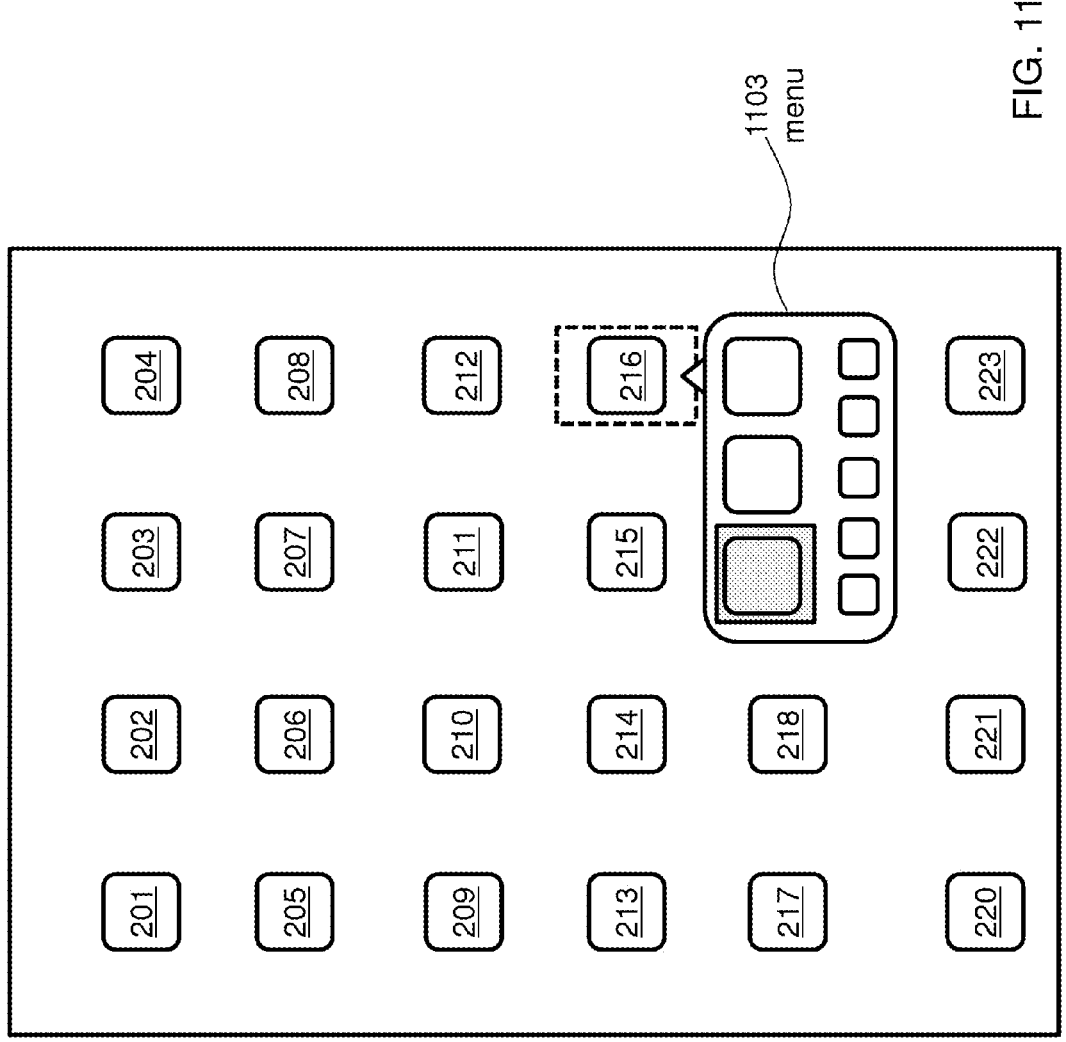

While blocks 601, 603, 605, 607, 609, and 611 allow a user to navigate down the element hierarchy, block 613 can be used to allow a user to navigate up the element hierarchy. For example, referring back to block 605 of process 600, if it was instead determined that the selected element is associated with an escape command, the process can proceed to block 613. For instance, in some examples, an element can include a sub-element associated with an escape command that can be interpreted by the computing device as an instruction to move up a level in the element hierarchy. To illustrate, FIG. 10 shows highlighting 1001 around the entirety of element 311. This highlighting can occur after each of the sub-elements (e.g., elements 205-208) within element 311 is individually highlighted. In other words, the entirety of element 311 can be thought of as a fifth sub-element (that was previously not displayed) of element 311. Thus, each of the sub-elements (e.g., elements 205-208) and the entire element 311 can be sequentially highlighted or scanned in a circular fashion. In some examples, this fifth sub-element can be associated with an escape command to allow the user to navigate up a level in the element hierarchy to scan through elements 309, 311, 313, 315, 317, and 319 again. In this example, if a selection was received at block 603 while highlighting 1001 was being displayed around element 311, the fifth sub-element associated with the escape command becomes the selected element. Thus, a positive determination can be made at block 605 and the process can proceed to block 613. Displaying the escape command as a selection of the entire element 311, as shown in FIG. 10, is a space-efficient way of displaying such a command as it does not require the display of an additional element that would clutter the user interface. However, it should be appreciated that using the entire current set of elements as the sub-element associated with the escape command is just one way of displaying the escape element. In other examples, a separate sub-element or icon (e.g., an icon with an "X," an icon with the word "Escape," etc.) associated with the escape command can similarly be included within each element to allow the user to navigate up one level in the element hierarchy.

At block 613, the previously used current set of elements can be used as the new current set of elements. The process can then return to block 601 where elements of the newly assigned current set of elements can be highlighted or scanned using blocks 601 and 603. For instance, using the examples provided above, the current set of elements can include elements 309, 311, 313, 315, 317, and 319 during the first execution of process 600. Blocks 601 and 603 can cause the elements 309, 311, 313, 315, 317, and 319 to be sequentially highlighted. In response to a selection (e.g., in response to a button press or the like) while element 311 is being highlighted, element 311 can be assigned as the new current set of elements at block 609. As a result, process 600 can cause the sub-elements of element 311 to be sequentially highlighted at blocks 601 and 603 as shown in FIG. 9. In some examples, the sequential highlighting of sub-elements can include a highlighting of the sub-element associated with an escape command, as shown in FIG. 10. In this example, if a selection is received at block 603 while highlighting 1001 was being displayed around element 311, the process can proceed to block 613, where the previously used "current set of elements" can be used as the new "current set of elements." In this example, the previously used "current set of elements" include elements 309, 311, 313, 315, 317, and 319. This has the effect of causing process 600 to again sequentially scan the elements 309, 311, 313, 315, 317, and 319, as shown in FIGS. 7 and 8.

Figure 12:
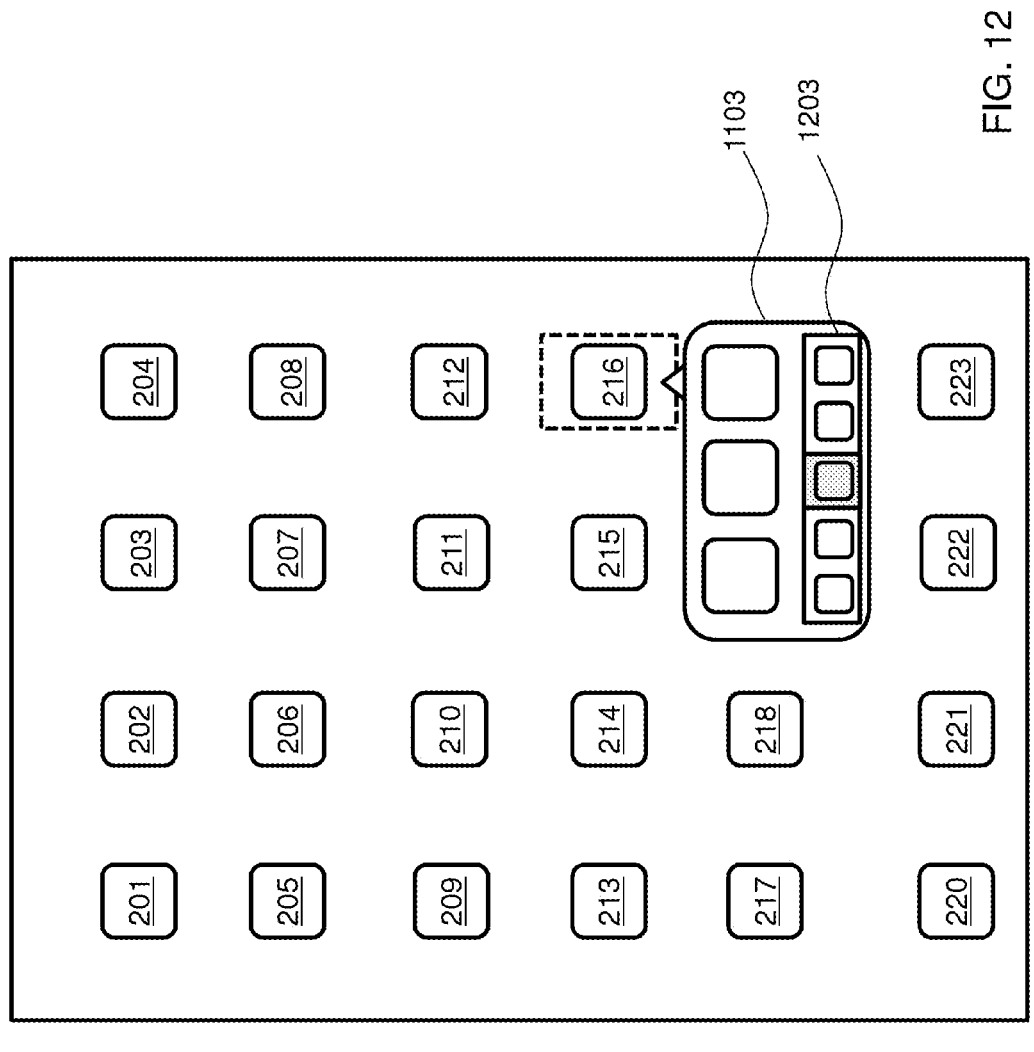

While specific examples of scanning through sets of selectable elements of an interface are provided above, it should be appreciated that numerous variations can be made. For example, as shown in interface 1100 of FIG. 11, one or more of the elements 201-223 can include sub-elements in the form of a menu of options that is only displayed in response to a selection made while scanning the particular element. In this example, a selection was received while highlighting the element 216, causing process 600 to begin scanning the elements of menu 1103 of element 216. Menu 1103 can include various options, such as "Activate," "Scroll," "Escape," press the home button, perform gestures, perform device actions, change settings, and the like. It should be appreciated that any other selectable elements can be included within menu 1103. Additionally, menu 1103 can be further divided into sub-elements (e.g., two sub-elements). The first sub-element can include the three elements in the top row, while the second sub-element can include the five elements in the bottom row of menu 1103. These elements can be scanned in a manner similar to elements 201-223 described above. For example, interface 1200 of FIG. 12 shows the scanning of the second sub-element 1203.

Figure 13:
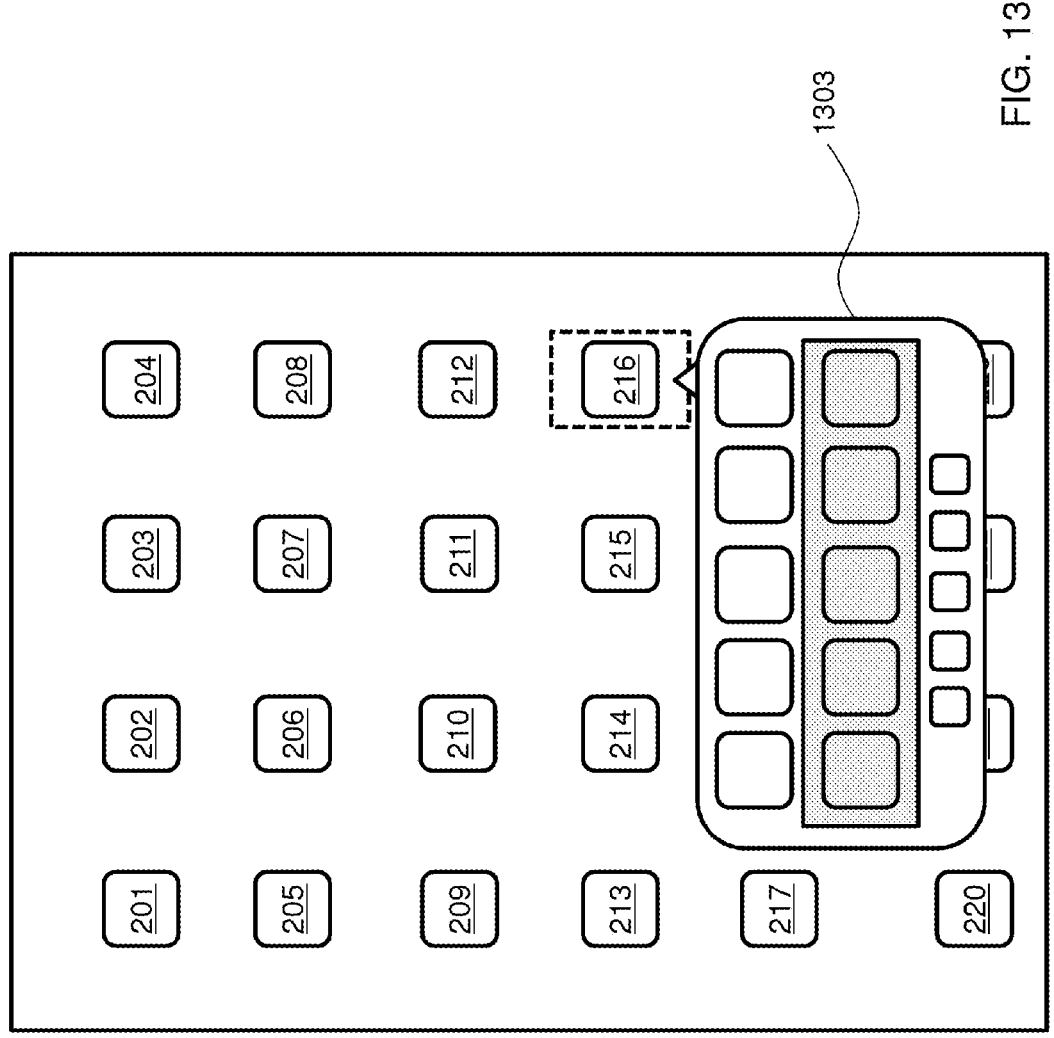

In some examples, the elements of menu 1103 can further include sub-elements of their own. For example, FIG. 13 illustrates some example sub-element menu 1303 that can be displayed and scanned in response to a selection of a selectable element of menu 1103. In one example, menu 1303 can be a "perform device actions" menu and can include various device actions, such as decreasing the volume, increasing the volume, shaking, taking a screenshot, or simulate the physical activation of any other button or toggle on the device. These elements can be scanned in a manner similar to elements 201-223 and elements in menu 1103, as described above.

Figure 14:
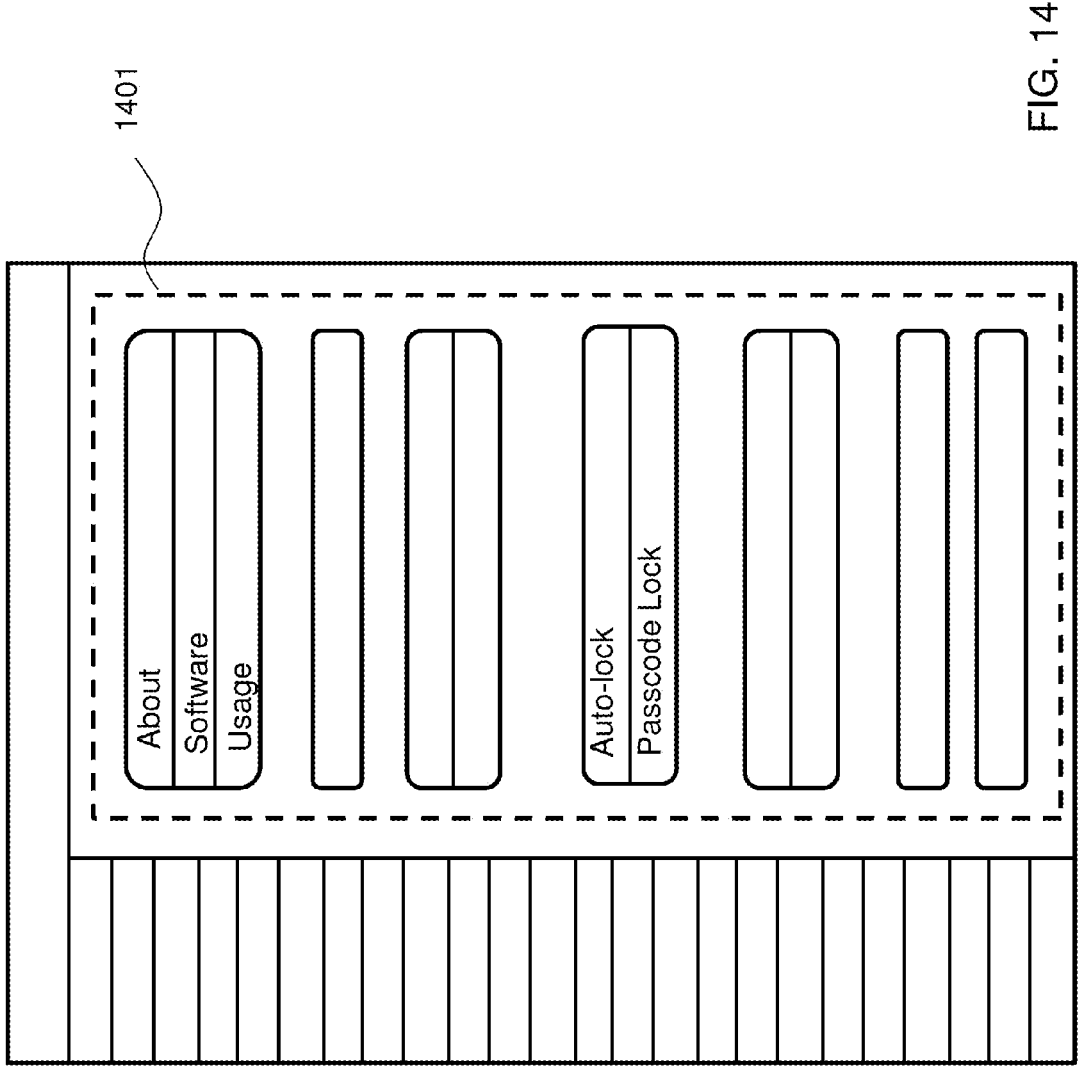
Figure 15:
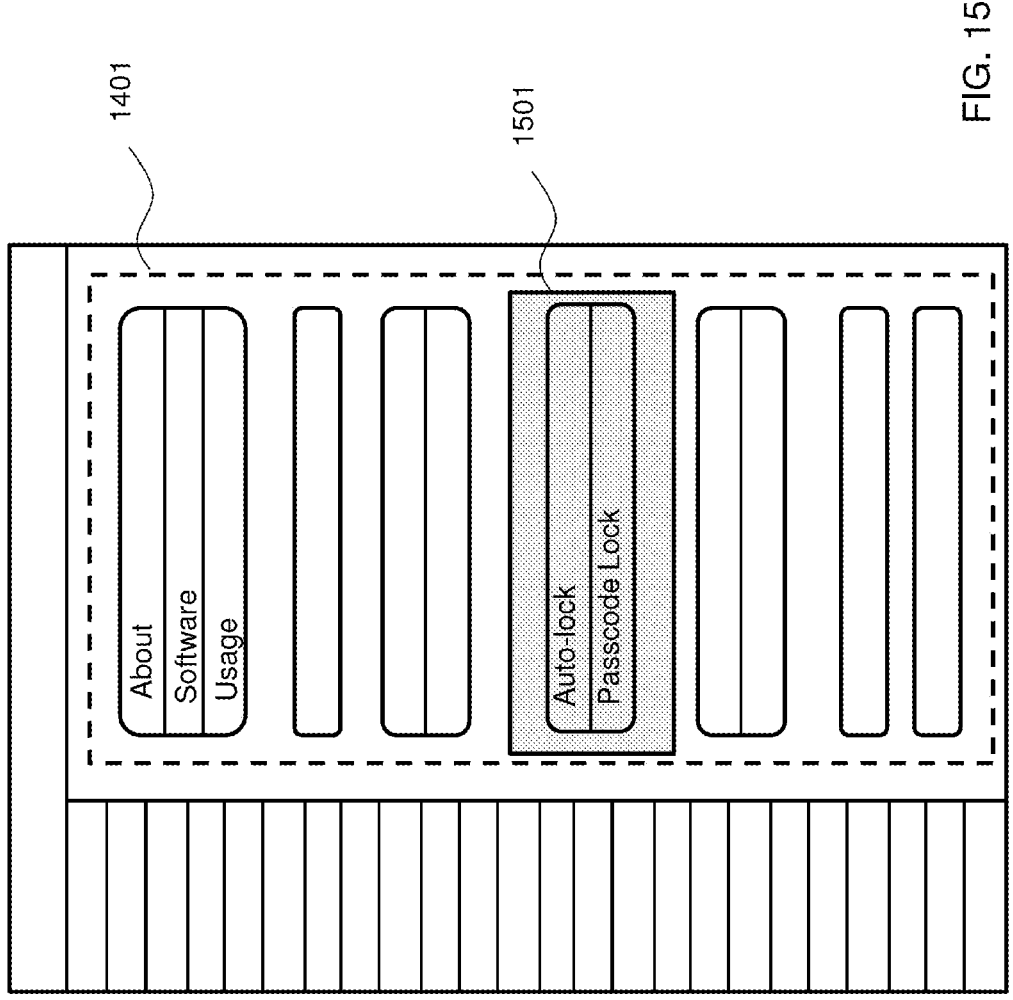
Figure 16:
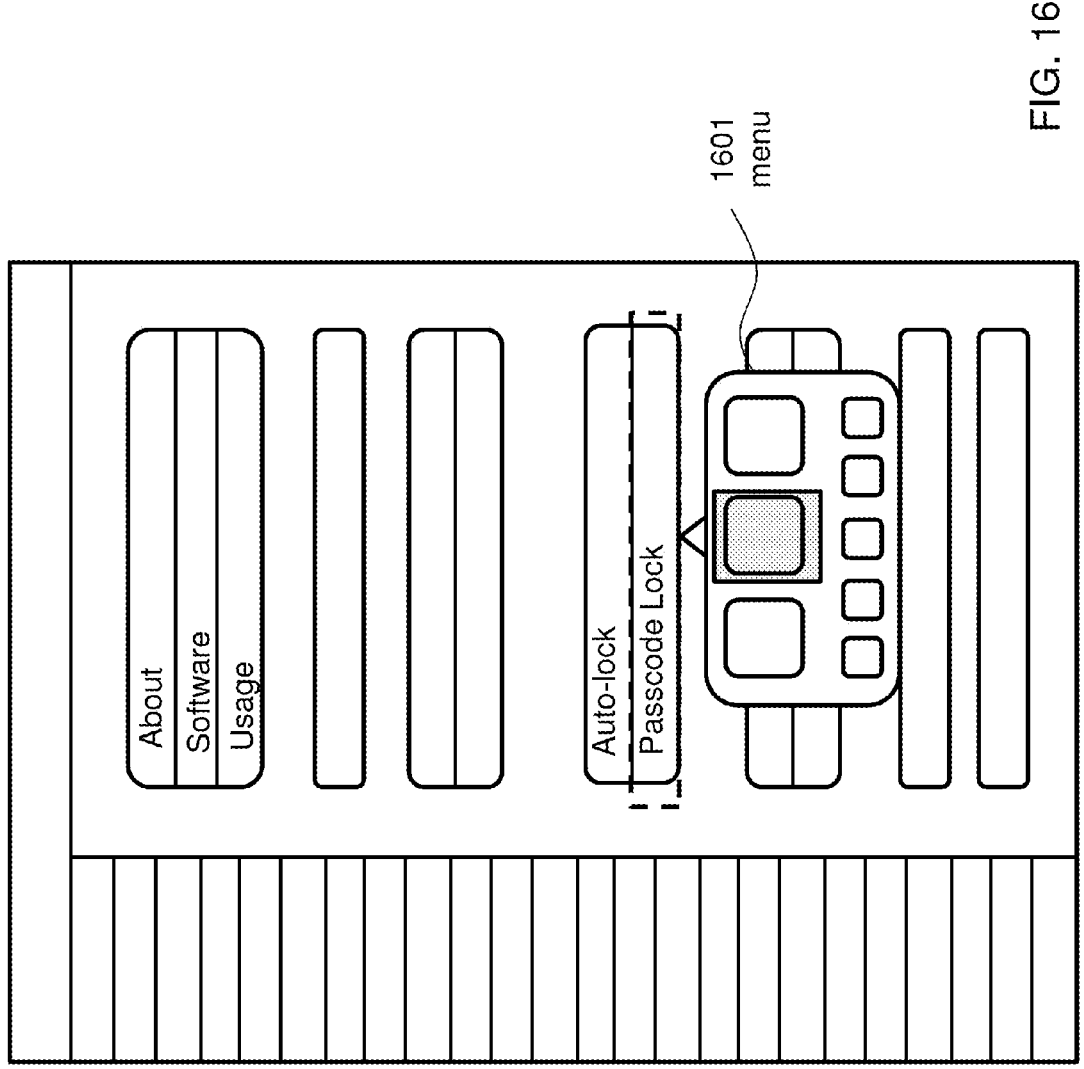
Figure 17:
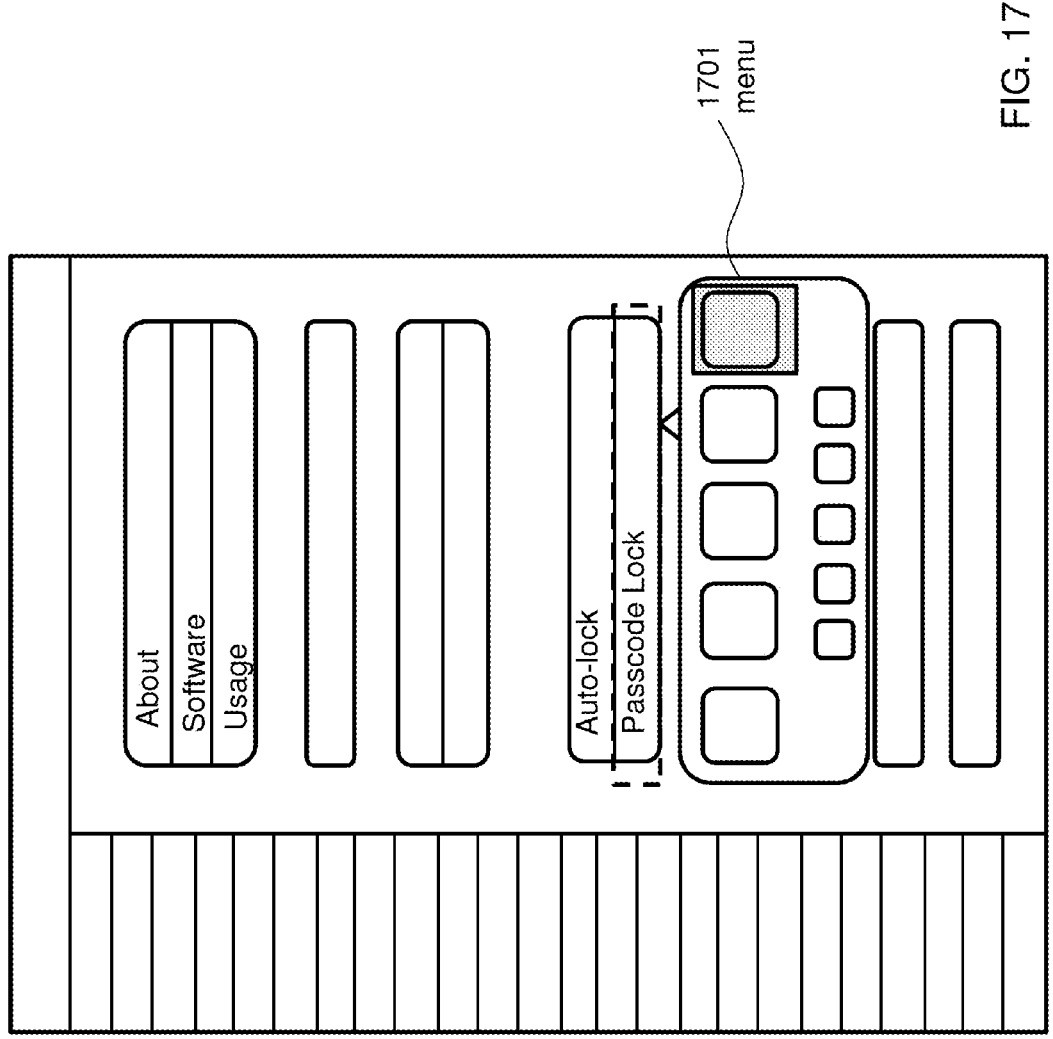
Figure 18:
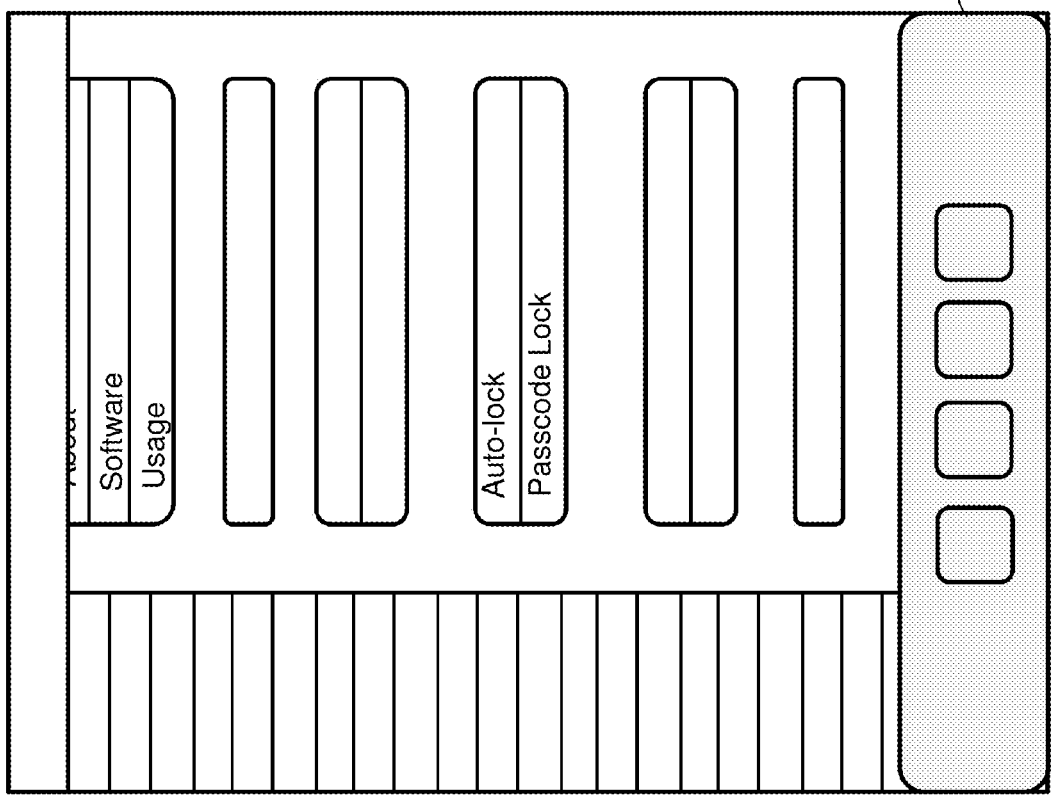
Figure 19:
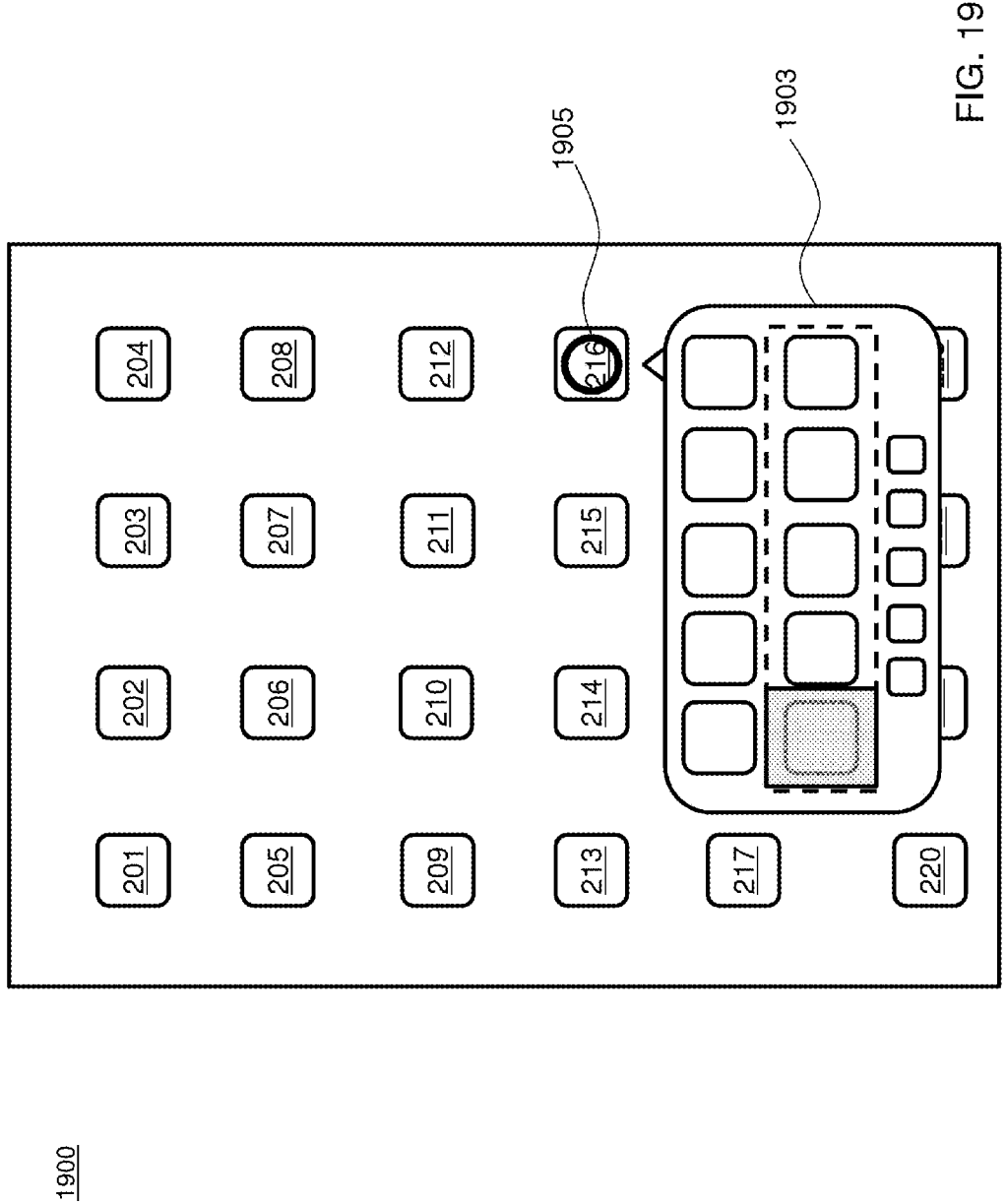

FIG. 14 illustrates another exemplary interface 1400 that can be scanned using process 600, described above. In this example, an element 1401 can include sub-elements grouped in any desired manner. For example, each physically grouped set of elements (e.g., "About," "Software Update," and "Usage") can be grouped together as a sub-element of element 1401. Each of these sub-elements can be scanned using process 600 as shown in interface 1500 of FIG. 15. In this illustrated example, sub-element 1501 is currently being highlighted. In response to a selection while sub-element 1501 is highlighted, the sub-elements within 1501 (e.g., "Auto-Lock" and "Passcode Lock") can be scanned. As shown in interface 1600 of FIG. 16, in response to a selection while the "Passcode Lock" element is highlighted, a menu 1601 similar to that shown in FIGS. 11 and 12 can be displayed and scanned.

In some examples, menu 1601 can include a "Scroll" selectable element. In response to a selection received while the "Scroll" selectable element is highlighted, a scroll menu 1701, shown in interface 1700 of FIG. 17, can be displayed having various selectable elements. These elements can be scanned using process 600, allowing a user to scroll down, scroll up, scroll right, scroll left, auto scroll, scroll to the top edge, scroll to the bottom edge, scroll to the left edge, or scroll to the right edge.

For example, the "auto scroll" function associated with the "auto scroll" element can be provided to help the user easily read content that is in a scroll area (e.g., vertical or any other direction), a common occurrence in documents, webpages, and other textual content. This function can cause the content displayed within the user interface to scroll at a smooth, continuous pace to allow the user to read long-form documents without having to manually scroll the content. Thus, in response to a selection received while highlighting the "auto scroll" element, a second scroll menu 1801, shown in interface 1800 of FIG. 18, can be displayed at the bottom of the user interface away from the content the user is attempting to read. The elements of scroll menu 1801 can be scanned using process 600. In one example, scroll menu 1801 can be scanned a threshold number of times (e.g., 1, 2, 3, or more) before being removed from the interface. In response to a user input (e.g., received by input device 104), scroll menu 1801 can be displayed and scanned again. In some examples, the elements in scroll menu 1801 can allow the user to increase/decrease the auto scrolling speed, pause it, scroll to the top edge, scroll to the bottom edge, scroll to the left edge, or scroll to the right edge.

As mentioned above, process 600 can be used to perform gestures. In response to a selection of a gesture element (e.g., one of the elements in menu 1203), gesture menu 1903 shown in interface 1900 of FIG. 19 can be displayed. Gesture menu 1903 can include various selectable elements corresponding to different gestures that can be performed. These selectable elements can be scanned using process 600, allowing a user to perform gestures, such as tap, flick, pinch, pan, tap and hold, double tap, drag, freehand gesture, or adjust the number of fingers used to perform the gesture. An indicator 1905 can be displayed showing where the gesture can be performed. In this example, the empty circle used as indicator 1905 indicates that no selection is currently being made at the gesture location (e.g., a virtual finger is not held down on the display or a mouse button is not depressed).

Figure 20:
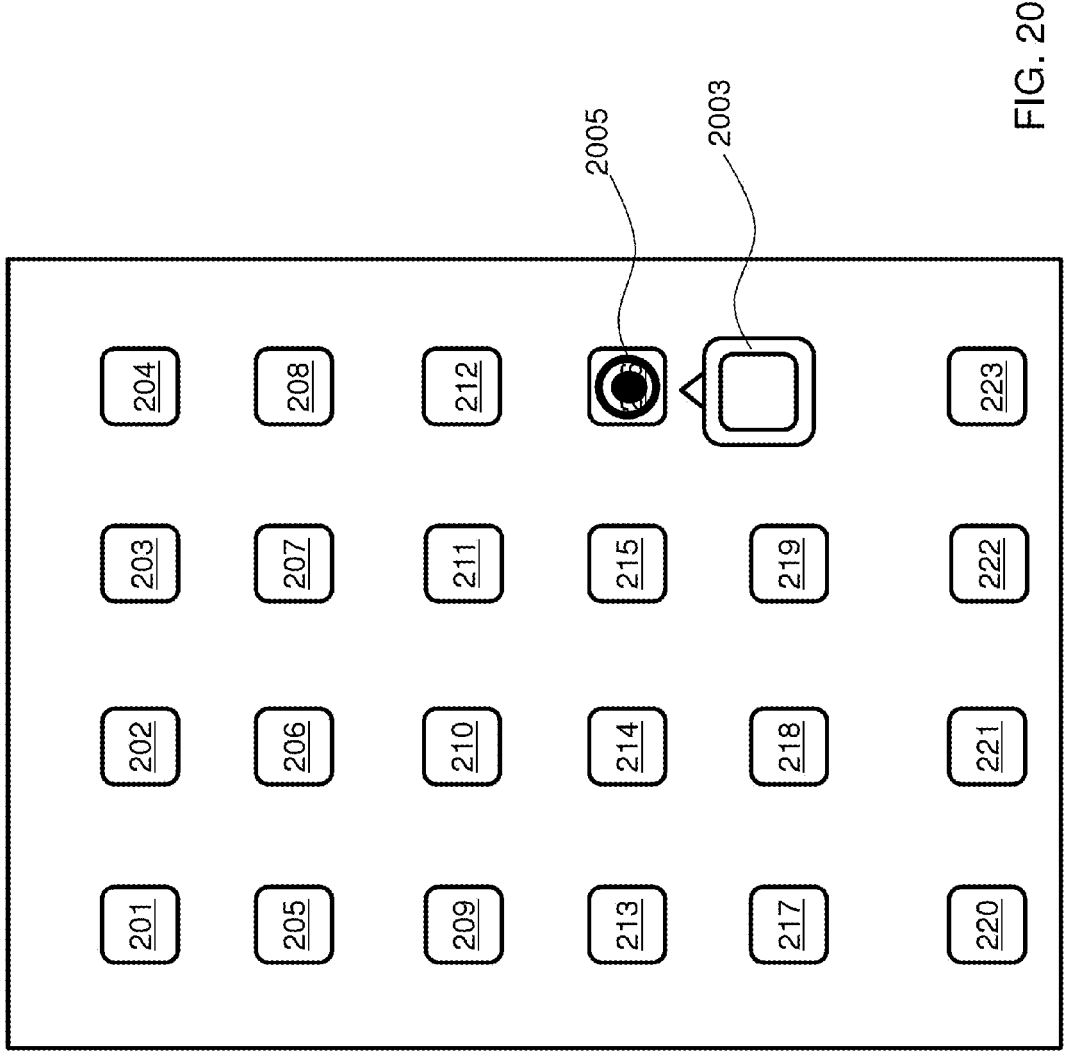

In response to a selection while a "Tap and Hold" selectable element is highlighted, interface 2000 shown in FIG. 20 can be displayed. In this interface, the selectable elements (201-223) can be wiggling, indicating that the user can move them using a hold and drag gesture. In this example, a "Stop" selectable element 2003 can displayed and scanned using process 600. The previously displayed indicator 1905 can be replaced with indicator 2005 signifying that a virtual finger is being held down on the display (or a mouse button is being depressed with the mouse pointer at the location of indicator 2005).

Figure 21:
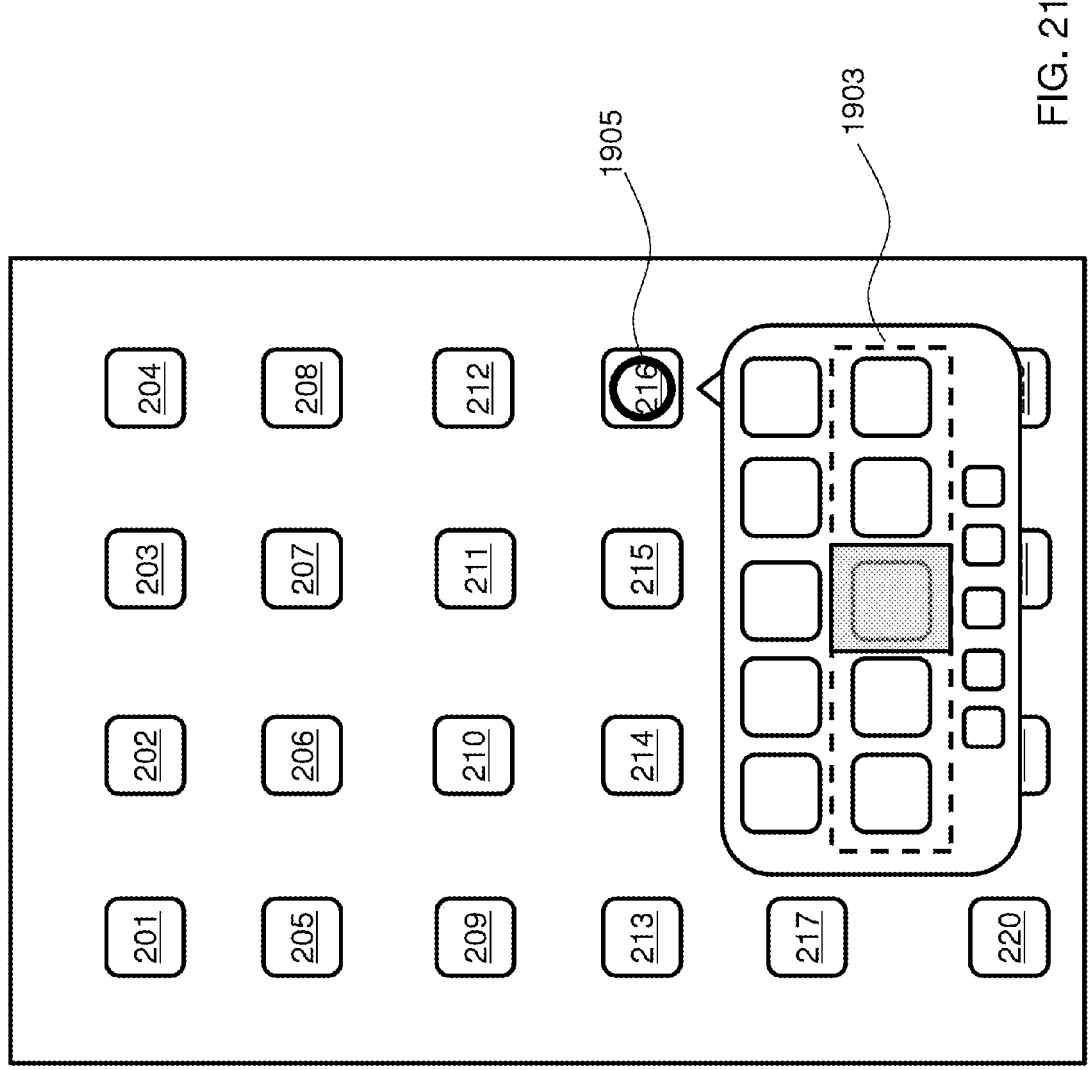

In response to a selection while the "Stop" selectable element 2003 is highlighted, interface 2100 shown in FIG. 21 can be displayed. Interface 2100 can include gesture menu 1903 and can be similar to interface 1900, except the elements 201-223 in interface 2100 can be wiggling due to the previously performed "Tap and Hold" gesture. As shown in FIG. 21, indicator 1905 can again be displayed since the virtual finger has been removed from the display (or mouse button is no longer depressed).

Figure 22:
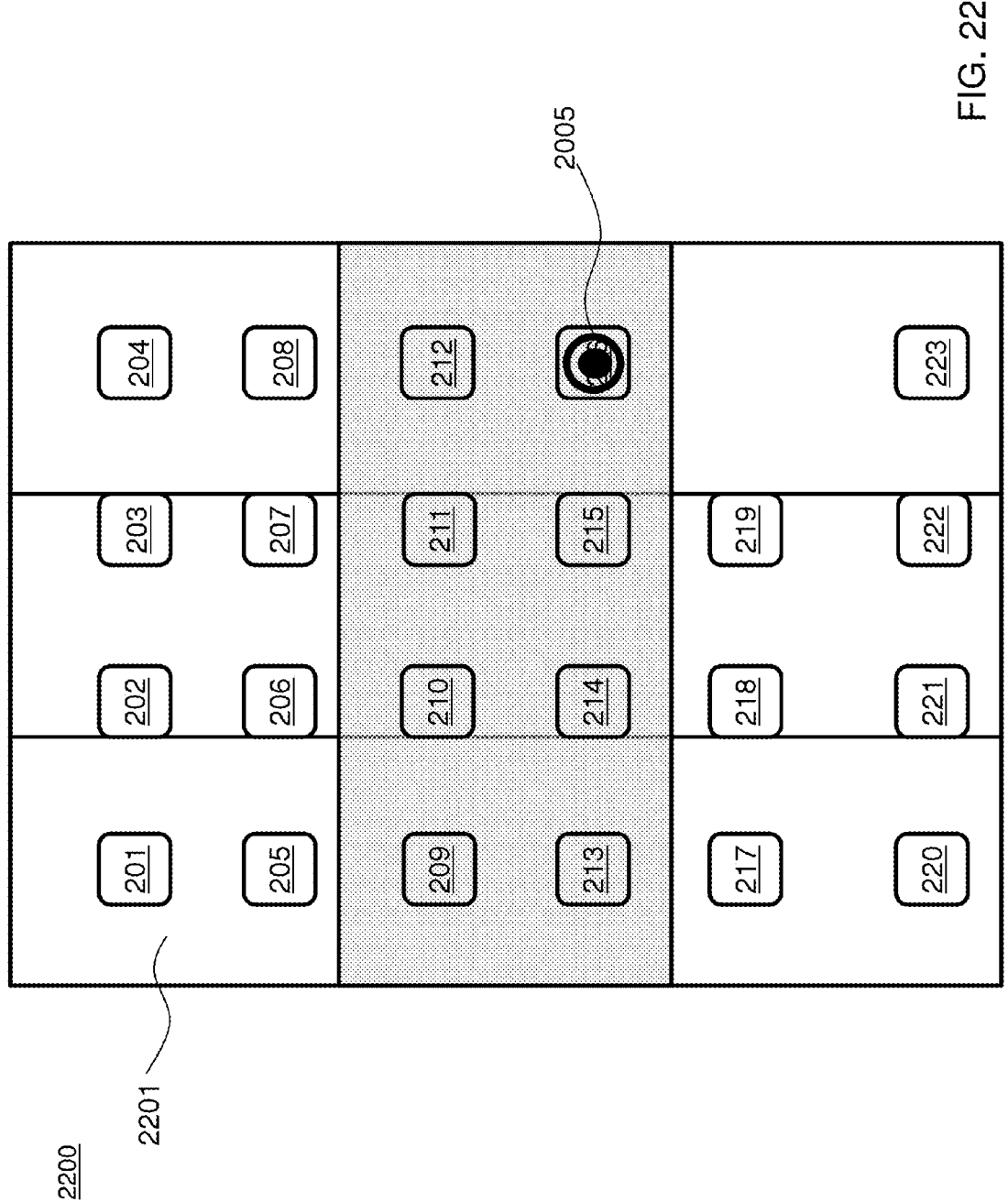
Figure 23:
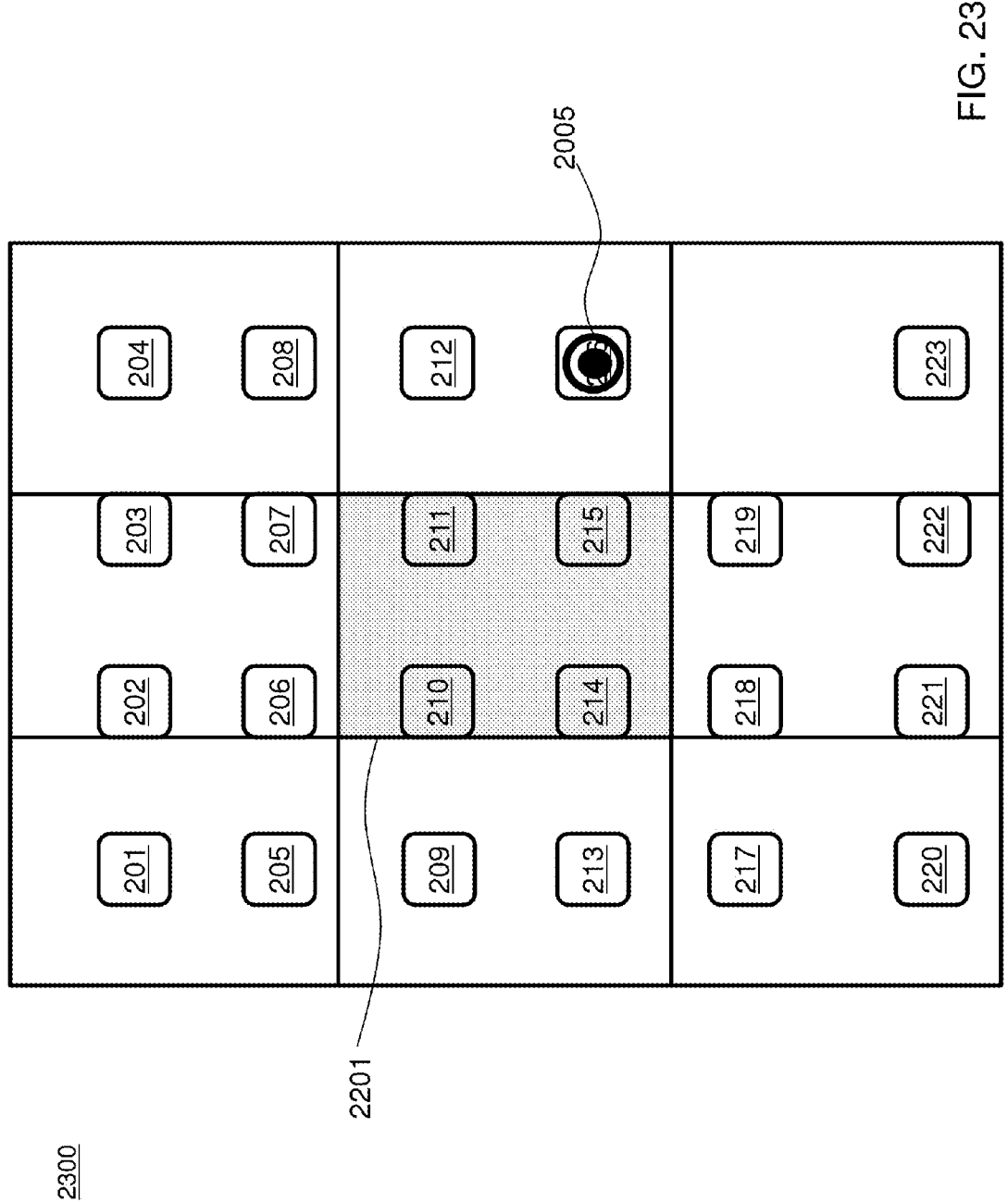

In response to a selection of a "Drag" selectable element, interface 2200 of FIG. 22 can be displayed to allow a selection of the destination of the "Drag" operation. In this example, interface 2200 can be been divided into one or more sections 2201 (e.g., nine sections). These sections can be formed using process 500, with the sections 2201 being the plurality of elements defined at block 501. These sections 2201 can be scanned using process 600 in a manner similar to that applied to elements 201-223 of the user interface described above. For example, the elements or sections corresponding to the highest level of the hierarchy can be the three rows of sections 2201. These three rows of sections 2201 can be divided into sub-elements corresponding to each section 2201. Thus, rows of sections 2201 can be scanned and in response to a selection of a row, sections 2201 within a row can be scanned using process 600, as shown in interfaces 2200 and 2300 of FIGS. 22 and 23, respectively.

In some examples, scanning of interface 2200 can begin by displaying the sections 2201 (e.g., nine sections) overlaid on the user interface. Additionally, a selection indicator (e.g., crosshair) can be displayed within the center of the grid formed by sections 2201 (at the center of the center section 2201). The crosshair can be highlighted, allowing a user to make a selection of the crosshair. If no selection is made (or the user inputs a command to scan to the next element), the crosshair can be removed from the display and the rows of sections 2201 can be scanned (e.g., top row, middle row, then bottom row). If no selection is made while highlighting a row (or the user inputs a command to scan to the next element), the selection indicator can again be displayed and highlighted. This scanning rotation can be performed until a selection is made.

Figure 25:
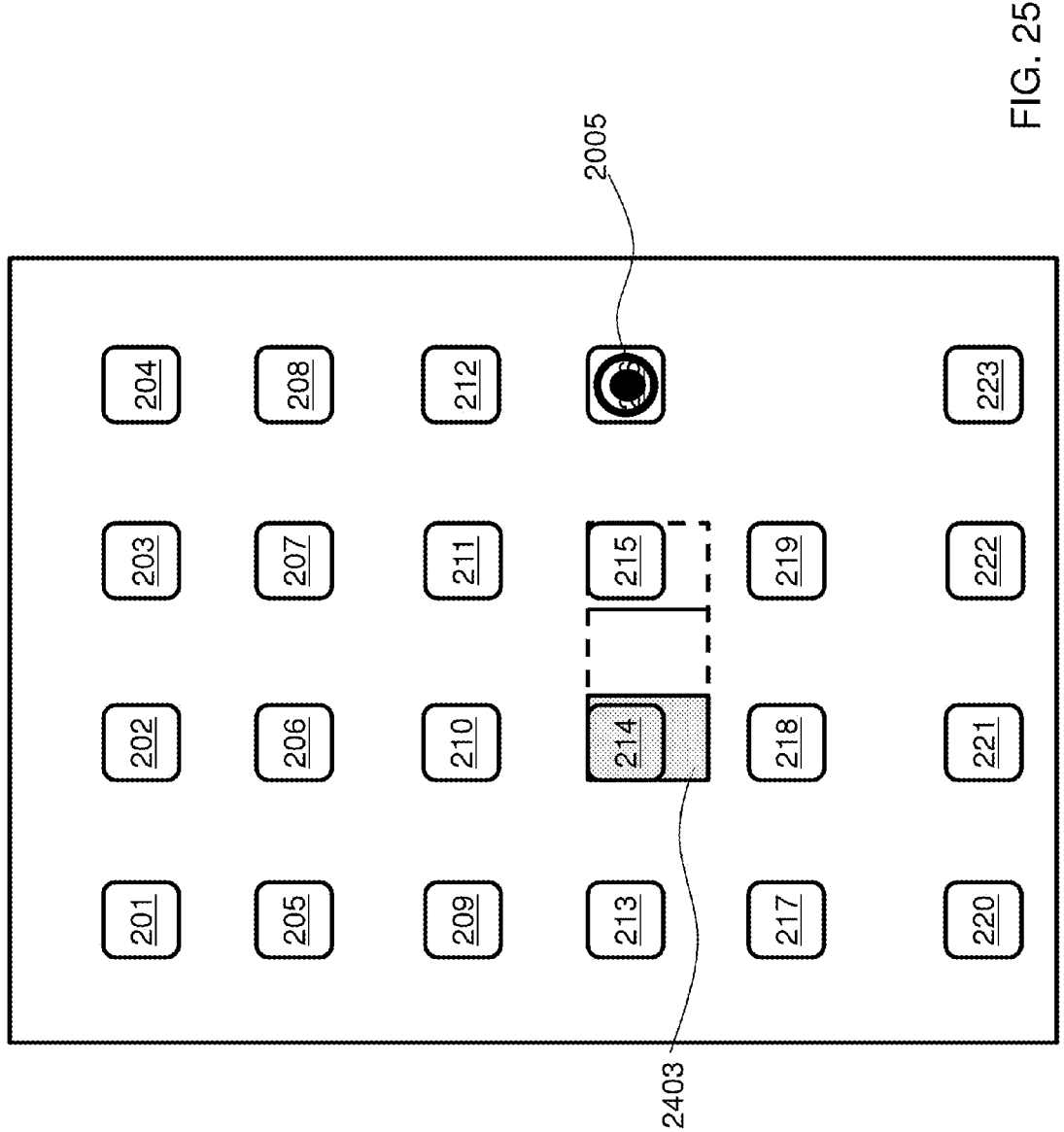
Figure 26:
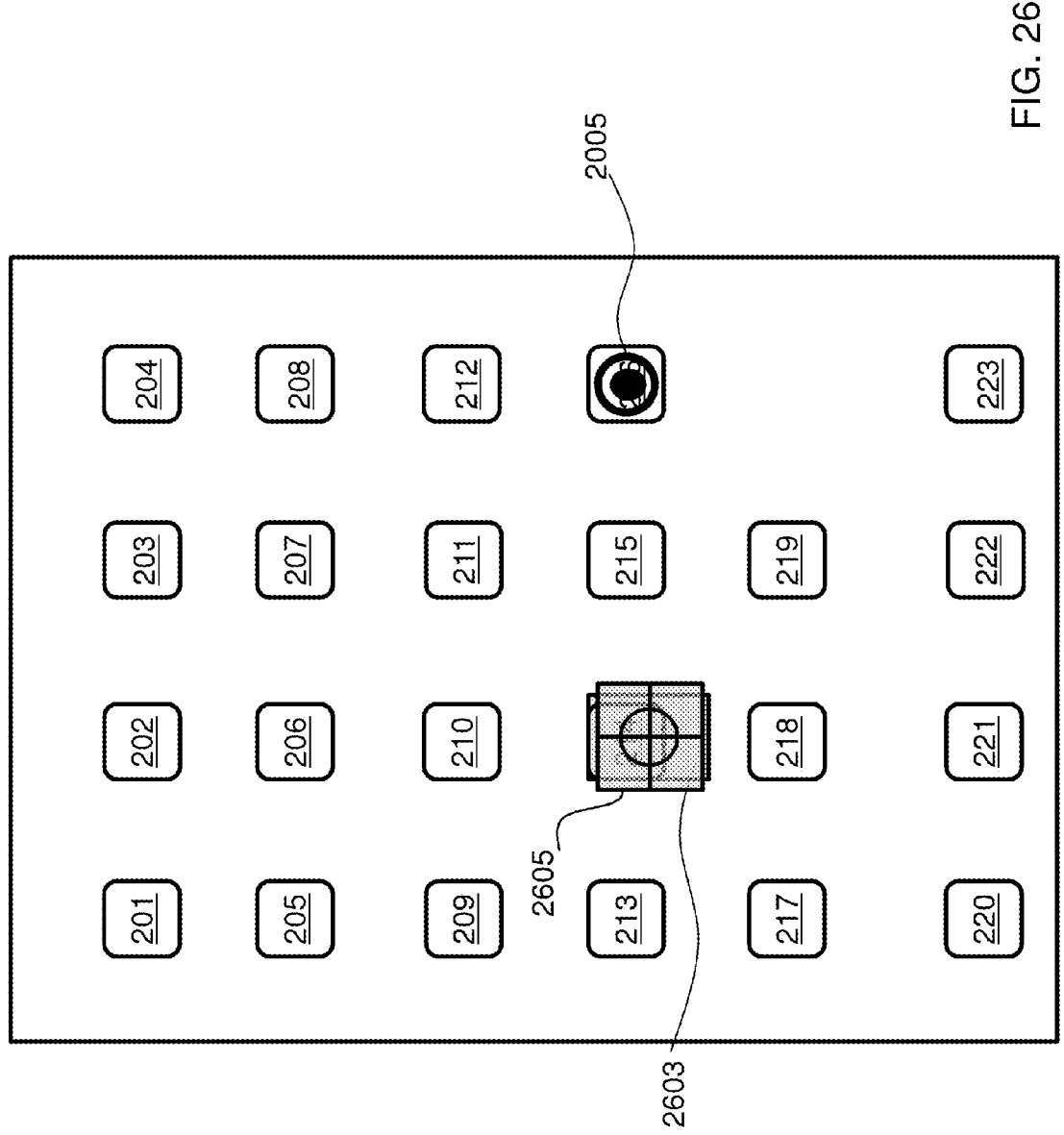

In some examples, in response to a selection of a row of sections 2201, a selection indicator can be displayed within the center of the row of sections 2201 (at the center of the center section 2201). The crosshair can be highlighted, allowing a user to make a selection of the crosshair. If no selection is made (or the user inputs a command to scan to the next element), the crosshair can be removed from the display and the sections 2201 within the row can be scanned (e.g., left section 2201, middle section 2201, right section 2201, then the entire row to provide a cancel command). If no selection is made while highlighting a section 2201 (or the user inputs a command to scan to the next element), the selection indicator can again be displayed and highlighted. This scanning rotation can be performed until a selection is made. In this example, the grid for the nine sections 2201 is still displayed after a selection of a row. In other examples, only the selected row may be displayed (e.g., as shown in FIG. 25 where only the row of selected subsections 2403 is displayed).

Figure 24:
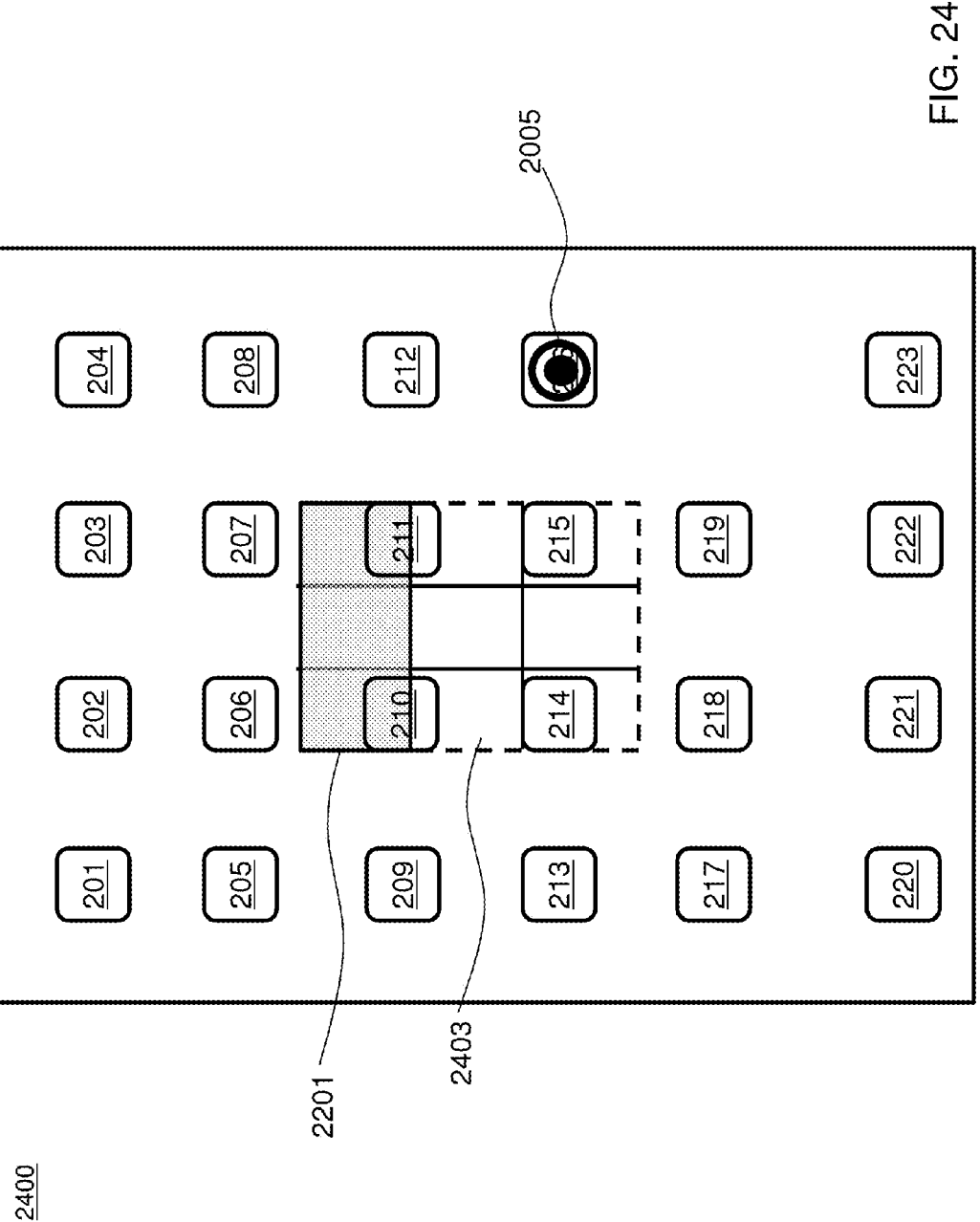

In some examples, in response to a selection of a section 2201, section 2201 can be further divided into one or more (e.g., nine) sub-elements or subsections 2403, as shown in interface 2400 of FIG. 24. These subsections 2403 can be scanned in a manner similar to that described above for sections 2201 of interface 2200, as shown in interfaces 2400, 2500, and 2600 of FIGS. 24, 25, and 26, respectively. This subdivision of sections can be performed any desired number of times until a desired element can be selected. However, in some examples, a minimum subsection size can be imposed. In some examples, when the size of the subsections fall below a threshold size, a magnifying loupe can be displayed to allow the user to see the elements being selected.

During the grid scanning described above, if a selection is received while displaying and highlighting the selection indicator (e.g., crosshair 2605 in interface 2600), the selection can be interpreted as a selection (e.g., mouse click or finger press) made at the center of the indicator.

Figure 27:
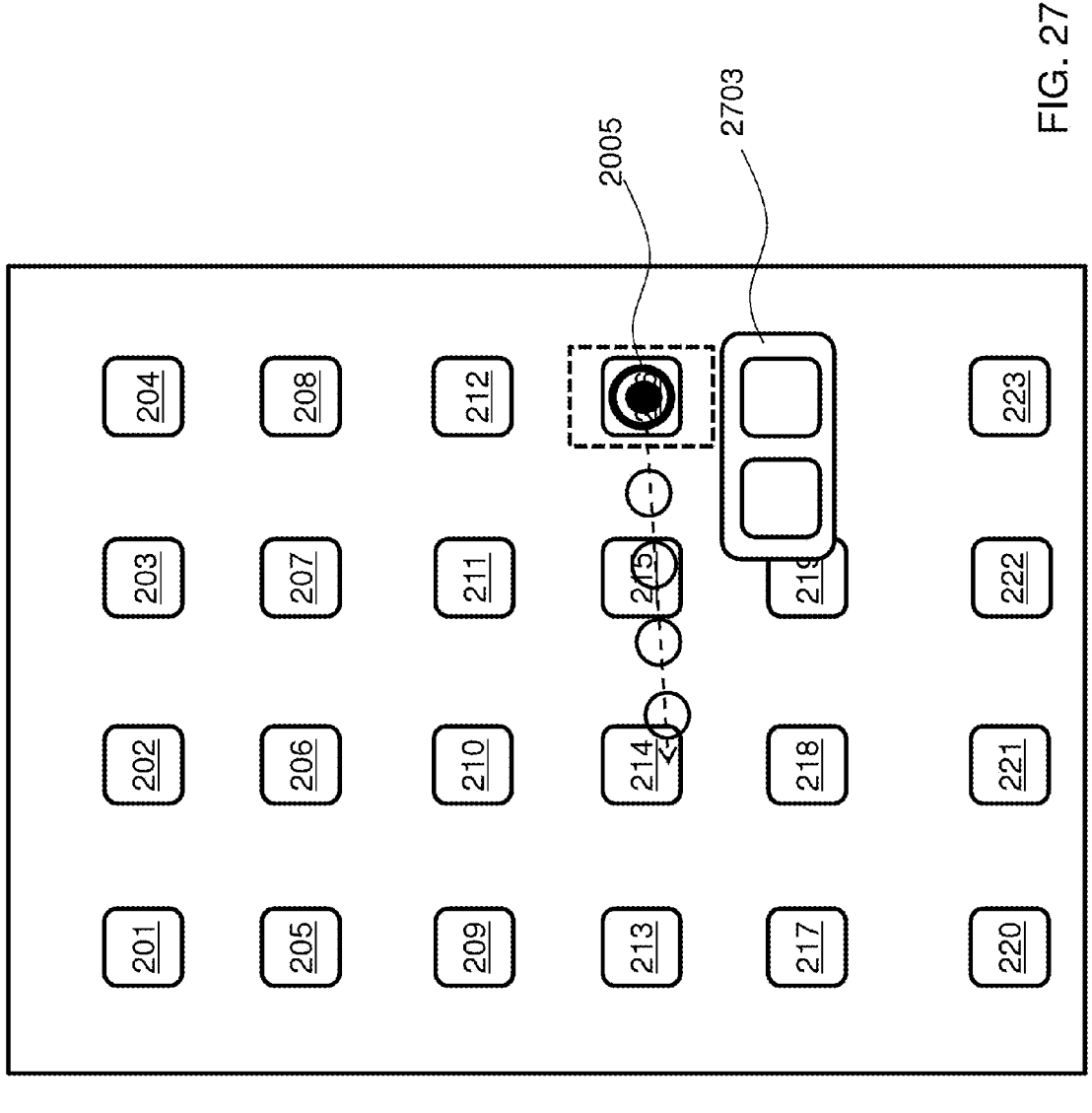

In response to a selection made while displaying a selection indicator, menu 2703 of interface 2700 shown in FIG. 27 can be displayed. Menu 2703 can include various selectable option elements, such as "Drag" and "Cancel," allowing the user to drag element 216 to the selected location or cancel the drag operation.

Figure 28:
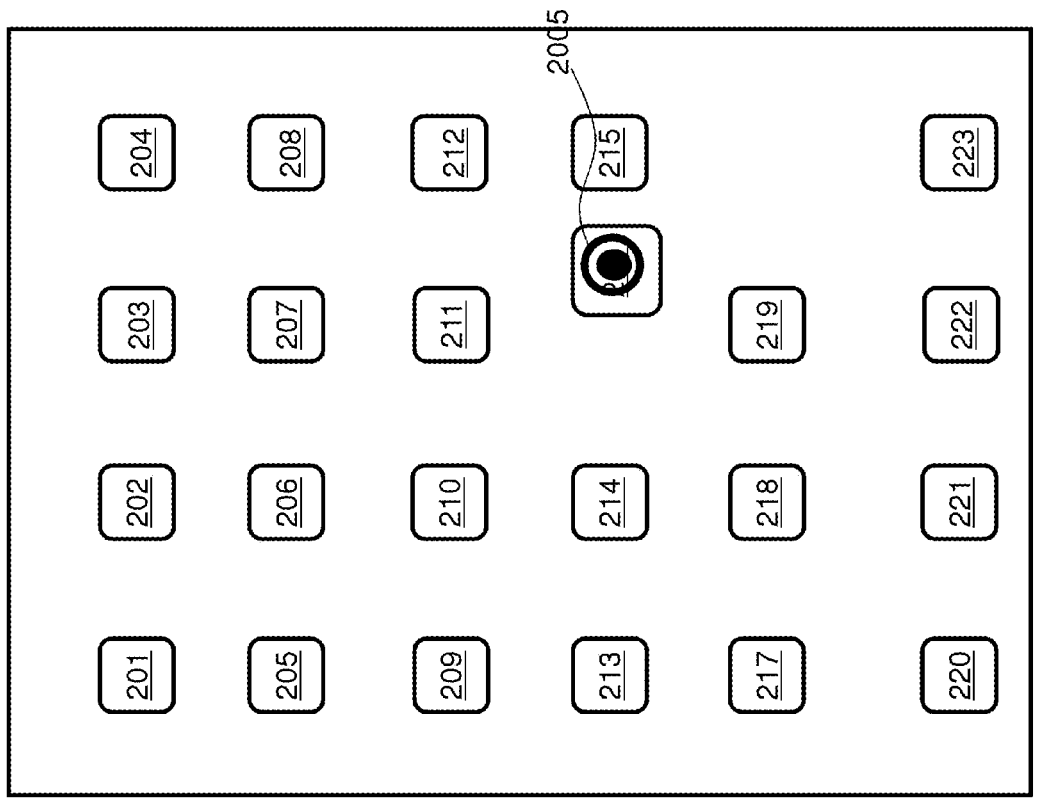
Figure 29:
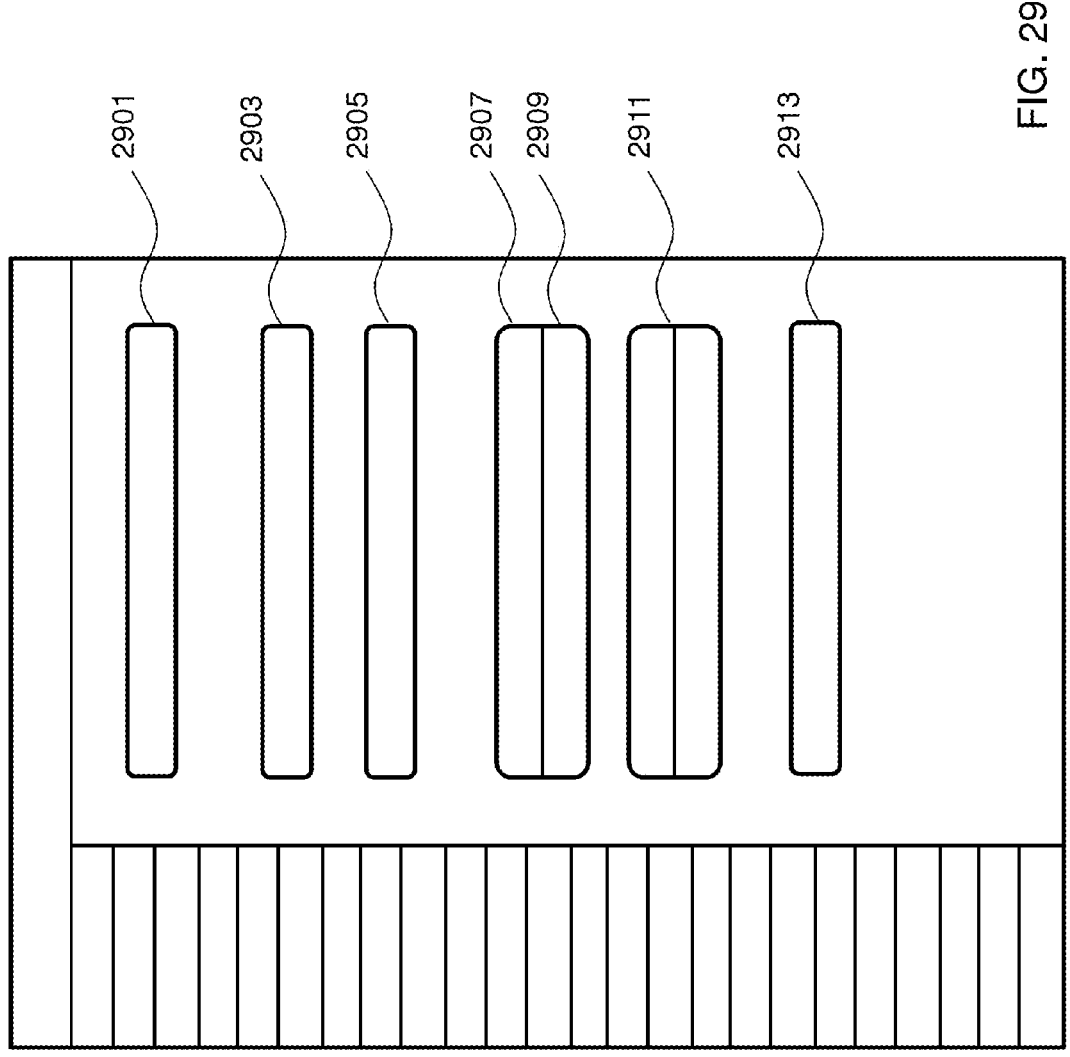

In response to a selection of a "Drag" selectable element, interface 2800 shown in FIG. 28 can be displayed. As shown, element 216 is being dragged to the destination selected in FIG. 26 and element 215 has been moved to the previous location of element 216.

In some examples, a scanning settings menu can be provided to the user to customize the scanning performed using process 600. For example, a settings interface 2900 shown in FIG. 29 can include option 2901 to enable or disable the scanning feature, option 2903 to adjust the number of switches or input devices (e.g., input device 104) being used, option 2905 to enable or disable auto scanning (e.g., switch between manual or automatic scanning), option 2907 to adjust the scanning speed (e.g., threshold length of time that block 605 is performed in automatic scanning mode), option 2909 for selecting how many scanning cycles are performed through the elements of a set of elements, option 2911 for selecting the type of scanning (e.g., element scanning, such as that shown in FIGS. 7-21 and 27-28, or grid scanning, such as that shown in FIGS. 22-26), and option 2913 to enable or disable grouping of elements (e.g., enabling or disabling block 503 of process 500). In some examples, the computing device can have a default grouping criteria that is used when performing block 503 of process 500. For example, the device can group elements based on location. In other examples, a user can program the computing device to use desired grouping criteria when performing block 503 of process 500. In yet other examples, the user can manually group the elements of an interface using, for example, a GUI application that allows the used to define which elements are to be grouped together.

Figure 30:
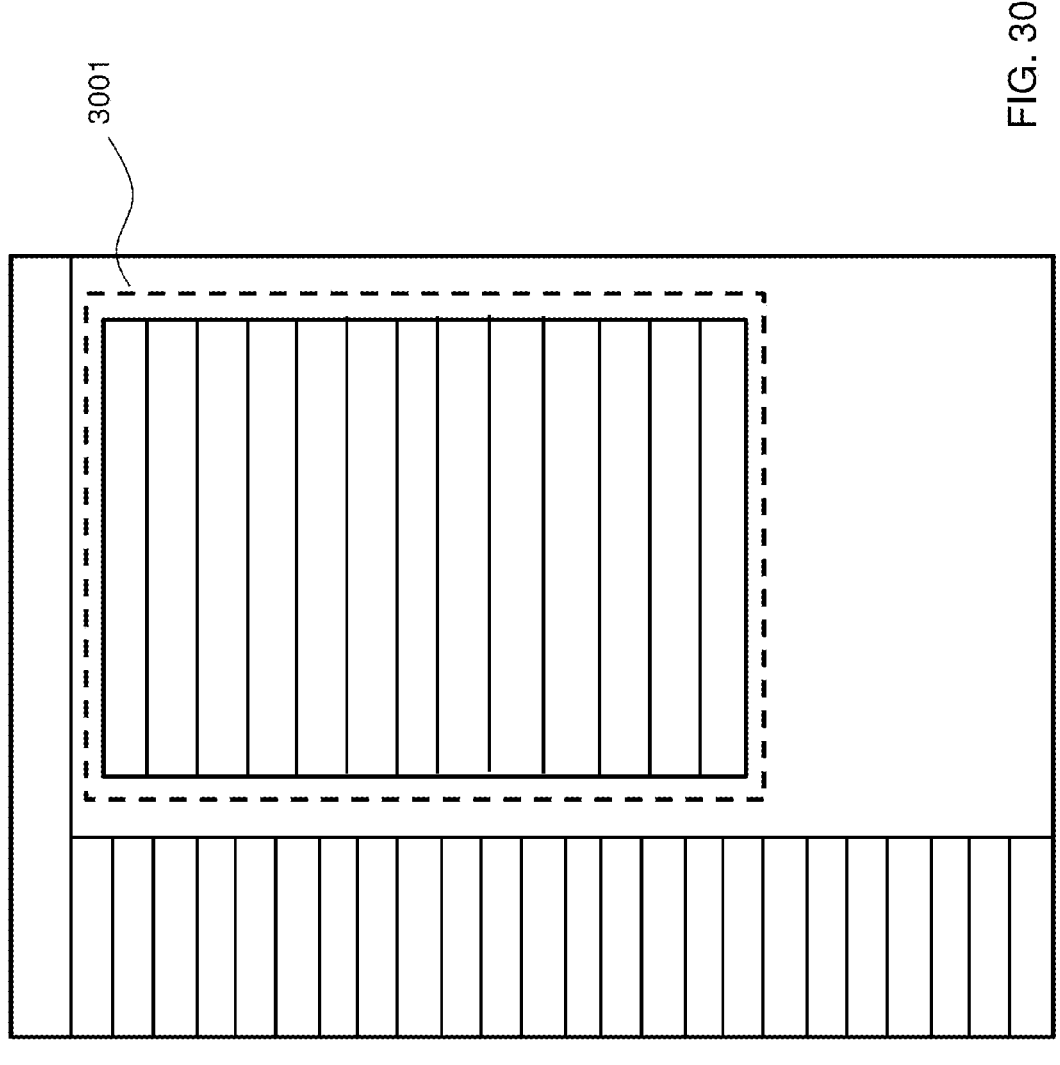

FIG. 30 illustrates an exemplary settings interface 3000 for assigning switches to different actions. For example, selection of any of the options 3001 can cause a prompt to the user instructing the user to activate an input (e.g., press a button or switch on an input device) to be assigned to the action corresponding to the selection option 3001. As a result, whenever the particular input is activated, the corresponding action can be performed. This can be a useful feature when the input device used includes more than one button or switch. Options 3001 can include various options, such as activate an item, open a notification center, open scanning settings menu, increase volume, stop scanning, move to the next element, home button, etc.

Figure 31:
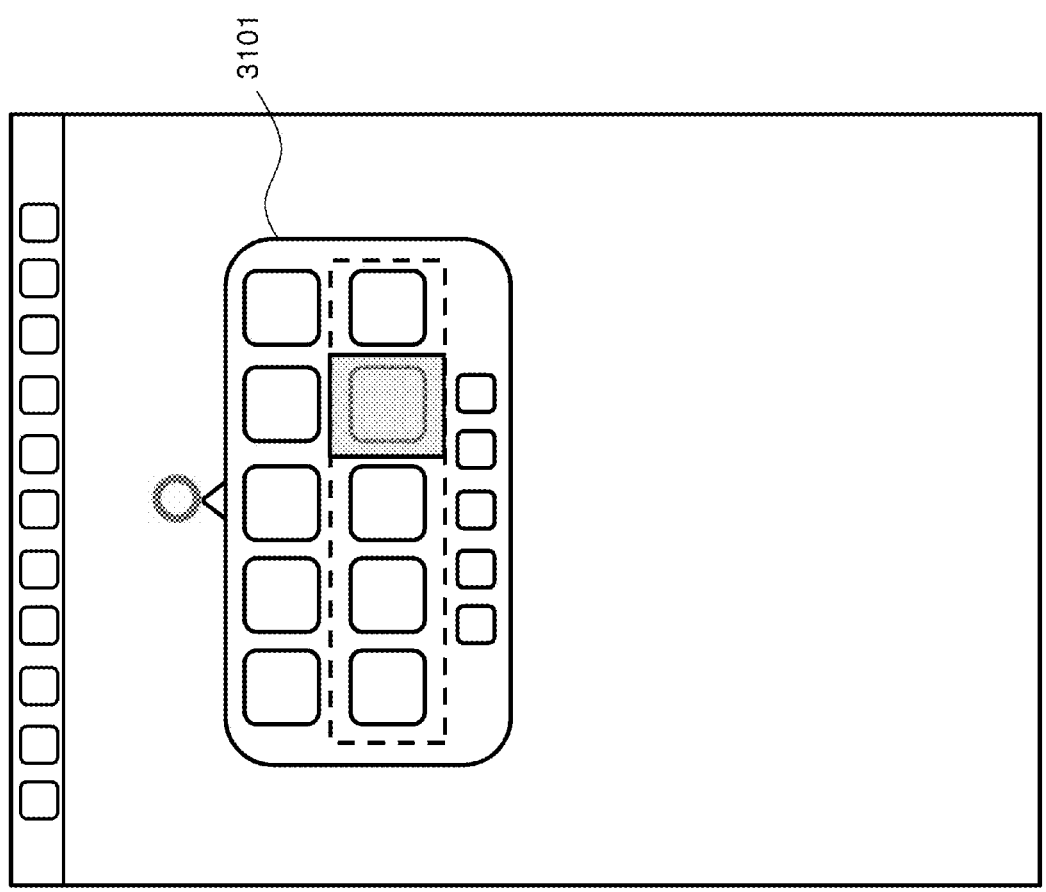
Figure 32:
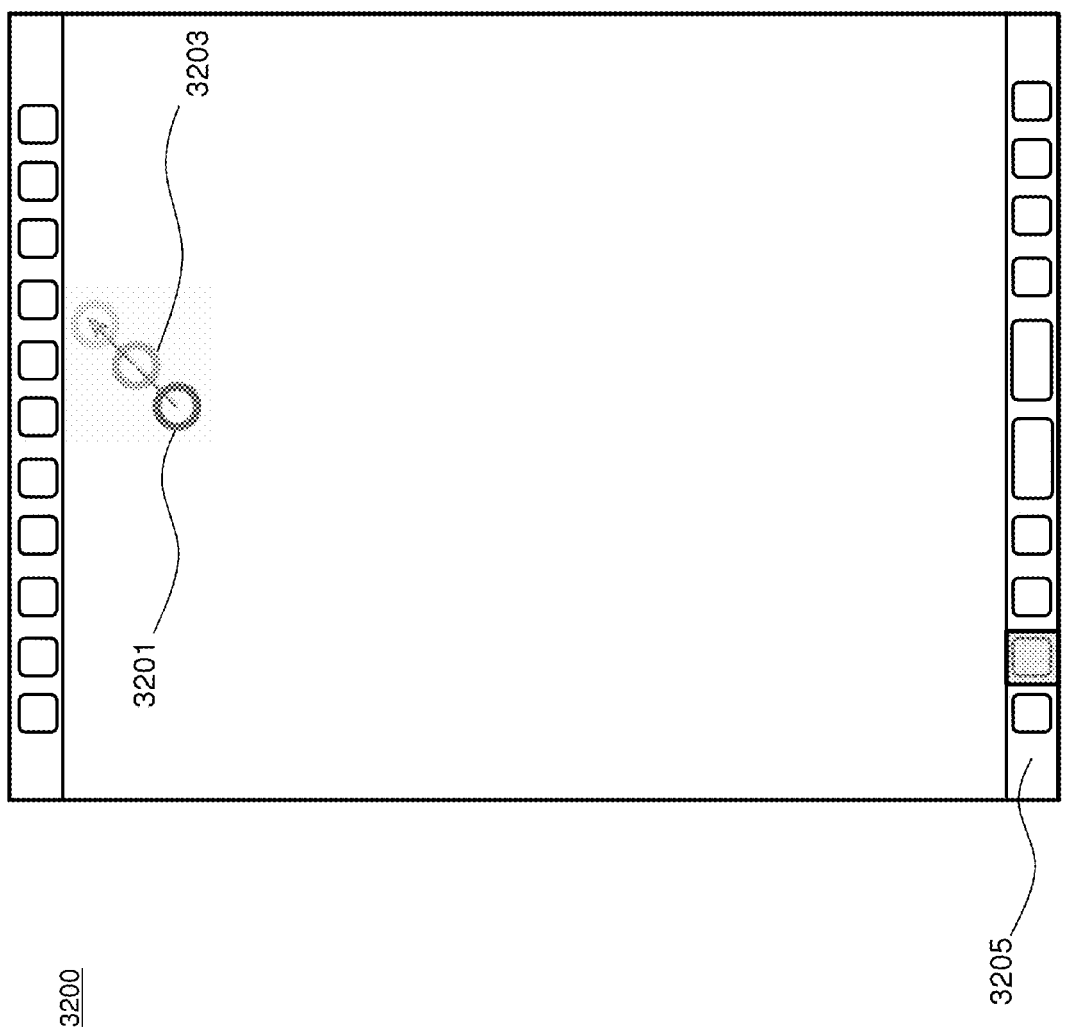

FIG. 31 illustrates an exemplary interface 3100 that illustrates the operation of process 600 to perform freehand gestures. Interface 3100 includes menu 3101 containing various selectable gesture elements. In response to a selection made while a "Freehand" selectable element is highlighted, interface 3200 shown in FIG. 32 can be displayed. Interface 3200 can include indicator 3201 identifying the starting location of the freehand gesture and a pointing vector 3203 identifying the direction that the freehand motion will move. In this example, the hollow circle used for indicator 3201 indicates that the virtual finger or pen is not being applied to the surface of the display. Interface 3200 can further include options 3205 that can be scanned using process 600. These options can include any type of options, such as draw, rotate, draw curve, auto press (e.g., press down whenever moving a virtual finger), auto lift (e.g., lift virtual finger when movement is stopped), increase movement speed, decrease movement speed, cancel, etc.

Figure 33:
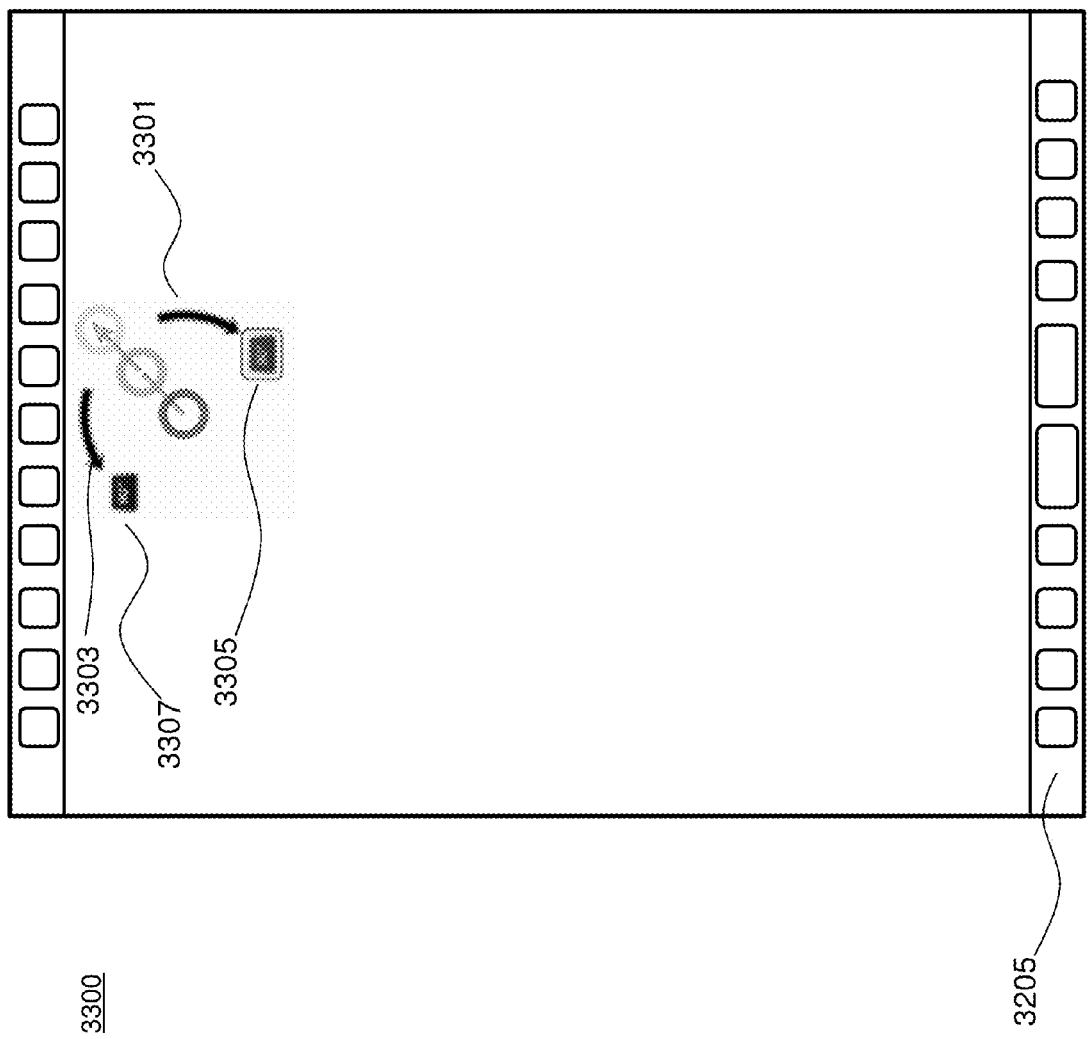

In response to a selection made when a rotate option is highlighted in options 3205, interface 3300 shown in FIG. 33 can be displayed. Interface 3300 can include the previously displayed indicator 3201 and pointing vector 3203 (not labeled) as well as turning arrows 3301 and 3303 and 90-degree rotation buttons 3305 and 3307. Arrows 3301 and 3303 and 90-degree turning buttons 3305 and 3307 can be scanned using process 600 to allow a user to select a direction and amount of rotation of the pointing vector.

Figure 34:
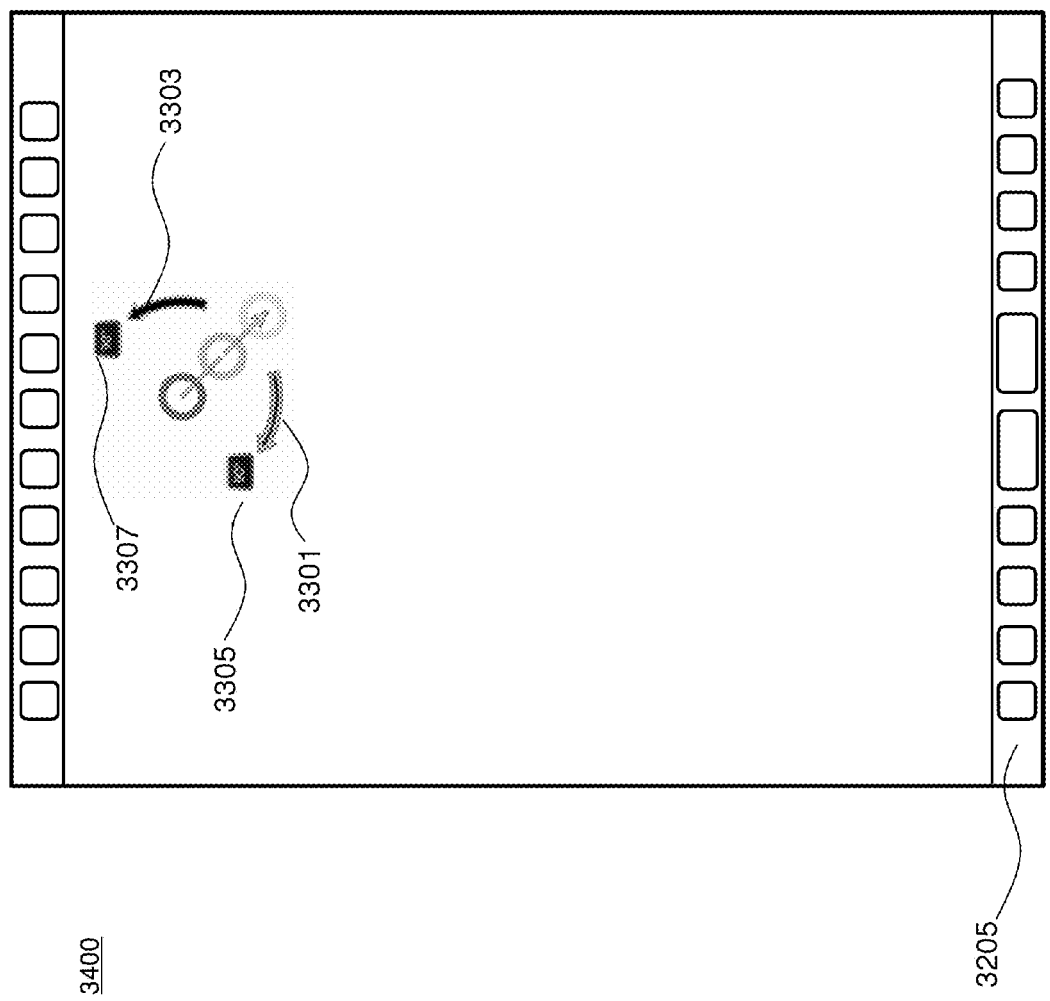

For example, in response to a selection made while 90-degree turning button 3305 is highlighted, interface 3400 shown in FIG. 34 can be displayed. As shown in interface 3400, the indicator 3201 (not labeled) has remained stationary, while the pointing vector 3203 (not labeled) has rotated 90 degrees in a clockwise direction. Had 90-degree rotation button 3307 been selected instead of button 3305, pointing vector 3203 would have rotated 90 degrees in the counter-clockwise direction.

Figure 35:
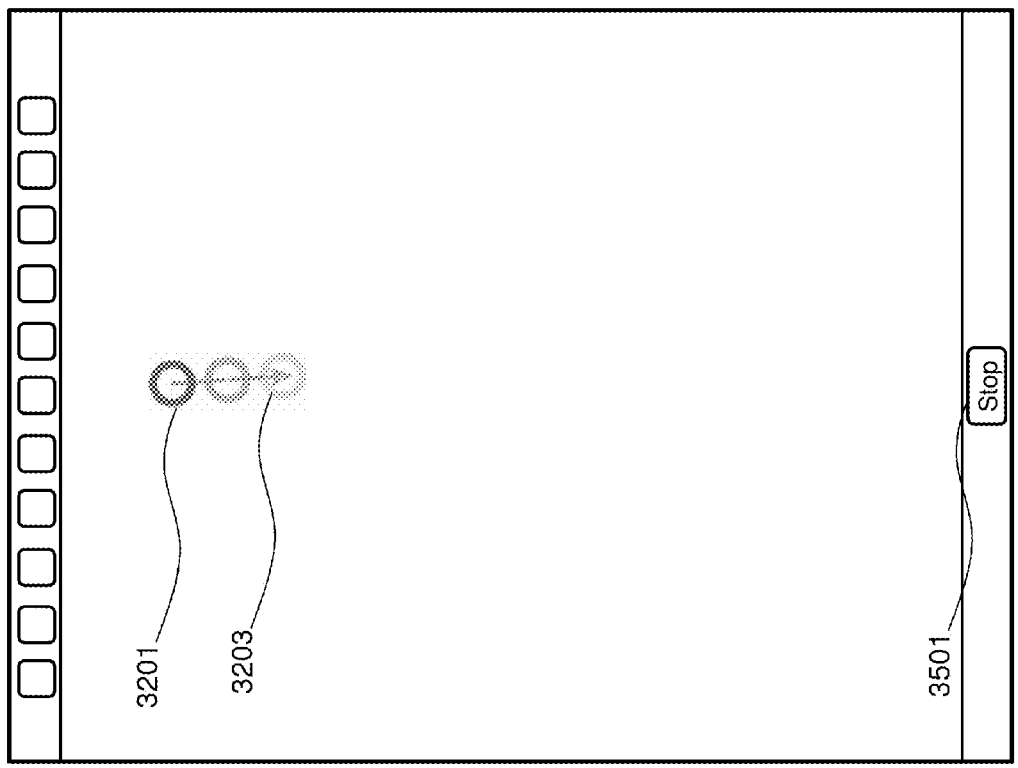

In response to a selection made while turning arrow 3301 is highlighted, interface 3500 shown in FIG. 35 can be displayed. As shown in interface 3500, pointing vector 3203 can begin rotating around indicator 3201 in the direction corresponding to the selected turning arrow. In this example, pointing vector 3203 begins and continually turns in the clockwise direction. Interface 3500 can further include "Stop" button 3501 that can be selected to stop rotation of pointing vector 3203 once the vector is pointing in the desired direction. Alternatively, pointing vector 3203 can rotate only while a selection is received.

Figure 36:
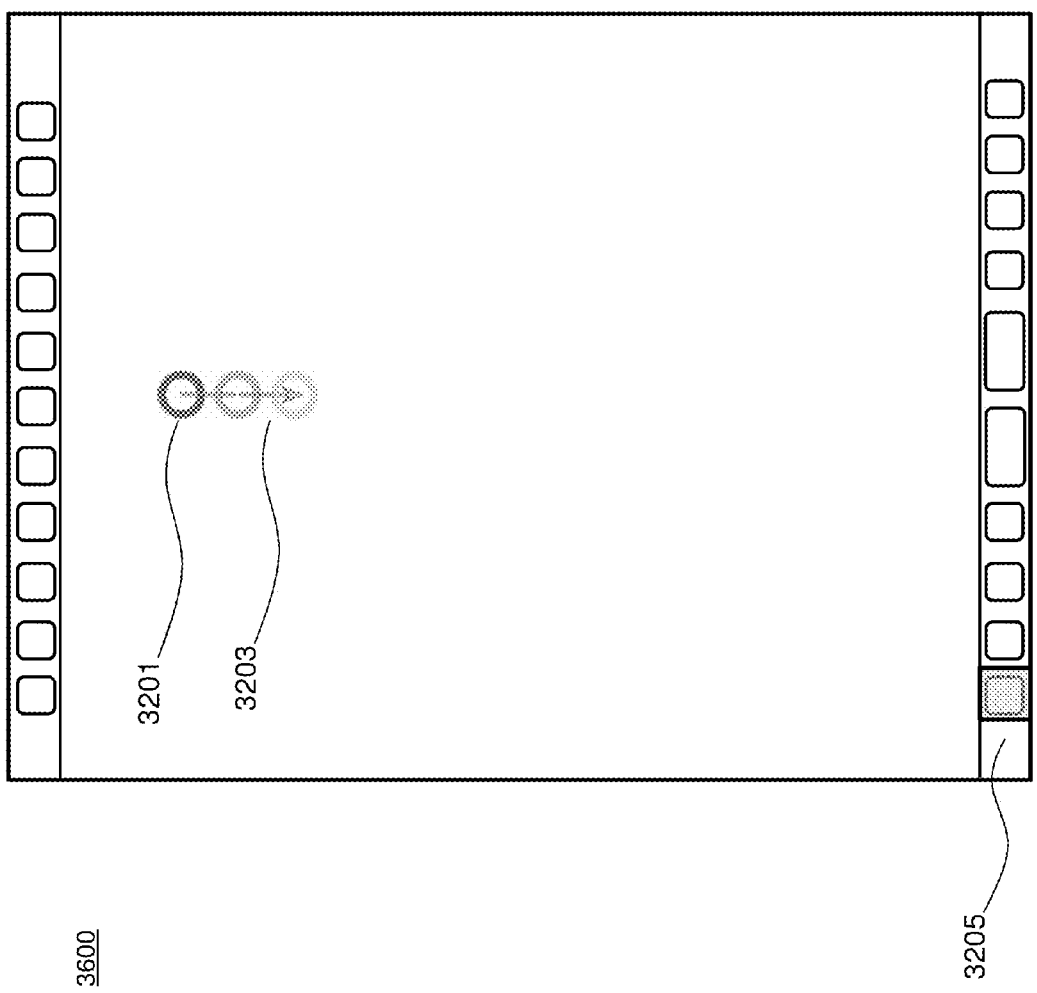

In response to a selection made while "Stop" button 3501 is highlighted, interface 3600 shown in FIG. 36 can be displayed. As shown in interface 3600, indicator 3201 can be displayed in its stationary position while pointing vector can also be displayed in a stationary position pointing in a direction based on when the "Stop" button 3501 was selected in interface 3500. Additionally, options 3205 can again be displayed and scanned using process 600.

Figure 37:
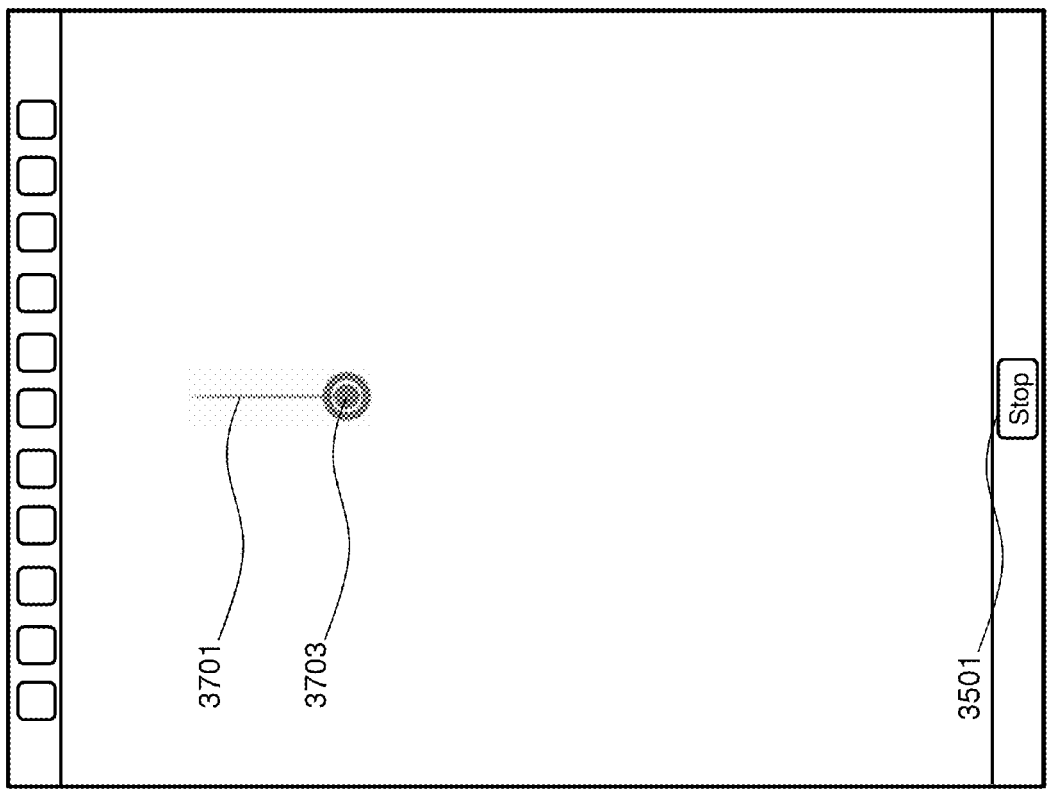

In response to a selection made while a move or draw button is highlighted in options 3205, interface 3700 shown in FIG. 37 can be displayed. As shown in interface 3700, a line 3701 can be drawn originating from the previous location of indicator 3201 and moving in the direction indicated by pointing vector 3203. Additionally, a current position indicator 3703 identifying the location of the most recently drawn portion of line 3701 line can be displayed. The circle within indicator 3703 can indicate that the virtual finger or pen is currently being applied to the display. This can be caused by the auto press option being selected. Interface 3700 can further include "Stop" button 3501 that can be selected to stop movement of indicator 3703, thereby stopping the drawing of line 3701.

Figure 38:
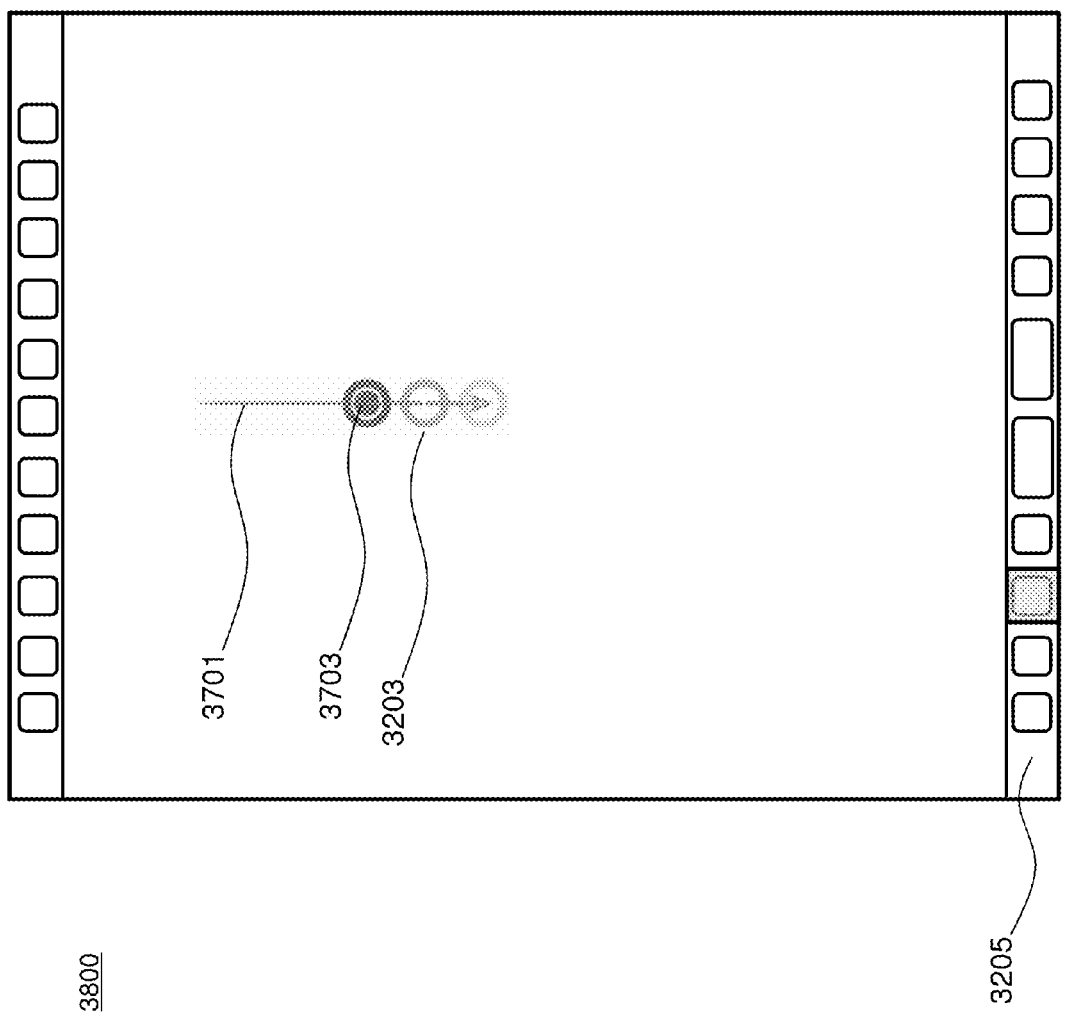

In response to a selection made while "Stop" button 3501 is highlighted, interface 3800 shown in FIG. 38 can be displayed. As shown in interface 3800, indicator 3703 can be displayed in its stationary position with pointing vector 3203. Additionally, options 3205 can again be displayed and scanned using process 600.

Figure 39:
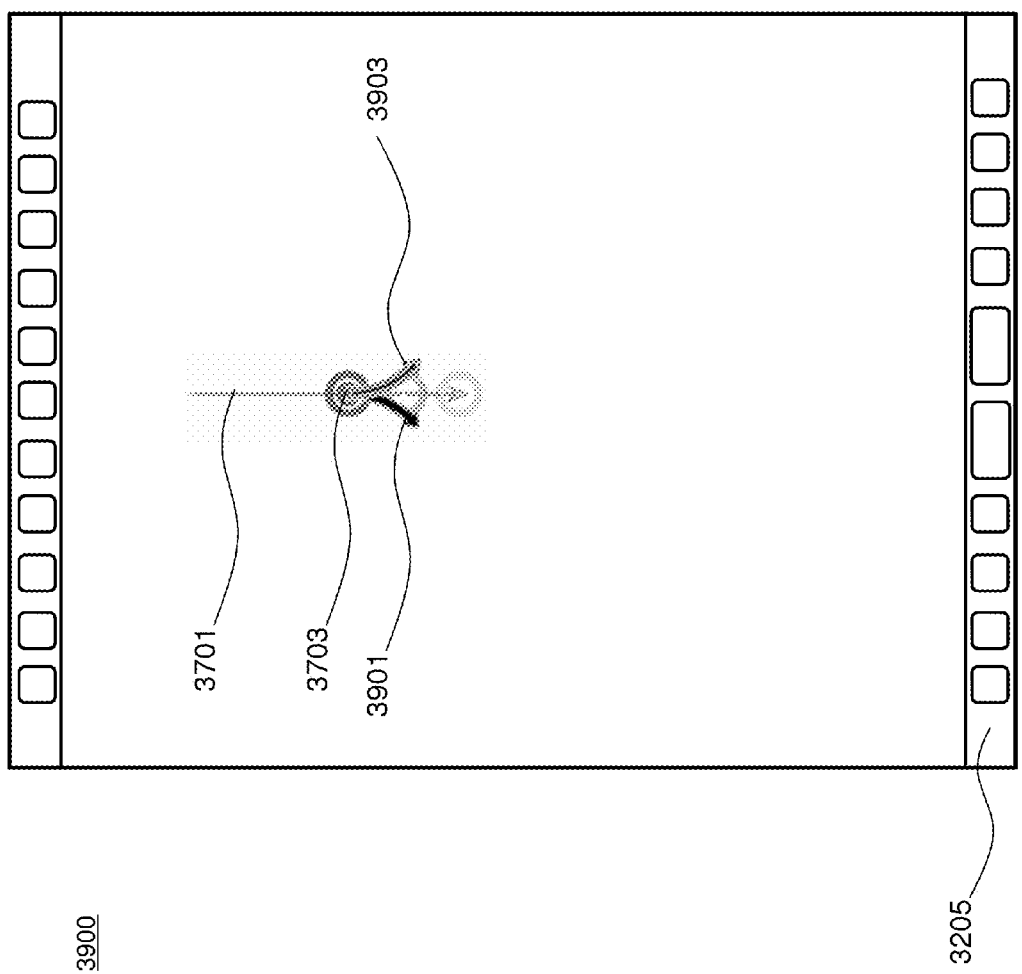

In response to a selection made while a draw curve button is selected, interface 3900 shown in FIG. 39 can be displayed. As shown in interface 3900, line 3701 can be displayed along with indicator 3703. In addition, curve arrows 3901 and 3903 can also be displayed and scanned using process 600.

Figure 40:
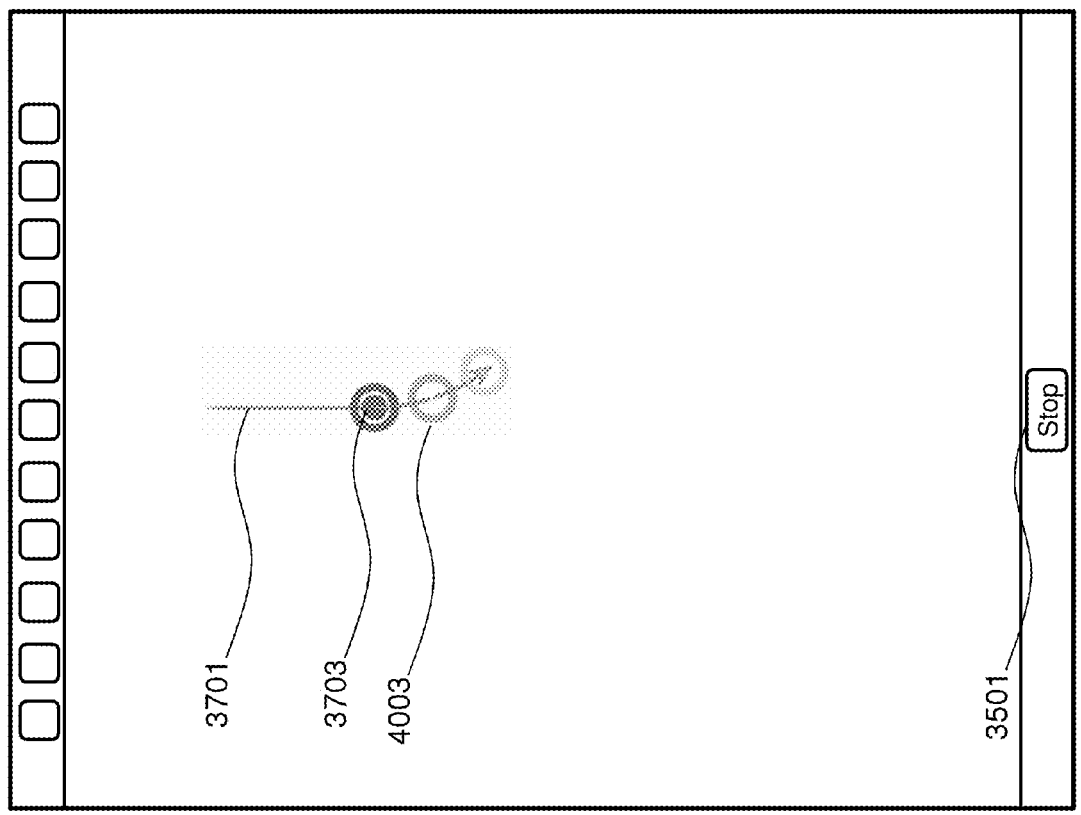

In response to a selection made while curve arrow 3903 is highlighted, interface 4000 shown in FIG. 40 can be displayed. As shown in interface 4000, line 3701 and indicator 3703 can be displayed. Additionally, a curved pointing vector 4003 can be displayed and line 3701 can be continually drawn along the curve defined by curved pointing vector 4003. Interface 4000 can further include "Stop" button 3501 that can be selected to stop drawing line 3701 along the curve defined by curved pointing vector 4003.

Figure 41:
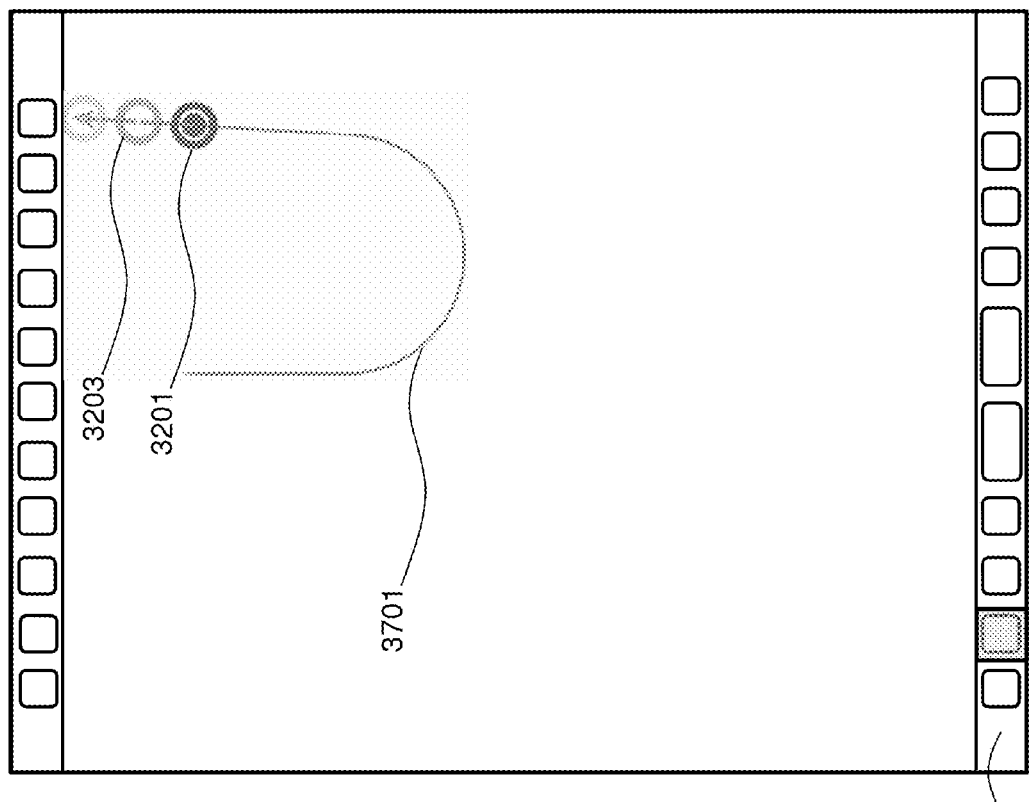
Figure 42:
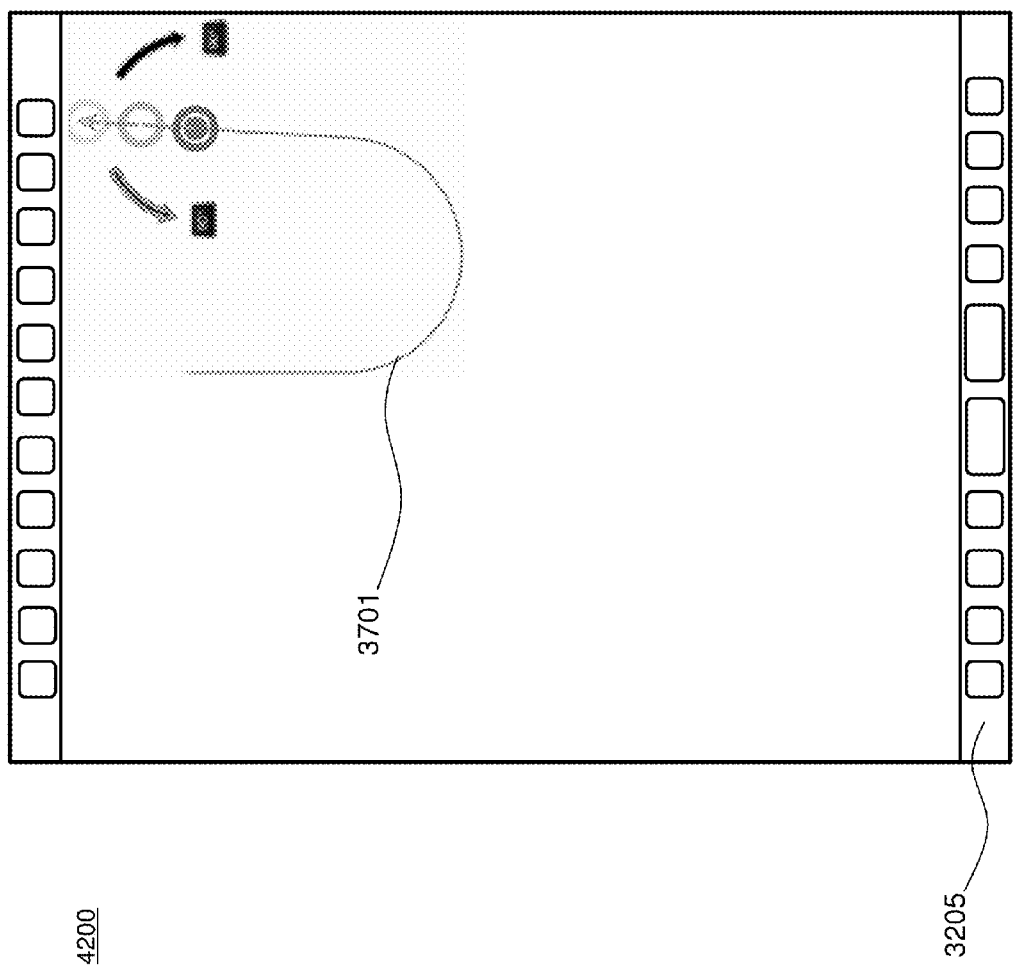
Figure 43:
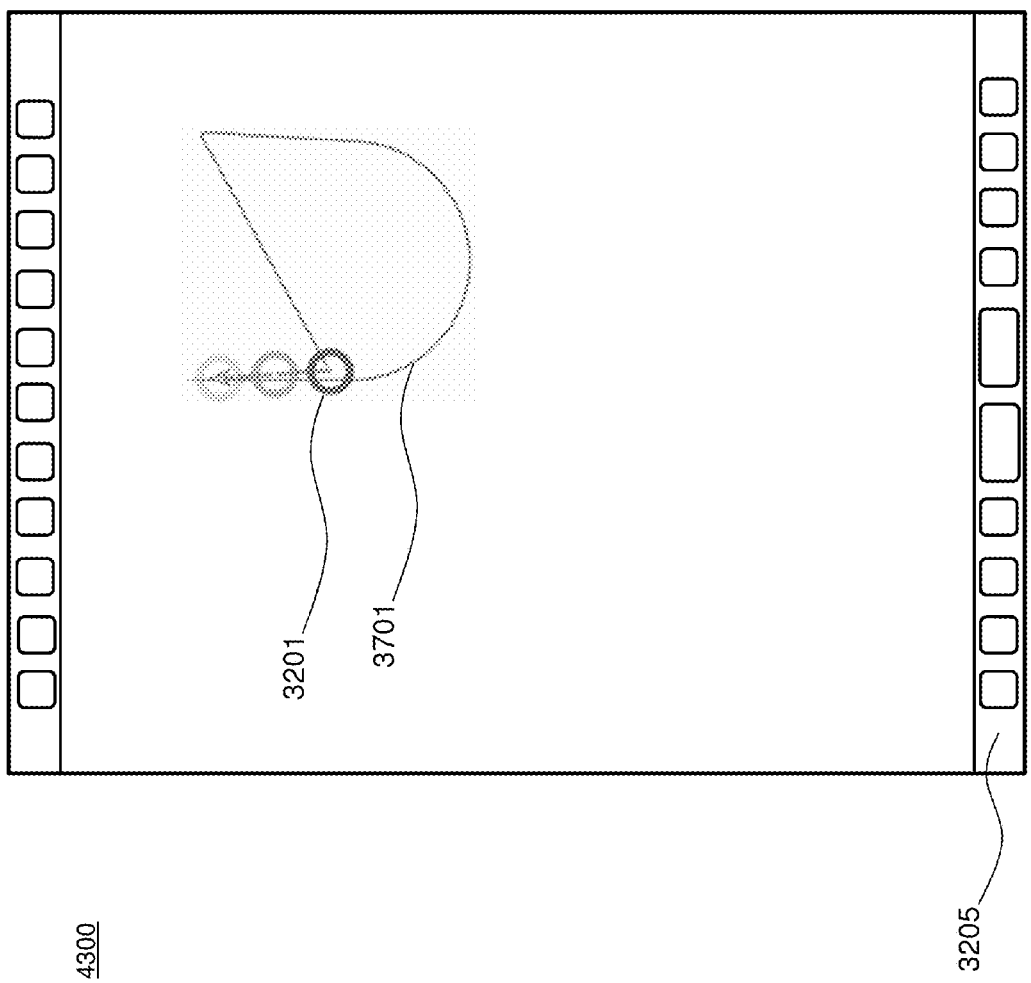
Figure 44:
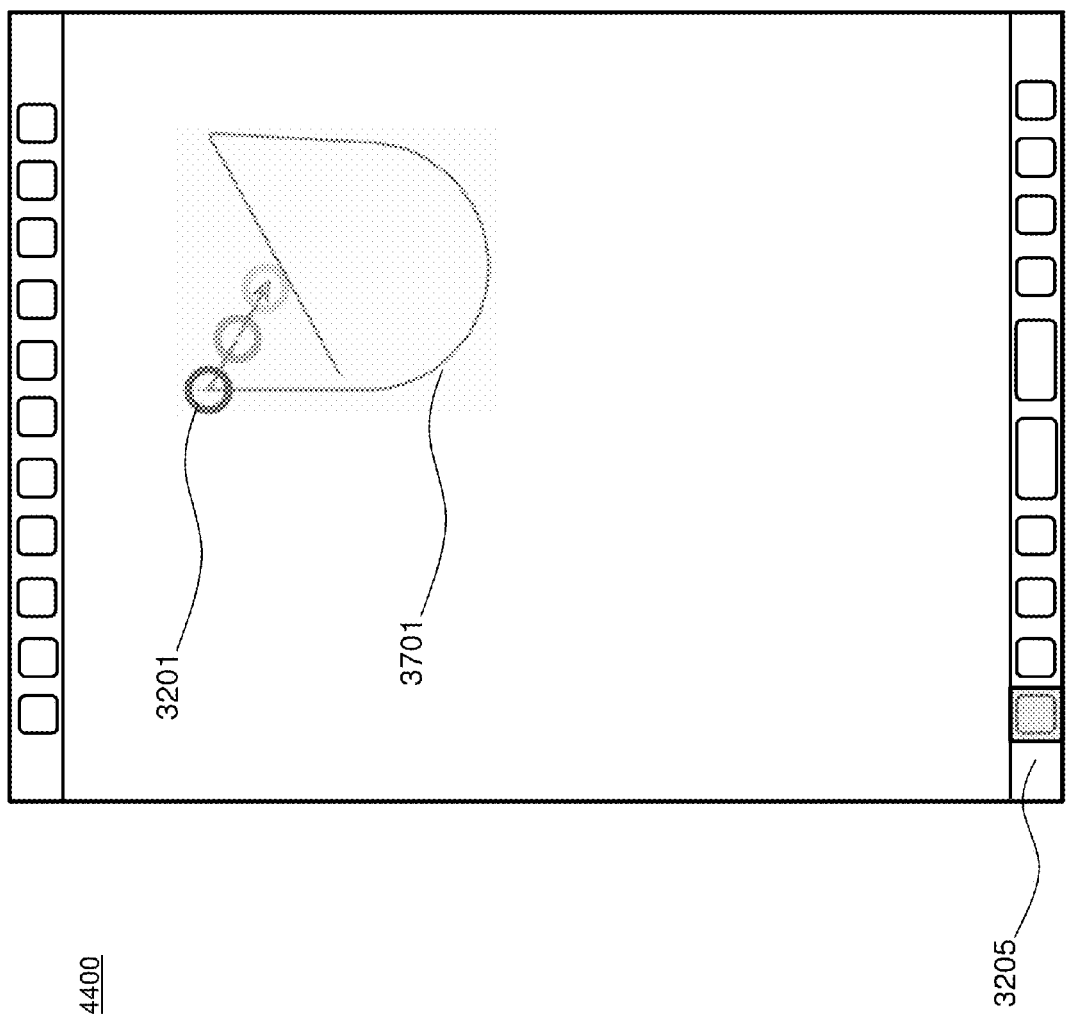
Figure 45:
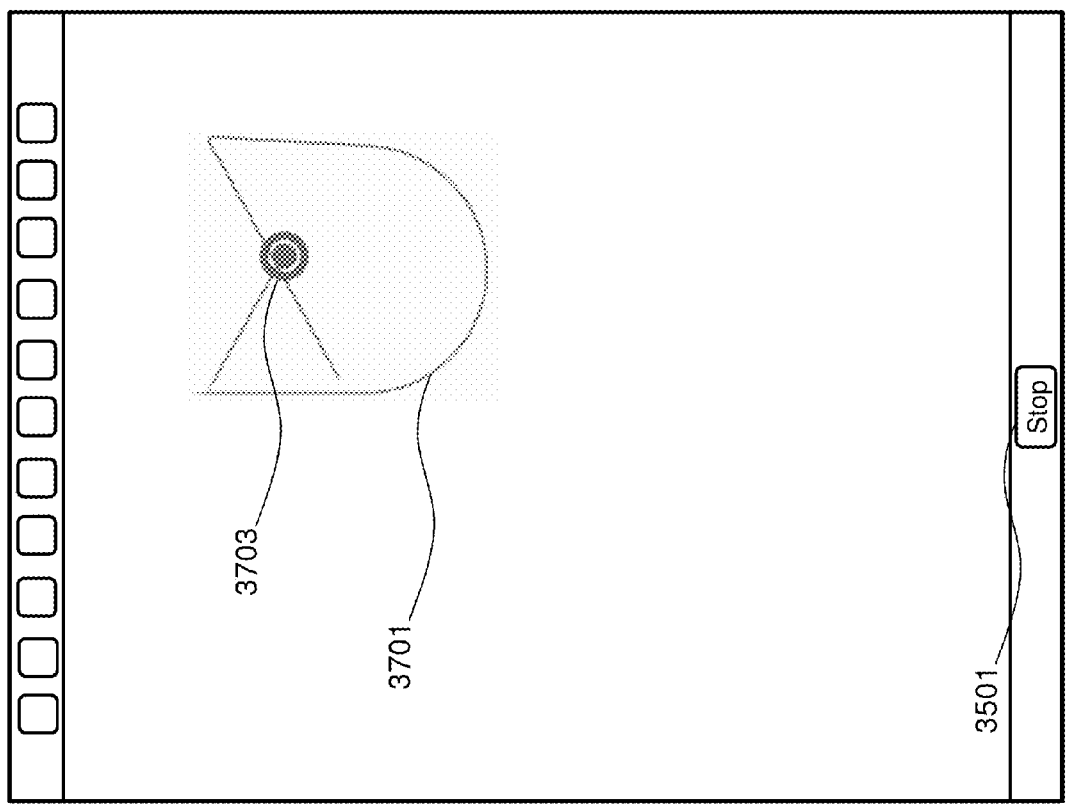

Using the various navigation options (e.g., drawing options) discussed above, drawings can be formed as shown in interfaces 4100 and 4200 shown in FIGS. 41 and 42, respectively. As shown in interface 4300 of FIG. 43, the auto press option can be deselected to allow movement of indicator 3201 without extending line 3701. This allows movement of indicator 3201 to the position shown in interface 4400 of FIG. 44. Options 3205 can again by selected to draw a line as shown in interface 4500 of FIG. 45.

Figure 46:
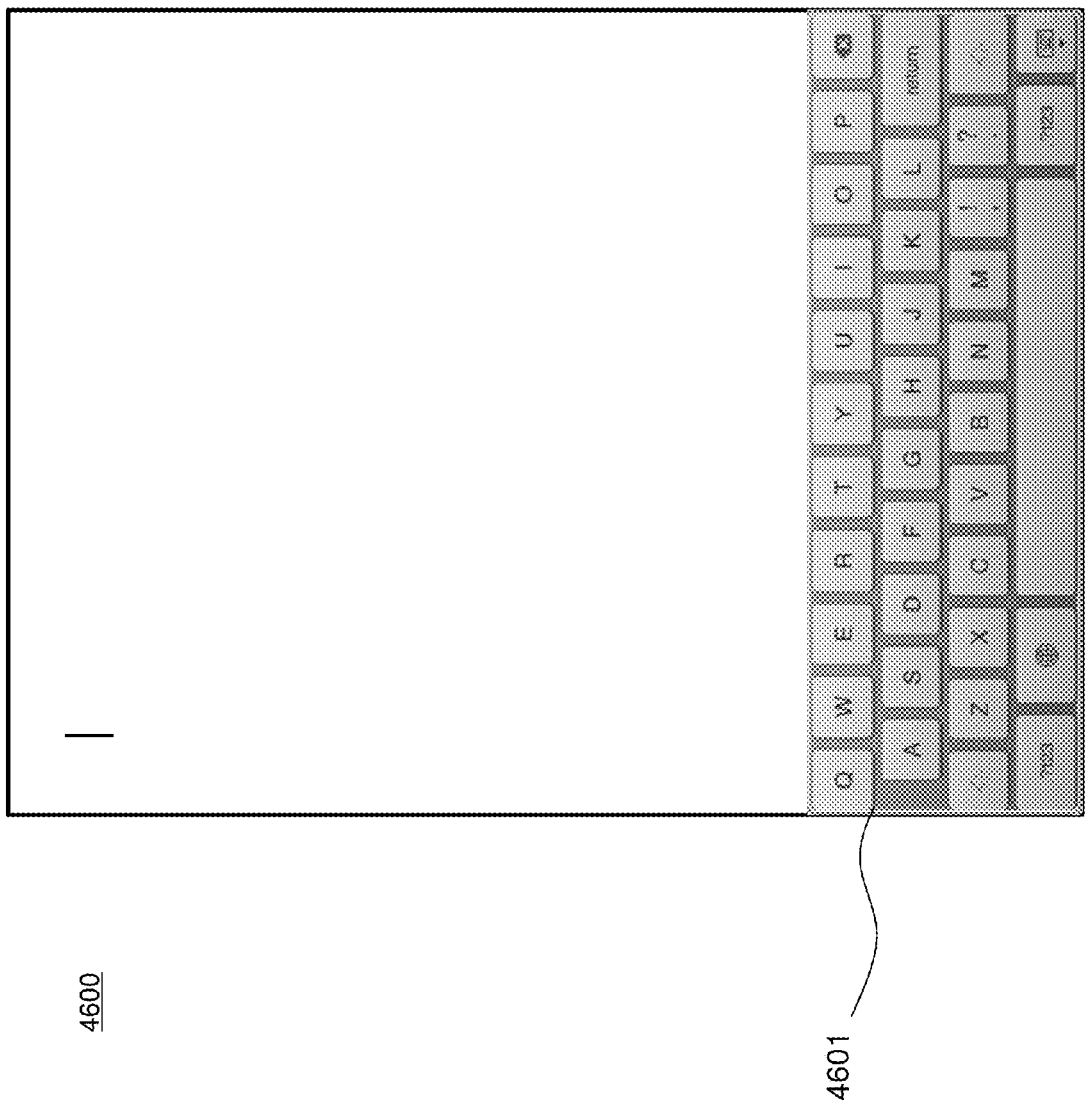
Figure 47:
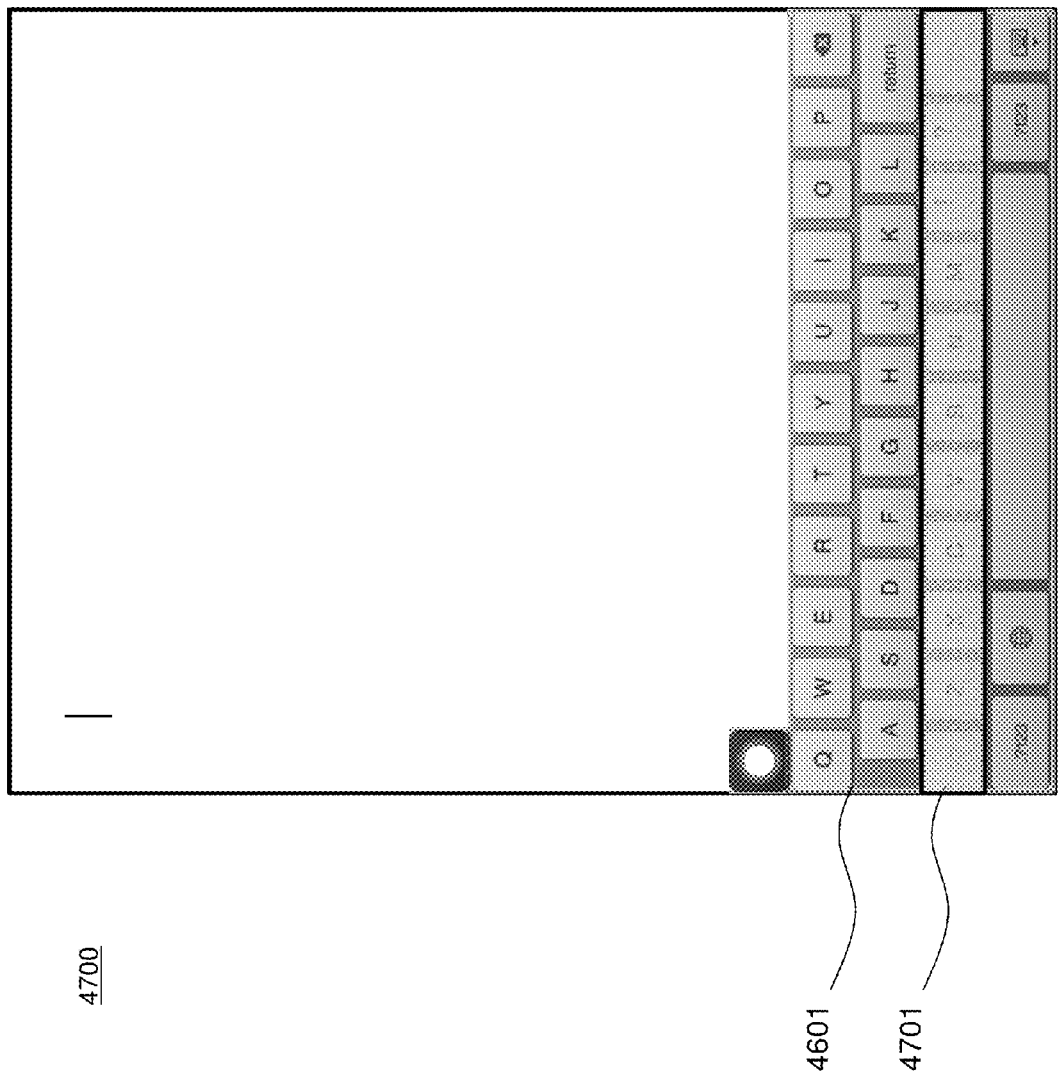
Figure 48:
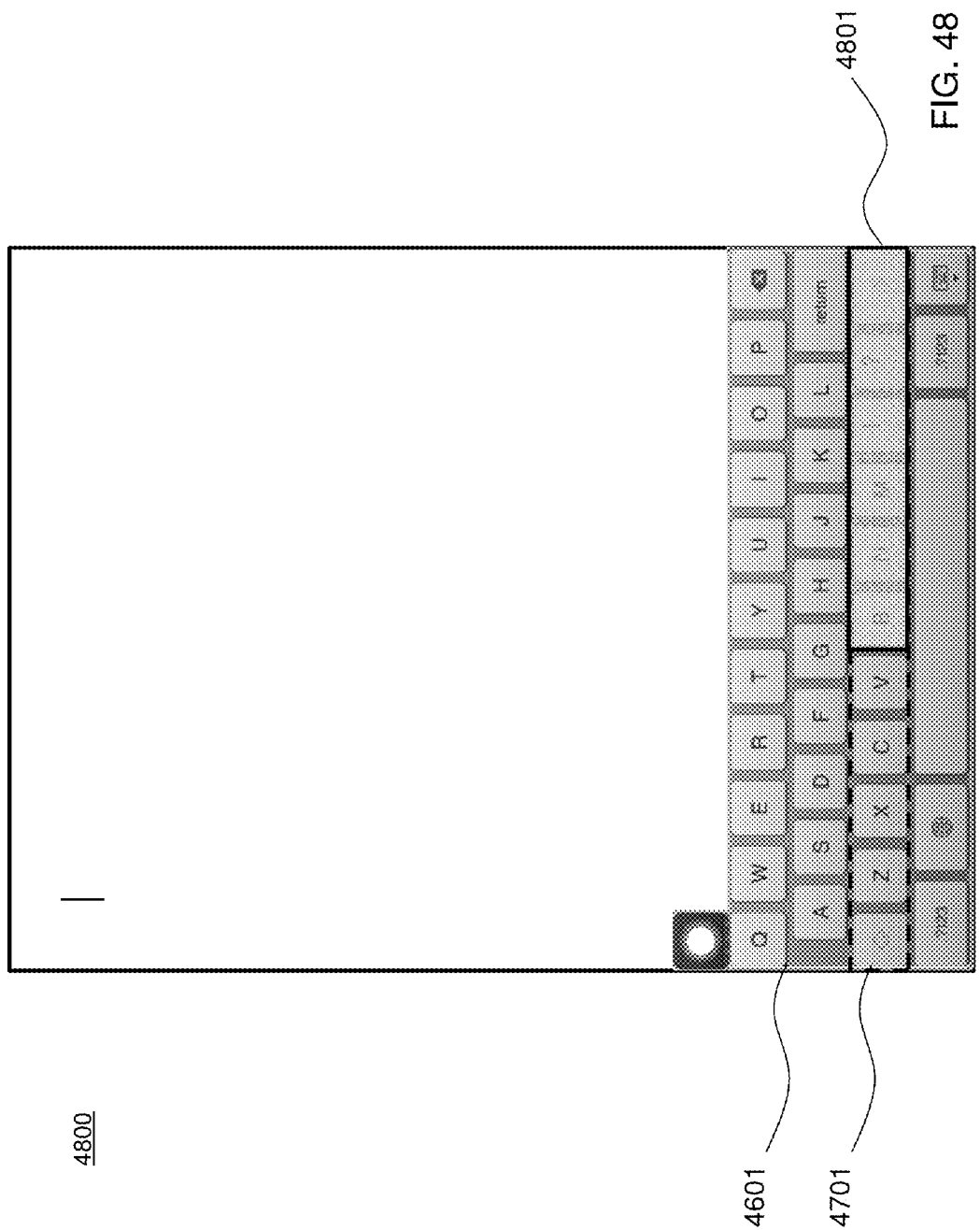
Figure 49:
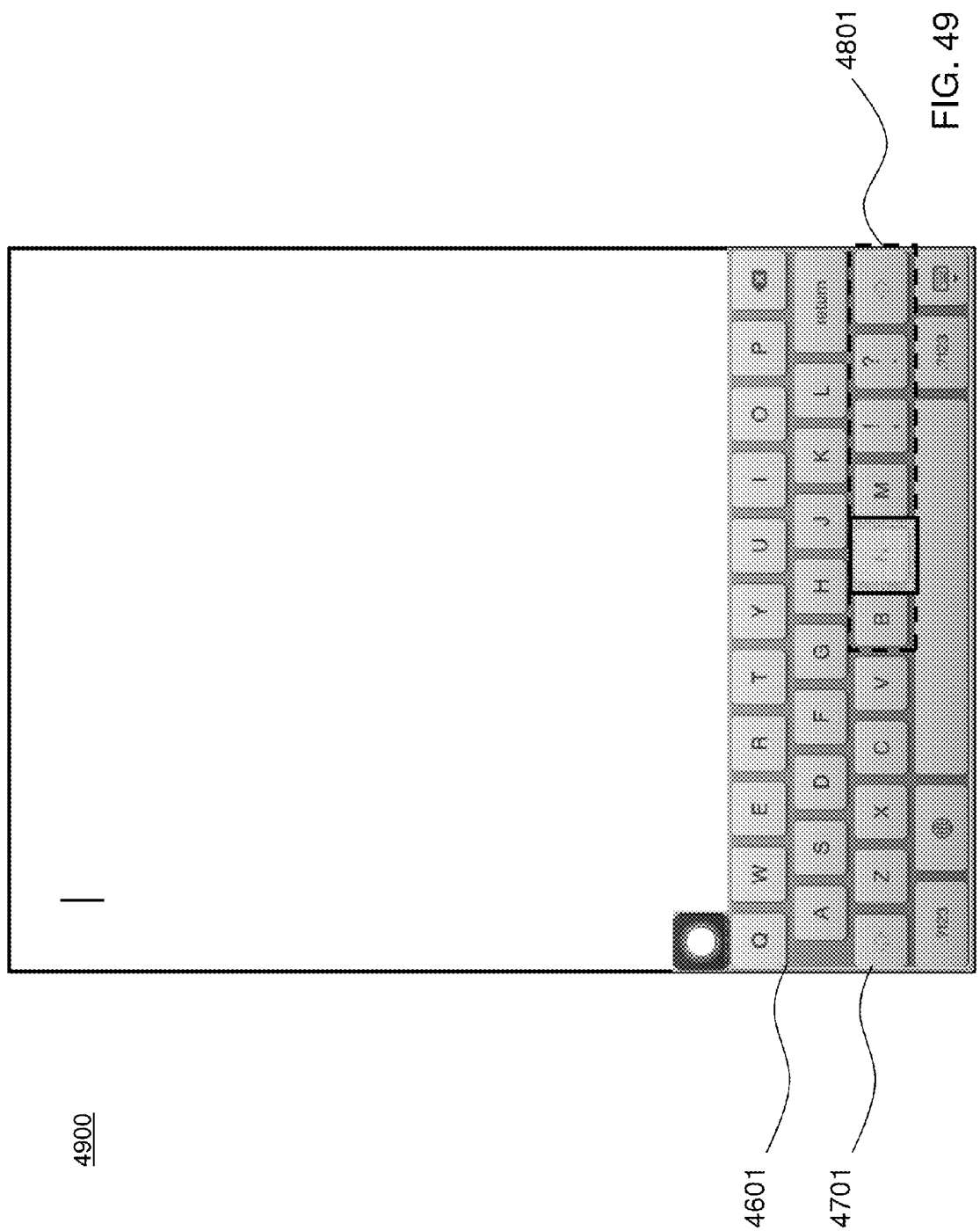
Figure 50:
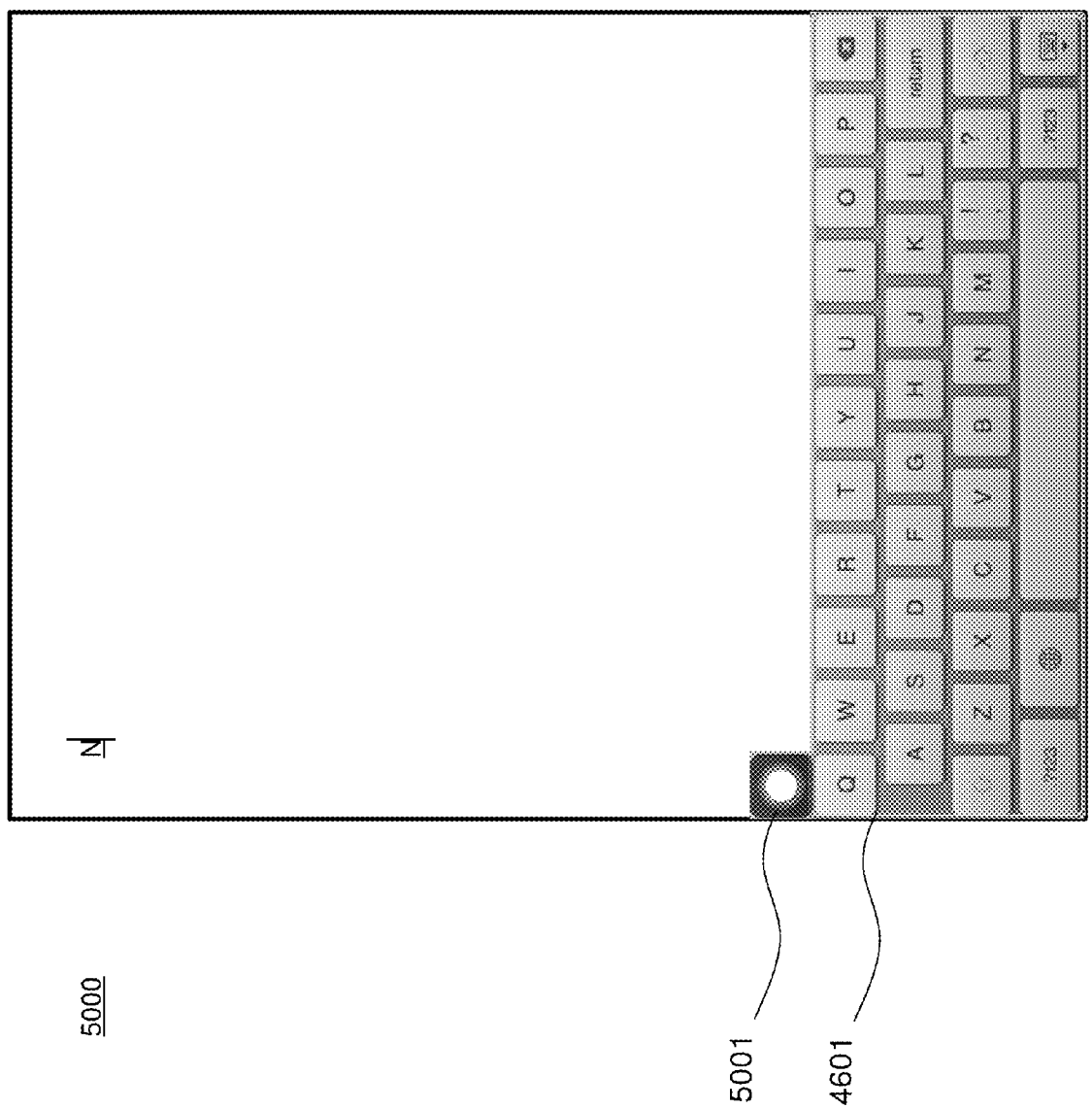
Figure 51:
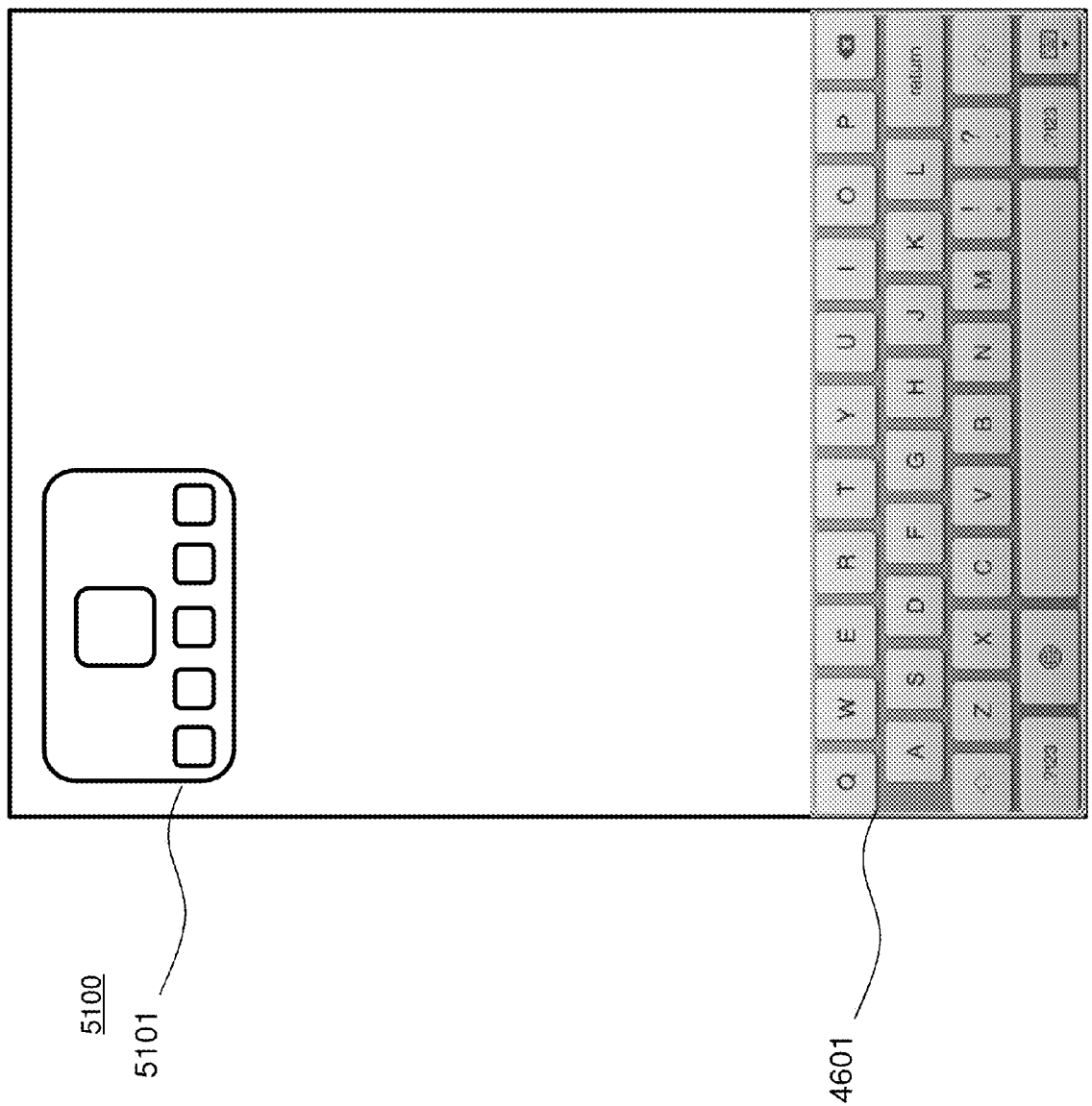

Interface 4600 shown in FIG. 46 illustrates another exemplary use of process 600. In this example, process 600 can be used to scan the keys of a virtual keyboard. As shown in FIG. 46, interface 4600 includes an element 4601 including multiple selectable virtual keys. This element 4601 of selectable virtual keys can be scanned in a manner similar to that described above with respect to the application icons of interface 300. For example, as shown in interface 4700 of FIG. 47, element 4601 can be divided by rows into sub-elements including sub-element 4701 (containing a row of selectable virtual keys). As shown in interface 4800 of FIG. 48, each sub-element 4701 can be further divided into sub-elements of virtual keys containing either the left half or the right half of virtual keys in that row. In some examples, this grouping can be used as a default grouping. In other examples, a user can define how the virtual keys are to be grouped. As shown, subset 4801 includes the virtual keys on the right half of sub-element 4701. As shown in interface 4900 in FIG. 49, the virtual keys within subset 4801 can be scanned using process 600.

In some examples, a faster scanning mode can be used to scan a keyboard. In these examples, in response to a selection made while a key (e.g., the "N" key) is highlighted, the input can be interpreted as a selection of that letter. In other words, a menu, such as menu 1103, may not be displayed requiring the user to "Activate" the element. This results in fewer selections being made to type a letter. Thus, in response to a selection made while a key (e.g., the "N" key) is highlighted, interface 5000 shown in FIG. 50 can be displayed. As shown, the letter "N" has been displayed at the top of the notepad. Additionally, to allow a user to enter a menu that would normally be displayed in response to a selection of an element, an option button 5001 can also be displayed. This button 5001 can be scanned along with the element 4601 of virtual keys. In response to a selection made while button 5001 is highlighted, interface 5100 shown in FIG. 51 can be displayed. Interface 5100 can include menu 5101 containing an "Alternate Key" selectable element that can be used to display alternate keys in place of the virtual keys of set 4601. Menu 5101 can further include options similar or identical to options 1203 described above.

As can be seen by the examples provided above, process 600 can be used to navigate a touch sensitive mobile device, such as a mobile phone, tablet computer, or the like, as well as non-touch sensitive devices, such as laptop computers, desktop computers, and the like. For example, the grid and keyboard scanning options can be used when using a laptop or desktop computer to emulate the use of a standard mouse and keyboard. Similarly, the element or grid scanning options can be used to navigate a touch-sensitive device, as illustrated by the examples provided above.

As should be appreciated by one of ordinary skill in the art, any grouping of selectable elements, menus, and the like, can be organized in any desired manner using process 500 to be navigated using process 600.

Additionally, in some examples, a user can generate their own panel (e.g., a virtual keyboard) using a GUI application having drag and drop functionality. In this way, the user can customize a panel of virtual buttons capable of being scanned using process 600. Each virtual button can be customized to perform any desired function, such as type a particular letter, open an application, etc. The size, position, and grouping of the virtual buttons of the panel can also be adjusted using the GUI application.

Figure 52:
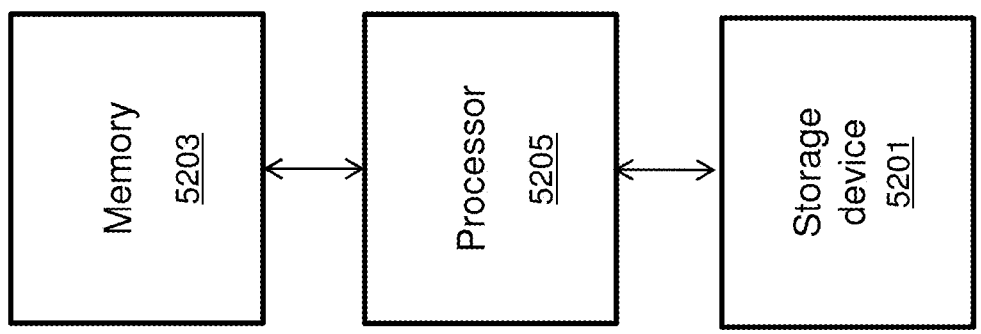
FIG. 52 illustrates an exemplary computing system for scanning a user interface according to various examples.

One or more of the functions relating to scanning a user interface can be performed by a system similar or identical to system 5200 shown in FIG. 52. System 5200 can include instructions stored in a non-transitory computer readable storage medium, such as memory 5203 or storage device 5201, and executed by processor 5205. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

In some examples, system 5200 can be included within computing device 102 and/or input device 104. In these examples, processor 5205 can be coupled to receive an output signal from a sensor of input device 104. As mentioned above, input device 104 can communicate its output using any wired or wireless communication technique. Processor 5205 can be configured to receive the output from a sensor of input device 104 and process the output as described above with respect to FIG. 6 and process 600. It is to be understood that the system is not limited to the components and configuration of FIG. 52, but can include other or additional components in multiple configurations according to various examples.

Figure 53:
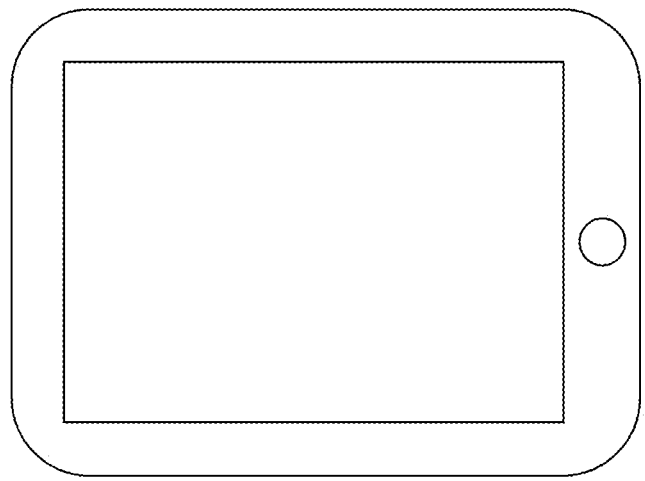

FIG. 53 illustrates an exemplary personal device 5300, such as a tablet, that can perform scanning of a user interface according to various examples.

Figure 54:
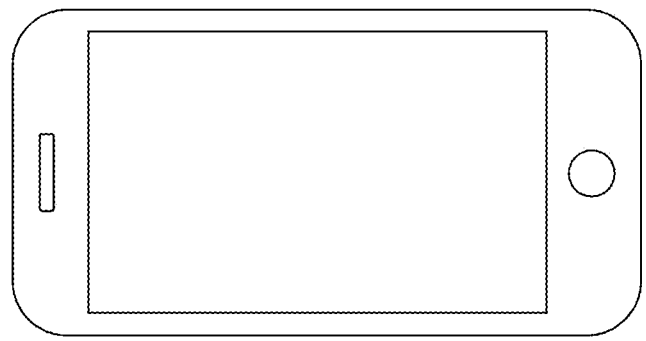

FIG. 54 illustrates another exemplary personal device 5400, such as a mobile phone, that can perform scanning of a user interface according to various examples.

FIG. 55 illustrates an exemplary personal device 5500, such as a laptop computer, that can perform scanning of a user interface according to various examples.

Therefore, according to the above, some examples of the disclosure are directed to a method comprising: highlighting a plurality of elements within a user interface, wherein at least one of the plurality of elements comprises a plurality of sub-elements; receiving a selection while the at least one of the plurality of elements is highlighted; and performing an action on the at least one of the plurality of elements. Additionally or alternatively to one or more of the examples disclosed above, highlighting the plurality of elements can include changing a visual characteristic of the plurality of elements, generating an audible notification, or generating a vibration. Additionally or alternatively to one or more of the examples disclosed above, highlighting the plurality of elements within the user interface can include sequentially highlighting the plurality of elements within the user interface. Additionally or alternatively to one or more of the examples disclosed above, the action performed on the at least one of the plurality of elements can include: highlighting a plurality of sub-elements of the at least one of the plurality of elements. Additionally or alternatively to one or more of the examples disclosed above, the method can further include: receiving a selection while a sub-element of the plurality of sub-elements is highlighted; and performing an action associated with the sub-element. Additionally or alternatively to one or more of the examples disclosed above, highlighting the plurality of elements within the user interface can include: highlighting a first element of the plurality of elements; and highlighting a second element of the plurality of elements if the selection is not received within a threshold length of time or in response to an input from a user. Additionally or alternatively to one or more of the examples disclosed above, highlighting the plurality of elements within the user interface can include: ceasing highlighting of the plurality of elements in response to highlighting the plurality of elements a threshold number of times; and resuming the highlighting of the plurality of elements after a threshold length of time or in response to a user input.

According to the above, other examples of the disclosure are directed to a method comprising: defining a plurality of elements within a user interface; grouping the plurality of elements into one or more sets of elements based on at least one characteristic associated with the plurality of elements within the user interface; and scanning the plurality of elements in accordance with the grouping of the plurality of elements. Additionally or alternatively to one or more of the examples disclosed above, defining the plurality of elements within the user interface can include: identifying a plurality of selectable elements within the user interface; and defining the plurality of selectable elements as an element of the plurality of elements. Additionally or alternatively to one or more of the examples disclosed above, defining the plurality of elements within the user interface can include: dividing the user interface into a plurality of sections; and defining the plurality of sections as an element of the plurality of elements. Additionally or alternatively to one or more of the examples disclosed above, the at least one characteristic associated with the plurality of elements can include a location of the plurality of elements within the user interface.

According to the above, other examples of the disclosure are directed to a method comprising: highlighting a first element within a user interface; determining whether a selection has been received while highlighting the first element; if the selection has been received while highlighting the first element, performing an action on the first element; and if the selection has not been received while highlighting the first element, highlighting a second element within the user interface. Additionally or alternatively to one or more of the examples disclosed above, the method further includes: determining whether the selection has been received while highlighting the second element; if the selection has been received while highlighting the second element, performing an action on the second element; and if the selection has not been received while highlighting the second element, highlighting a third element within the user interface. Additionally or alternatively to one or more of the examples disclosed above, the user interface can be a user interface of a touch sensitive device, and wherein the first element can include a first application icon and the second element comprises a second application icon. Additionally or alternatively to one or more of the examples disclosed above, the user interface can include a virtual keyboard, and wherein the first element can include a first virtual key and the second element can include a second virtual key. Additionally or alternatively to one or more of the examples disclosed above, the user interface can include a menu, and wherein the first element can include a first option and the second element can include a second option.

According to the above, other examples of the disclosure are directed to a method comprising: causing a display of an orientation indicator; causing a display of a plurality of navigation options; highlighting the plurality of navigation options; and causing a display of a positional indicator moving in a direction of the orientation indicator in response to receiving a selection while a move option from the plurality of navigation options is highlighted. Additionally or alternatively to one or more of the examples disclosed above, the plurality of navigation options can include a plurality of directional options, and wherein the method can further include: changing the orientation of the orientation indicator in response to receiving the selection while a directional option of the plurality of directional options is highlighted. Additionally or alternatively to one or more of the examples disclosed above, the plurality of directional options can include a clockwise turn button and counter-clockwise turn button, and wherein the orientation of the orientation indicator can be rotated in a direction associated with the clockwise turn button or the counter-clockwise button arrow in response to receiving the selection while the clockwise turn button or the counter-clockwise turn button is highlighted, respectively. Additionally or alternatively to one or more of the examples disclosed above, the plurality of directional options can include a clockwise turn button and counter-clockwise turn button, and wherein the orientation of the orientation indicator can rotate by a predetermined amount in a direction associated with the clockwise turn button or the counter-clockwise turn button in response to receiving the selection while the clockwise turn button or the counter-clockwise turn button is highlighted, respectively.

According to the above, other examples of the disclosure are directed to a non-transitory computer-readable storage medium comprising instructions for: highlighting a plurality of elements within a virtual keyboard, wherein the plurality of elements comprises a set of virtual keys of the virtual keyboard; receiving a selection while an element of the plurality of elements is highlighted; highlighting the virtual keys of the set of virtual keys of the selected element; receiving a selection while a virtual key is highlighted; and causing a display of a character associated with the virtual key. Additionally or alternatively to one or more of the examples disclosed above, the non-transitory computer-readable storage medium can further include instructions for: highlighting, prior to highlighting the virtual keys, a first subset of virtual keys of the set of virtual keys of the selected element and a second subset of virtual keys of the set of virtual keys of the selected element; and receiving a selection while either the first subset of virtual keys of the set of virtual keys of the selected element or the second subset of virtual keys of the set of virtual keys of the selected element is highlighted, wherein highlighting the virtual keys of the set of virtual keys of the selected element comprises highlighting only the virtual keys of the subset that was highlighted when the selection was received. Additionally or alternatively to one or more of the examples disclosed above, at least one virtual key of the virtual keyboard can include an alternate key option. Additionally or alternatively to one or more of the examples disclosed above, highlighting the plurality of elements within the virtual keyboard can include sequentially highlighting each of the plurality of elements within the virtual keyboard for less than 1 second. Additionally or alternatively to one or more of the examples disclosed above, highlighting the virtual keys of the row of virtual keys of the selected element can include sequentially highlighting each of the virtual keys of the set of virtual keys of the selected element for less than 1 second.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A method comprising:
at an electronic device with a display and one or more input devices:
scanning a plurality of elements displayed on the display, wherein scanning the plurality of elements comprises sequentially highlighting the plurality of elements, and wherein a first element of the plurality of elements comprises a plurality of sub-elements;
receiving, via the one or more input devices, a first selection input when the first element of the plurality of elements is highlighted;
in response to receiving the first selection input, scanning a region of the display that includes the plurality of sub-elements of the first element, wherein scanning the region of the display includes scanning the plurality of sub-elements;
receiving a second selection input, via the one or more input devices, while scanning the region of the display that includes the plurality of sub-elements; and in response to receiving the second selection input:
    in accordance with a determination that the second selection input includes selection of a respective sub-element of the plurality of sub-elements, performing an action associated with the respective sub-element of the plurality of sub-elements; and
    in accordance with a determination that the second selection input includes selection of an escape element associated with an escape command, performing the escape command, wherein the escape element includes a graphical element that encompasses the plurality of sub-elements.

2. The method of claim 1, wherein performing the escape command includes returning to scanning elements in the plurality of elements.

3. The method of claim 1, wherein the escape command is performed without performing the action associated with the respective sub-element.

4. The method of claim 1, wherein the first selection input and the second selection input are received via a common input device of the one or more input devices.

5. The method of claim 1, wherein scanning the region of the display that includes the plurality of sub-elements of the first element comprises sequentially highlighting the plurality of sub-elements and then highlighting the first element of the plurality of elements.

6. The method of claim 5, wherein the determination that the second selection input includes selection of an escape element associated with an escape command comprises determining that the second selection input is received when the first element of the plurality of elements is highlighted.

7. The method of claim 1, wherein the escape element comprises highlighting of the first element of the plurality of elements.

8. The method of claim 1, wherein the escape element comprises an indication of a selection of the first element of the plurality of elements.

9. An electronic device comprising:
a display;
one or more input devices; and
one or more processors coupled to the display and the one or more input devices, the one or more processors capable of:
    scanning a plurality of elements displayed on the display, wherein scanning the plurality of elements comprises sequentially highlighting the plurality of elements, and wherein a first element of the plurality of elements comprises a plurality of sub-elements;
    receiving, via the one or more input devices, a first selection input when the first element of the plurality of elements is highlighted;
    in response to receiving the first selection input, scanning a region of the display that includes the plurality of sub-elements of the first element, wherein scanning the region of the display includes scanning the plurality of sub-elements;
    receiving a second selection input, via the one or more input devices, while scanning the region of the display that includes the plurality of sub-elements; and
    in response to receiving the second selection input:
        in accordance with a determination that the second selection input includes selection of a respective sub-element of the plurality of sub-elements, performing an action associated with the respective sub-element of the plurality of sub-elements; and
        in accordance with a determination that the second selection input includes selection of an escape element associated with an escape command, performing the escape command, wherein the escape element includes a graphical element that encompasses the plurality of sub-elements.

10. The electronic device of claim 9, wherein performing the escape command includes returning to scanning elements in the plurality of elements.

11. The electronic device of claim 9, wherein the escape command is performed without performing the action associated with the respective sub-element.

12. The electronic device of claim 9, wherein the first selection input and the second selection input are received via a common input device of the one or more input devices.

13. The electronic device of claim 9, wherein scanning the region of the display that includes the plurality of sub-elements of the first element comprises sequentially highlighting the plurality of sub-elements and then highlighting the first element of the plurality of elements.

14. The electronic device of claim 13, wherein the determination that the second selection input includes selection of an escape element associated with an escape command comprises determining that the second selection input is received when the first element of the plurality of elements is highlighted.

15. The electronic device of claim 9, wherein the escape element comprises highlighting of the first element of the plurality of elements.

16. The electronic device of claim 9, wherein the escape element comprises an indication of a selection of the first element of the plurality of elements.

17. A non-transitory computer-readable storage medium storing one or more programs, the one or more programs comprising instructions, which when executed by an electronic device with one or more processors, a display and one or more input devices, cause the device to:
    scan a plurality of elements displayed on the display, wherein scanning the plurality of elements comprises sequentially highlighting the plurality of elements, and wherein a first element of the plurality of elements comprises a plurality of sub-elements;
    receive, via the one or more input devices, a first selection input when the first element of the plurality of elements is highlighted;
    in response to receiving the first selection input, scan a region of the display that includes the plurality of sub-elements of the first element, wherein scanning the region of the display includes scanning the plurality of sub-elements;
    receive a second selection input, via the one or more input devices, while scanning the region of the display that includes the plurality of sub-elements; and
    in response to receiving the second selection input:
        in accordance with a determination that the second selection input includes selection of a respective sub-element of the plurality of sub-elements, perform an action associated with the respective sub-element of the plurality of sub-elements; and
        in accordance with a determination that the second selection input includes selection of an escape element associated with an escape command, perform the escape command, wherein the escape element includes a graphical element that encompasses the plurality of sub-elements.

18. The non-transitory computer-readable storage medium of claim 17, wherein performing the escape command includes returning to scanning elements in the plurality of elements.

19. The non-transitory computer-readable storage medium of claim 17, wherein the escape command is performed without performing the action associated with the respective sub-element.

20. The non-transitory computer-readable storage medium of claim 17, wherein the first selection input and the second selection input are received via a common input device of the one or more input devices.

21. The non-transitory computer-readable storage medium of claim 17, wherein scanning the region of the display that includes the plurality of sub-elements of the first element comprises sequentially highlighting the plurality of sub-elements and then highlighting the first element of the plurality of elements.

22. The non-transitory computer-readable storage medium of claim 21, wherein the determination that the second selection input includes selection of an escape element associated with an escape command comprises determining that the second selection input is received when the first element of the plurality of elements is highlighted.

23. The non-transitory computer-readable storage medium of claim 17, wherein the escape element comprises highlighting of the first element of the plurality of elements.

24. The non-transitory computer-readable storage medium of claim 17, wherein the escape element comprises an indication of a selection of the first element of the plurality of elements.

\* \* \* \* \*